US006430607B1

(12) United States Patent
Kavner

(10) Patent No.: US 6,430,607 B1
(45) Date of Patent: Aug. 6, 2002

(54) SYSTEM AND METHOD FOR PERFORMING REMOTE REQUESTS WITH AN ON-LINE SERVICE NETWORK

(75) Inventor: Gene D. Kavner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,087

(22) Filed: Nov. 12, 1998

Related U.S. Application Data

(62) Division of application No. 08/516,184, filed on Aug. 18, 1995, now Pat. No. 5,956,509.

(51) Int. Cl.[7] .............................................. G06F 15/16
(52) U.S. Cl. ...................... 709/217; 709/216; 709/219
(58) Field of Search ................................ 709/217, 219, 709/216, 203, 218, 215

(56) References Cited

U.S. PATENT DOCUMENTS

| | | |
|---|---|---|
| 4,184,200 A | 1/1980 | Wagner |
| 4,280,176 A | 7/1981 | Tan |
| 4,432,057 A | 2/1984 | Daniell et al. |
| 4,493,024 A | 1/1985 | Baxter |
| 4,799,153 A | 1/1989 | Hann |
| 4,799,156 A | 1/1989 | Shavit et al. |
| 4,800,488 A | 1/1989 | Agrawal et al. |
| 4,858,117 A | 8/1989 | DiChiara |
| 4,899,136 A | 2/1990 | Beard et al. |
| 5,079,765 A | 1/1992 | Nakamura |
| 5,113,499 A | 5/1992 | Ankney |
| 5,140,689 A | 8/1992 | Kobayashi |
| 5,151,989 A | 9/1992 | Johnson et al. |
| 5,187,790 A | 2/1993 | Fast et al. |
| 5,247,676 A | 9/1993 | Ozur et al. |
| 5,257,369 A | 10/1993 | Skeen et al. |
| 5,265,250 A | 11/1993 | Andrade et al. |
| 5,291,597 A | 3/1994 | Shorter et al. |
| 5,307,490 A | 4/1994 | Davidson et al. |
| 5,321,841 A | 6/1994 | East |
| 5,329,619 A | 7/1994 | Page et al. |
| 5,341,477 A | 8/1994 | Pitkin et al. |
| 5,347,632 A | 9/1994 | Filepp et al. |
| 5,355,497 A | 10/1994 | Cohen-Levy et al. |
| 5,367,160 A | 11/1994 | Cohen et al. |
| 5,371,852 A | 12/1994 | Attanasio |
| 5,388,255 A | 2/1995 | Pytlik et al. |

(List continued on next page.)

OTHER PUBLICATIONS

*So . . . Just What is this First Class Thing Anyway?* (visited Oct. 10, 1995) <http://orion.edmonds.wednet.edu/ESD/FC/AboutFC.html>.

Colton, Malcolm, "Replicating Data in a Distributed Enviroment," *IEEE* (1993).

Coulouris et al., "Distributed Transactions," Chapter 14 of *Distributed Systems Concepts and Design 2nd Ed.*, 409–421 (1994).

(List continued on next page.)

*Primary Examiner*—Zarni Maung
(74) *Attorney, Agent, or Firm*—Leydig, Voit & Mayer Ltd.

(57) ABSTRACT

A remote request system and method monitors and controls the execution of remote requests on an on-line services network. When a remotely located client sends a remote request to the on-line service network, the remote request system monitors the remote request while returning operating control back to the client while the remote request remains pending in the on-line service network. The remote request system also provides for the concurrent execution of multiple pending remote requests, provides status information about each remote request, provides for the cancellation of a pending remote request and optimizes the use of memory. In addition, the remote request system dynamically allocates memory when data blocks of unknown size are transmitted over the on-line services network.

19 Claims, 24 Drawing Sheets

U.S. PATENT DOCUMENTS

| | | | |
|---|---|---|---|
| 5,396,626 A | | 3/1995 | Nguyen |
| 5,414,826 A | * | 5/1995 | Garcia ........................ 395/425 |
| 5,423,003 A | | 6/1995 | Berteau |
| 5,434,994 A | | 7/1995 | Shaheen et al. |
| 5,444,848 A | | 8/1995 | Johnson et al. |
| 5,455,932 A | | 10/1995 | Major et al. |
| 5,463,625 A | | 10/1995 | Yasrebi |
| 5,473,599 A | | 12/1995 | Li et al. |
| 5,475,819 A | | 12/1995 | Miller et al. |
| 5,481,720 A | | 1/1996 | Loucks et al. |
| 5,483,652 A | | 1/1996 | Sudama et al. |
| 5,490,270 A | | 2/1996 | Devarakonda et al. |
| 5,491,800 A | | 2/1996 | Goldsmith et al. |
| 5,491,817 A | | 2/1996 | Gopal et al. |
| 5,491,820 A | | 2/1996 | Belove et al. |
| 5,497,463 A | | 3/1996 | Stein et al. |
| 5,499,342 A | | 3/1996 | Kurihara et al. |
| 5,500,929 A | | 3/1996 | Dickinson |
| 5,506,955 A | * | 4/1996 | Chen et al. ............ 395/183.02 |
| 5,513,314 A | | 4/1996 | Kadasamy et al. |
| 5,515,508 A | | 5/1996 | Pettus et al. |
| 5,526,491 A | | 6/1996 | Wei |
| 5,530,852 A | | 6/1996 | Meske et al. |
| 5,544,313 A | | 8/1996 | Shachanai et al. |
| 5,544,327 A | | 8/1996 | Dan et al. |
| 5,548,724 A | | 8/1996 | Akizawa et al. |
| 5,548,726 A | | 8/1996 | Pettus |
| 5,553,239 A | | 9/1996 | Heath et al. |
| 5,553,242 A | | 9/1996 | Russell et al. |
| 5,559,969 A | | 9/1996 | Jennings |
| 5,564,043 A | | 10/1996 | Siefert |
| 5,572,643 A | | 11/1996 | Judson |
| 5,581,753 A | | 12/1996 | Terry et al. |
| 5,592,611 A | | 1/1997 | Midgely et al. |
| 5,596,579 A | | 1/1997 | Yasrebi |
| 5,596,744 A | | 1/1997 | Dao |
| 5,608,865 A | | 3/1997 | Midgely et al. |
| 5,608,903 A | | 3/1997 | Prasad et al. |
| 5,617,568 A | | 4/1997 | Ault et al. |
| 5,617,570 A | | 4/1997 | Russell et al. |
| 5,619,632 A | | 4/1997 | Lamping et al. |
| 5,650,994 A | | 7/1997 | Daley |
| 5,666,519 A | | 9/1997 | Hayden |
| 5,675,723 A | | 10/1997 | Ekrot et al. |
| 5,675,796 A | | 10/1997 | Hodges et al. |
| 5,696,895 A | | 12/1997 | Hemphill |
| 5,774,668 A | * | 6/1998 | Choquier et al. ........... 709/223 |
| 5,933,599 A | * | 8/1999 | Nolan ........................ 709/218 |
| 5,941,947 A | * | 8/1999 | Brown et al. ................ 709/255 |
| 5,956,489 A | * | 9/1999 | San Andres et al. ........ 709/221 |
| 5,956,509 A | * | 9/1999 | Kevner ........................ 395/684 |
| 6,122,754 A | * | 9/2000 | Litwin et al. .................. 714/4 |

OTHER PUBLICATIONS

Cox, John, "Sybase Server to Add Complexity User for Challenge with Data Replication," *Communication* No. 483 (1993).

Custer, Helen, "The Object Manager and Object Security," *Inside Windows NT*, Chapter 3, 40–43, 49–81 (1993).

Eckerson, Wayne, "Users Give Green Light for Replication," *Network World* (Jul. 19, 1993).

Edelstein, Herb, "The Challenge of Replication," *DBMS* vol. 8, No. 4, 68 (Apr. 1995).

Edelstein, Herb, "Microsoft and Sybase are Adding their Unique Touches to SQI Servers," *Information Week*, No. 528, 62 (1995).

Edelstein, Herb, "Replicated Data," *DBMS* vol. 6, No. 6, 59 (Jun. 1993).

Goulde, Michael, "RDBMS Server Choice Gets Tougher," *Network World*, 52 (May 23, 1994).

Heylighen, Francis, "World–Wide Web: A Distributed Hypermedia Paradigm for Global Networking," *Proceedings of the SHARE Europe Spring Conference*, 355–368 (1994).

International Telecommunication Union, *CCITT Blue Book vol. VIII Data Communication Networks Directory*, 3–18 (1989).

King, Adrian, "The User Interface and the Shell," *Inside Windows 95*, Chapter 5 (1994).

Pallatlo, John, "Sybase Lays Out Blue Print for Client/Server Networks," *PC Week*, vol. 9, No. 461, 6 (1992).

PR Newswire Association, Inc., "American On–line Publicly Previews World Wide Web Browser," *Financial New Section* (May 9, 1995).

Quereshi, "The Effect of Workload on the Performance and Availability of Voting Algorithms," *IEEE* (1995).

Rexford, Jennifer, "Window Consisten+Replication for Real–Time Applications," *IEEE* (1994).

Richman, Dan, "Sybase to Enhance RDBMS," *Open System Today*, No. 111 (1992).

Silberschatz, et al., *Operating System Concepts*, $4^{th}$ Ed., 361–380, 431–457 (1994).

Terry, Douglas, "Session Guarantees for Weekly Consistent Replicated Data," *IEEE* (1994).

Wang, Yongdong, Data Replication in a Distributed Heterogenous Database Environment, *IEEE* (1994).

* cited by examiner

| 16-BYTE OLE INTERFACE IDENTIFIER | SINGLE-BYTE SERVICE INTERFACE IDENTIFIER |
|---|---|
| 0BA686B8-F7D3-101A-993E-0000C0EF6F5E | 0X01 |
| 0BA686B9-F7D3-101A-993E-0000C0EF6F5E | 0X02 |
| ⋮ | ⋮ |

EXPORTED INTERFACE LIST

FIG. 4B

SERVICE DATA STRUCTURE

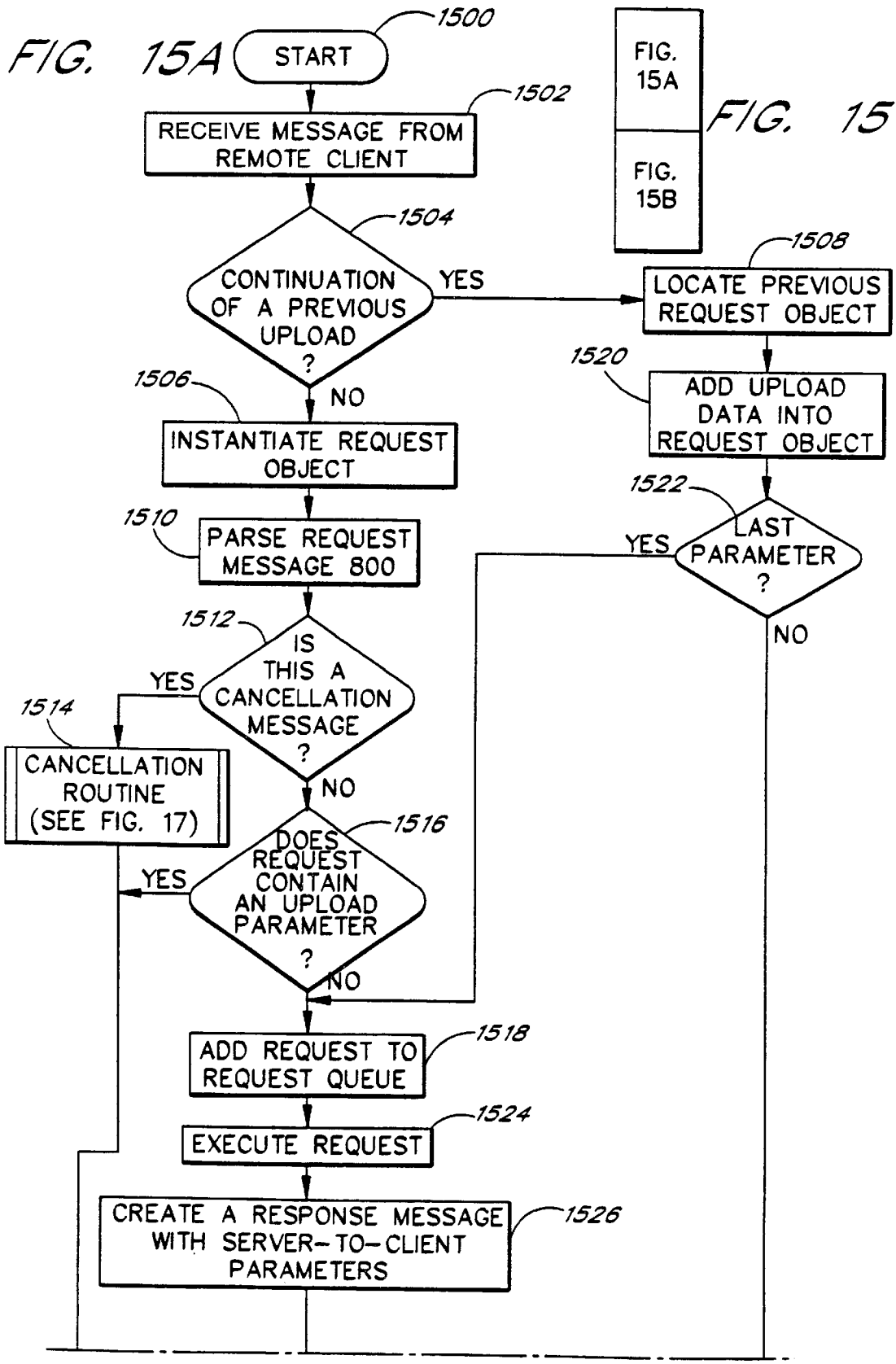

SYSTEM AND METHOD FOR PERFORMING REMOTE REQUESTS WITH AN ON-LINE SERVICE NETWORK

CROSS-REFERENCE TO RELATED APPLICATIONS

This patent is a divisional of U.S. patent application Ser. No. 08/516,184, "System and Method for Performing Remote Requests with an On-Line Service Network," filed Aug. 18, 1995, which is issued on Sep. 21, 1999, as U.S. Pat. No. 5,956,509. Another divisional of that parent issued on Sep. 11, 2001, as U.S. Pat. No. 6,289,390, "System and Method for Performing Remote Requests with an On-Line Service Network."

BACKGROUND OF THE INVENTION

FIELD OF THE INVENTION

This invention relates to on-line network communication systems and, more particularly, to a system for performing remote requests over a wide area network.

BACKGROUND

A common example of network communications is a plurality of personal computers communicating over a network with a remotely located file server. In such systems, the personal computers are called clients and the file server is called a server. The clients access data on the server by sending requests to the server, which carries out the work and sends back the replies. This model is typically referred to as the client-server model.

In the client-server model, communication takes the form of request-response pairs. Conceptually, the request and the response is similar to a program calling a procedure and getting a result. In such cases, the requester initiates an action and waits until the results are available. Ordinarily, when a program calls a local procedure, the procedure runs on the same machine as the program. With a remote procedure call, however, the remote procedure runs on the remotely located server. In order to standardize remote client-server requests, the computer industry has implemented the Remote Procedure Call (RPC).

In conventional systems, remote procedure calls act as if they execute locally. The programmer developing an application invokes a remote procedure just like local procedure calls. Consequently, an application programmer does not need to write software to transmit computational or Input/Output-related requests across a network, to handle network protocols and to deal with network errors. Remote procedure calls handle such tasks automatically.

Conventional remote procedure calls operate within the network architecture connecting the client with the server. In general, networks are organized as a series of layers or levels as defined by the International Standards Organization (ISO) Open Systems Interconnection (OSI) Reference Model. The OSI Reference Model contains seven layers which are called the application layer, the presentation layer, the session layer, the transport layer, the network layer, the data link layer and the physical layer.

In most systems, a library of the remote procedure calls are created and provided to an application programmer. Typically, the remote procedure calls are software routines which the application uses at run time. During the development of an application, the application programmer writes the application software code which contains references to the remote procedure calls. As an application program runs, it invokes a remote procedure call in the dynamic link library and passes a number of parameters to the invoked remote procedure call.

Once invoked, the remote procedure call receives the parameters and marshals them for transmission across the network. Marshaling parameters means ordering them and packaging them in a particular way to suit a network link. In addition, the remote procedure call locates the proper remote computer which executes the remote procedure call, determines the proper transport mechanisms, creates a network message and sends the message to the network transport software. Furthermore, the remote procedure call deals with network errors which may occur and waits for results from the remote server.

When the remote procedure call arrives at the server, the transport layer passes it to the remote procedure calls running on the server. The remote procedure call on the server then unmarshalls the parameters, reconstructs the original procedure call and directs the server to complete the actions requested by the client. After the server has completed its work, the remote procedure call running on the server sends the results back to the client in a similar manner.

While remote procedure calls operate efficiently on fast local area networks, they suffer from several disadvantages when implemented on wide area networks with slow speed communication lines. Local area networks typically transfer data at over ten Megabits per second. A wide area network with slow speed communication lines, on the other hand, typically transfers data over telephone lines via a modem at 28 Kilobits per second or less.

As explained above, conventional remote procedure calls do not return control to the application program until the server has completed a request. Consequently, the client application suspends operations until it receives a response from the server. This may result in substantial delays, for example, when a client application has requested the server to transfer a large block of data. Consequently, unless implemented in a complex multi-threaded manner, the client application waits for a response before the client application executes other remote procedure calls. As a result, the client application wastes processor cycles while waiting for a response from the server.

In many applications, users may request large amounts of data such as audio, multimedia, and large data files. While a remote procedure call allows the transfer of large blocks of data, a conventional remote procedure call fails to provide timely status information about such data transfers. Consequently, the client cannot query the server regarding the status of the requested information. Thus, a system may appear to "hang" when executing a remote procedure call over a wide area network connected by modems to telecommunication lines. Because users typically expect a high degree of user interaction, lack of status information over slower wide area networks means that many users will simply avoid requesting files with large amounts of data.

In addition, to implement remote procedure call systems in multitasking operating systems requires the use of complex multi-threading techniques. A multitasking operating system allows a single personal computer to work on more than one task at one time. For example, a personal computer with a Microsoft Windows operating system can simultaneously run a database program, a word processing program, a spreadsheet, etc.

For example, in a multi-threaded operating system a thread represents one of possibly many subtasks needed to accomplish a job. For example, when a user starts a database application, the operating system initiates a new process for the database application. Now suppose the user requests the generation of a payroll report from the database application. While this request is pending, the user enters another database request such as a request for an accounts receivable report. The operating system treats each request—the payroll report and the accounts receivable report—as separate threads within the database process.

Because conventional operating systems schedule threads for independent execution, both the payroll report and the accounts receivable report can proceed at the same time (concurrently). Accordingly, it is possible to generate multiple pending remote procedure calls by creating an execution thread for each remote procedure call. However, the implementation of a multi-threaded remote procedure call system is very complex and requires a high level of expertise about the operational details of the operating system.

Another deficiency of current remote procedure calls is that they do not allow an efficient cancellation of a pending request sent to a server. In many wide area network applications, a user may wish to download a large block of data and later wish to cancel the request. Over a wide area network, such transfers of large data blocks take a significant amount of time. Current remote procedure calls, however, do not allow the cancellation of pending remote procedure calls. As a result, current remote procedure calls can waste system resources on unwanted requests.

In addition, conventional remote procedure calls typically require the client to allocate enough memory space to hold an entire data block before requesting data from the server. In many multimedia applications, however, the client does not know the size of a data block before it requests the data block from the server. Therefore, in conventional systems, the client typically issues two requests prior to receiving a data block from the server. The first request directs the server to send the size of the data block. The client then uses the data block size to allocate enough memory to hold the data block. The second request then directs the server to download the data block. Two requests, however, increase response times and increase network communication traffic.

Finally, in many instances, a client can immediately begin using incremental data blocks before receiving the entire data block from the server. For example, in some multimedia applications, a client can begin to display incremental data blocks of an image before receiving the entire image. In current remote procedure call systems, however, the client waits until receiving the entire image before attempting to display the image. This leads to delays in using data. Furthermore, since current remote procedure call systems do not allow the use of incremental data blocks, these systems also waste computer memory since the memory cannot be freed for other uses until an entire block of data is received from the server.

SUMMARY OF THE INVENTION

The disadvantages outlined above are overcome by the method and apparatus of the present invention. The present invention provides an enhanced remote request system which optimizes communications over a Wide Area Network. When a remotely located client sends a remote request to a server, the unique remote request system of the present invention creates an internal data structure and returns operating control to the client before completion of the remote request by the server.

Returning operating control to the client before receiving a response from the server, allows the client to perform other tasks while waiting for the response. Thus, when the client requests large amounts data, such as audio, multimedia, and large data files, the client can continue to execute other instructions while waiting for the requested data or results.

Another feature of the present invention provides an internal data structure which allows the client to concurrently execute multiple remote requests within the same thread of execution. Thus, the present invention allows a single thread to issue multiple remote requests without having to determine the status of other requests previously sent to the server. Unlike conventional remote procedure calls which require complex multi-threading techniques to execute more than one remote procedure call at a time, the present remote request system monitors multiple pending requests in a single execution thread and routes a response to the appropriate pending request.

Another feature of the present invention provides a status data structure which monitors the state of each remote procedure request sent to the server. Whenever the client sends or receives data, the present invention updates the status data structure. To obtain current status information, a client application program queries the status data structure. In the preferred embodiment, the status data structure contains information about data sent to the server and data received from the server.

A still further feature of the present invention provides an identification scheme which uniquely identifies each pending remote request. To cancel a pending remote request, the client sends a message to the server which identifies the pending remote request and directs the server to cancel the pending remote request.

Another feature of the present invention provides a dynamic data structure which expands to receive data blocks of unknown size. With the dynamic data structures of the present invention, the client can request a data block of unknown size and allocate memory when the client receives the requested data block.

Furthermore, the present invention optimizes the efficient use of memory by subdividing a large data block into incremental data blocks. The present invention then sends the incremental blocks over the wide area network. As the client receives each incremental data block, the client immediately begins to use the incremental data blocks. Furthermore, as the client uses each incremental data block the client frees the memory for other uses thus optimizing memory usage.

BRIEF DESCRIPTION OF THE DRAWINGS

These and other aspects, advantages, and novel features of the invention will become apparent upon reading the following detailed description and upon reference to accompanying drawings in which:

FIG. 4B is a table illustrating an exported interface list in a preferred embodiment of the present invention;

FIGS. 15A and 15B are flow charts illustrating one embodiment of the routines invoked to receive a remote request, process the remote request and send a response from the service applications back to the client applications;

Figure 1:
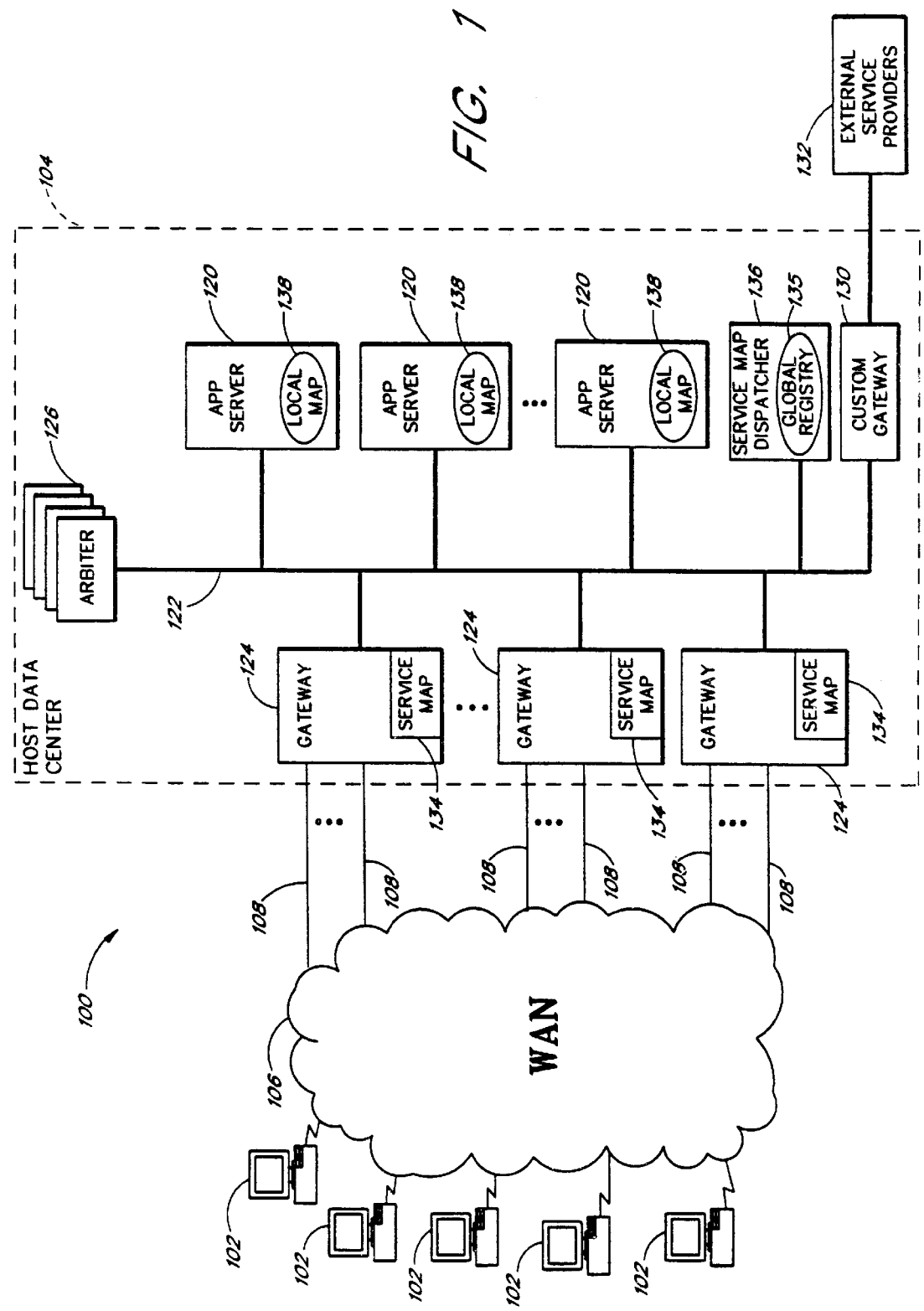
FIG. 1 is a high level drawing illustrating the architecture of an on-line services network in accordance with one embodiment of the invention.

In the drawings, the first digit of any three-digit number indicates the number of the figure in which the element first appears. For example, an element with the reference number 402 first appears in FIG. 4. Where four-digit reference numbers are used, the first two digits indicate the figure number.

DETAILED DESCRIPTION OF THE PREFERRED EMBODIMENTS

The detailed description which follows is broken up into the following three sections: ARCHITECTURAL OVERVIEW, THE MICROSOFT NETWORK PROCEDURE CALL LAYER and THE MICROSOFT NETWORK CONNECTION PROTOCOL.

1. Architectural Overview

FIG. 1 is a high level drawing illustrating the architecture of an on-line services network 100 in accordance with one embodiment of the invention. The on-line services network 100 includes multiple client processors 102 connected to a host data center 104 by one or more wide area networks (WANs) 106. The wide area network 106 of the preferred embodiment includes wide area network (WAN) lines 108 which are provided by one or more telecommunications providers. The wide area network 106 allows client users (i.e., users of the client processors 102) dispersed over a wide geographic area to access the host data center 104 via a modem. The WAN lines 108 preferably include both X.25 lines, ISDN (Integrated Service Digital Network) lines, the Frame Relay interface, or the Transport Control Protocol/Interface Program (TCP/IP) which is a suite of protocols developed for use on the Internet.

The X.25 lines 108 comply with CCITT X.25 specifications which define the protocols for a packet-switched wide area network 106. The letters of the CCITT acronym stand for the Comité Consultatif International de Télégraphique et Téléphonique, an organization based in Geneva, Switzerland. The CCITT recommends use of communications standards that are recognized throughout the world. The X.25 standard documents the interface required to connect a computer to a packet-switched network.

The host data center 104 comprises a plurality of servers 120 connected to a high speed local area network (LAN) 122. Also connected to the local area network 122 are multiple Gateways 124 linking incoming calls from end users to the servers 120. In the preferred embodiment, the servers 120 and the Gateways 124 are Pentium-class (or better) microcomputers which run the Windows NT operating system available from Microsoft Corporation.

The servers 120 typically have at least 128 MB of random-access memory (RAM) and at least 4 GB of disk space. Processing power may vary from server to server. For example, one server 120 may have four 100 Mhz processors, while another server 120 may have one 90 Mhz processor. Each Gateway 124 typically has at least 64 MB of RAM and at least 2 GB of disk space, and is capable of supporting approximately 1000 simultaneous users at T1 (1.544 Mbps) or greater data rates. The local area network 122 is preferably a 100 Mbps LAN based on the CDDI (Copper Distributed Data Interface) standard. The CDDI specification is a variant of the well-known ANSI Fiber Distributed Data Interface specification, but uses a single copper ring instead of a dual fiber ring.

The host data center 104 provides a variety of communications-based and information-based on-line services to client users. Typical services include, for example, a mail service for allowing users to send electronic mail messages to one another, a bulletin board system (BBS) service for allowing users to post and review bulletins on specific topics, a chat service for allowing users to communicate in real time with one another on specific topics, a mediaview service for allowing users to view on-line multimedia titles, an interactive games service for allowing users to compete against one another in real time in on-line interactive games, various news services for allowing users to access news and magazine articles, and a Network Shell for allowing users to view a hierarchy of services and data entities on the network.

The host data center 104 also includes multiple Arbiter microcomputers 126 (hereinafter referred to as "Arbiters") that monitor, record and process certain types of transactions to ensure consistency among servers 120. The host data center 104 also includes one or more custom Gateway microcomputers 130 which link the host data center 104 to one or more external service providers 132, such as a news provider, a stock quote service or a credit card service which validates and executes credit card transactions. Each custom Gateway microcomputer 130 uses the communications protocol required by the external service provider 132 to which the custom Gateway is linked.

The services offered by the on-line services network 100 are in the form of client-server application programs. Each client-server application includes a client portion and a server portion. To facilitate the description that follows, the following terminology and conventions are used. The term "client user" is used to refer to a client processor 102 under the control of an end user. An application executing on a client is called a "client application" and a service running on one or more servers 120 is called a "service application." Names of specific client applications and on-line services are written in capital letters (for example, CHAT or MAIL).

The client applications run on the client processor 102 and the server applications run on the servers 120. In the preferred embodiment, service applications are preferably Windows NT executables running on one or more servers 120. The client applications, on the other hand, are in the form of Windows '95 executables.

During a typical logon session, a client user maintains a communications link with a single Gateway 124, but may access multiple service applications (and thus communicate with multiple servers 120). Accordingly, the Gateway 124 performs protocol translation, translating messages between the protocol of the wide area network 106 and the protocol of the local area network 122 and establishes links between a client processor 102 and a particular server 120.

To initially access a service, the client user initiates a "service session." Each time the user initiates a new service session, the Gateway 124 handling the logon procedure establishes a communications channel via the local area network 122 with the selected server 120. These service sessions may execute concurrently in the same client thread executing on the client processor 102. The Gateway 124 establishes a service instance channel by accessing a service map 134 to select a server 120 which is allocated to the particular service. This service instance channel remains throughout the service session, and passes messages between the Gateway 124 and the server 120 as the client and service applications interact.

In a preferred embodiment, the servers 120 are arranged into service groups, with each service group corresponding to a particular service. Each server 120 of a service group is preferably a "replicated" version of the other servers 120 within the service group, meaning that each runs the same service application as the other servers 120 to implement a common service. For example, the servers 120 within a bulletin board system ("BBS") service group all run a BBS service application.

The service map 134 contains information about the state of every service executing on the servers 120, and the unique identifiers of the servers 120. The service map 134 is preferably generated by a service map dispatcher 136, which may be implemented as a single microcomputer. To generate the service map 134, the service map dispatcher 136 periodically polls the servers 120, prompting the servers to transmit their respective local maps 138 to the service map dispatcher 136. Each local map 138 is generated by the corresponding server 120, and contains the unique identifier of the server and other information about loading and processor type. The service map dispatcher 136 builds the service map 134 from all of the local maps 138 it receives, and then broadcasts the service map 134 to all of the Gateways 124 over the local area network 122.

In addition to generating a service map 134, the service map dispatcher 136 maintains a central repository of information referred to as the "global registry" 135. The global registry 145 contains various information about the present configuration of the host data center 104. For example, for each service group, the global registry 135 indicates the identification codes of the servers 120 of the service group, and the identity of the Arbiter microcomputer 126 (if any) which is assigned to the service group. In other embodiments, the global registry 135 could be maintained by some entity other than the service map dispatcher 136.

In the preferred embodiment, the service map dispatcher 136 broadcasts a new service map 134 every 30 seconds. Each time the service map dispatcher 136 broadcasts a new service map 134, every Gateway 124 receives and locally stores a copy of the new service map 134. The Arbiters 126 also receive and store copies of the service map 134, and use the service map 134 to identify the servers 120 which are currently assigned to service groups.

Figure 2:
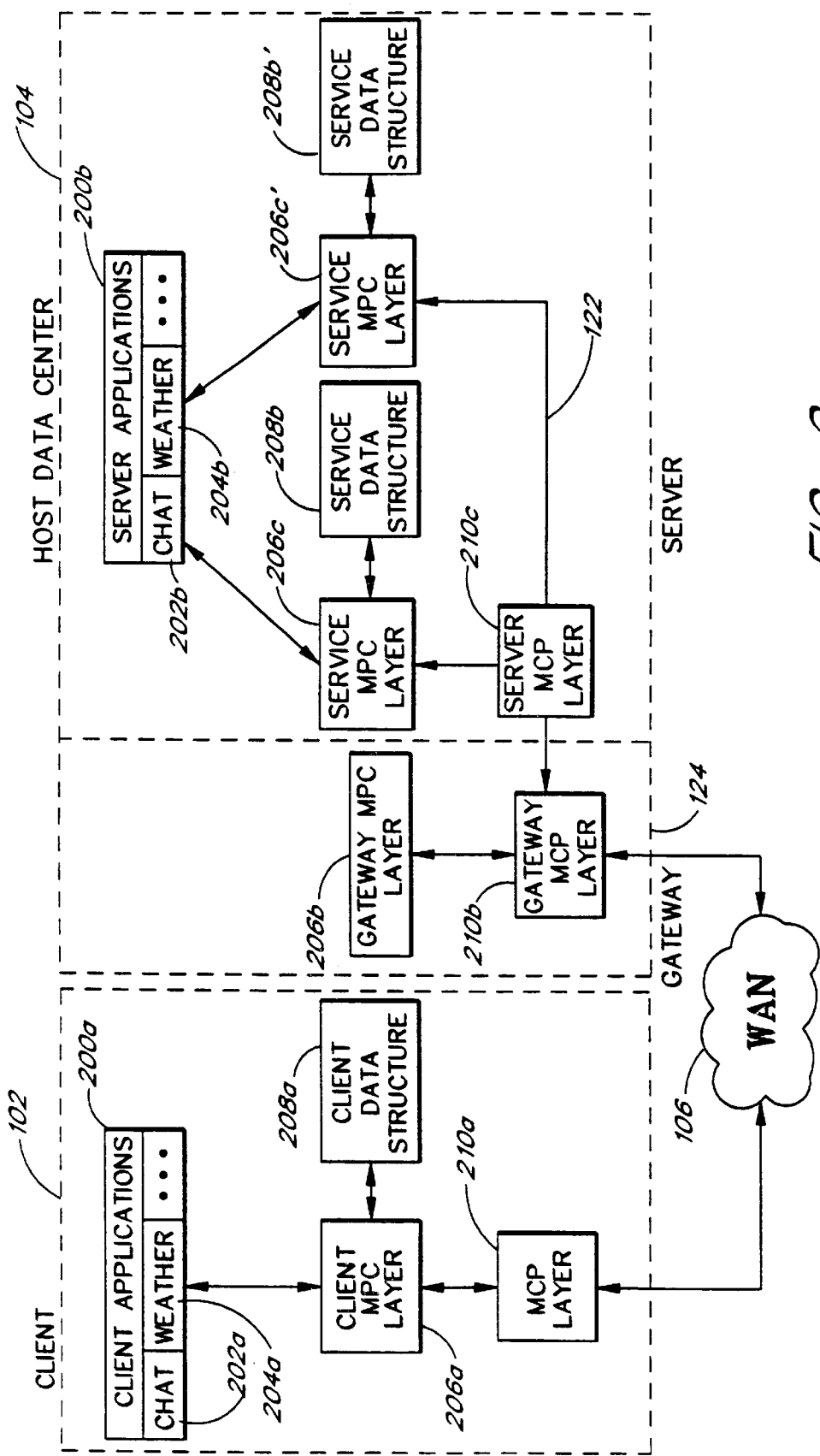
FIG. 2 illustrates a simplified block diagram of a client microcomputer communicating with the host data center in accordance with one embodiment of the present invention.

Referring to FIG. 2, a block diagram of two of client applications 200a communicating with the service applications 200b is shown. The client applications 200a execute on the client processor 102 and the service applications 200b execute on the servers 120. The client applications 200a communicate with the service applications 200b normally in the form of remote requests (i.e., a request which directs a service application 200b running on the server 120 to perform particular actions).

In the present invention, remote requests are managed by a request layer. In the preferred embodiment, the request layer 206 is called the Microsoft Network Procedure Call and is referred to herein as the "MPC layer 206." The MPC layer 206 also includes a client application programming interface ("the client MPC layer 206a"), and a service application programming interface ("the service MPC layer 206b and 206c") for interfacing with client and service applications. The client MPC layer 206a and the service MPC layers 206b and 206c contain a variety of routines which allow the client and service applications to communicate with each other.

The client MPC layer 206a application programming interface resides in a dynamic link library. The dynamic link library contains the set of routines which each application program uses to request and carry out remote requests. For example, as discussed in more detail below, during development of a client application 200a, a programmer writes software that calls or invokes the routines in the client MPC layer 206a. During execution of the program, the application retrieves the desired routine from the client MPC layer 206a dynamic link library and executes the routine like any other software routine. The dynamic link libraries reduce storage space requirements because the dynamic link libraries allow each of the client applications 200a to share the routines in the client MPC layer 206a. The service MPC layer 206b exists in each Gateway 124 and the service MPC layer 206c exists on the servers 120. In the preferred embodiment, the service MPC layer 206b existing in each Gateway 124 and the service MPC layer 206c existing in the servers 120 are identical.

Underneath the MPC layers 206a, 206b and 206c is a transport layer. In the preferred embodiment, the transport layer is called the Microsoft Network Connection Protocol or "MCP layer" and for convenience will be referred to as the MCP layer throughout the application. The MCP layer 210 also includes a client API ("the client MCP 210a") which runs on the client processors 102 and a server API ("the Gateway MCP 210b and the server MPC 210c") which runs on the Gateways 124 and the servers 120. The MCP layer 210 manages client-Gateway-Server communications that support simultaneous service sessions, allowing a client user to access multiple services simultaneously.

The Gateway MCP layer 210b then multiplexes and packetizes the messages and sends the messages over the local area network 122 to the server MCP layer 210c in the servers 120. The server MCP layer 210c in the servers 120, reformats the messages into function calls and passes the function calls to the service MPC layer 206c. As discussed in more detail below, the service MPC layer 206c then directs the service applications 200b such as the CHAT service 202b and the WEATHER service 204b to execute the function calls and send responses back to the client applications 200a.

When sending a response back to the client applications 200a, the service MPC layer 206c formats responses from the CHAT service 202b and the WEATHER service 204b into messages. The service MPC layer 206c then passes the messages to the server MCP layer 210c in that server 120. The server MCP layer 210c multiplexes (and packetizes) the messages and sends the multiplexed data over the local area network 122 to the Gateway MCP layer 210b. The Gateway MCP layer 210b then sends the multiplexed data over the wide area network 106 to the client MCP layer 210a in the client processor 102.

Focusing now on the client processor 102, when receiving a message, the client MCP layer 210a running on the client demultiplexes the messages received via the wide area network 106 and routes the messages to the client MPC layer 206a. The client MPC layer 206a then sets an event which signals the client application 200a that data has been received from the on-line network 104.

Figure 3:
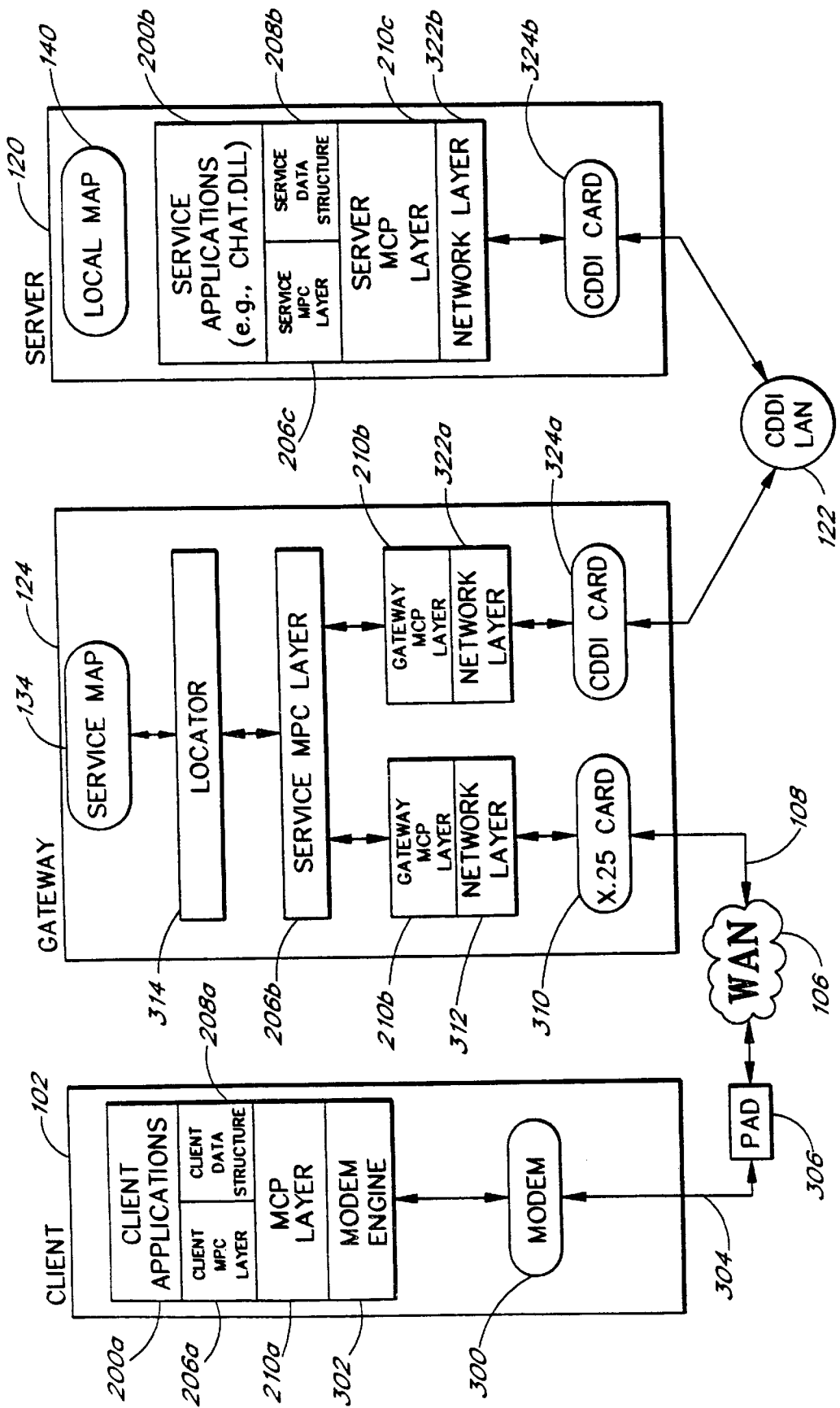
FIG. 3 illustrates the primary software and hardware communications components of one presently preferred embodiment of on-line network of the present invention.

FIG. 3 illustrates a more detailed block diagram of the basic communications components for a preferred embodiment of the on-line services network 100. Assuming the client user accesses the on-line services network 100 by a modem 300, the client MCP layer 210a communicates with a modem engine layer 302, which in-turn communicates with the modem 300. In client microcomputers 102 which do not use a modem, the modem engine layer 302 is replaced with a transport engine layer. The modem 300 communicates over a telephone line 304 with a carrier-provided PAD (packet assembler disassembler) 306, which translates data between a standard modem format and the WAN format (which is X.25 in the FIG. 3 example). At the Gateway 124, an X.25 network card 310 sends and receives data over an X.25 line 108, and communicates with an X.25-specific network layer 312.

The Gateway MCP layer 210b receives the data from the X.25 network card 310, formats the messages and forwards the messages to the service MCP layer 210c. The Gateway 124 also includes a locator program 314 which performs the function of (1) selecting servers 120 for handling requests to open connections with services, and (2) routing the open connection requests so as to distribute processing loads within service groups. (As indicated above, a client-user will typically generate a number of open connection requests throughout a logon session, since the user will typically access multiple services. Additional service requests will normally be generated by the client-user throughout the course of each service session.)

The locator program 314 accesses a locally-stored copy of the service map 134 whenever a request to open a connection is received from a client processor 102. Each time the locator program 314 selects a server 120 to handle a service request, the locator program 314 records various information about the newly created service session (including the selected server's unique identifier) within a service map 134.

The service MPC layer 206c communicates with the server MCP layer 210c. The server MCP layer 210c performs various transport-layer-type functions, such as packetization of message data for transmission over the local area network 122, and multiplexing of message data for transmission over TCP/IP links of the local area network 122. The MCP layers 210b and 210c communicate with Copper Distributed Data Interface local area network layers 322a and 322b, which in-turn communicate with Copper Distributed Data Interface network cards 324a and 324b.

It will be recognized that although the implementation depicted by FIG. 3 uses specific communications protocols various alternative protocols, request layers and transport layers could be used. The MPC layers 206a, 206b and 206c are further described below under the heading THE MPC LAYER while the MCP layers 210a and 210b are further described below under the heading THE MCP LAYER.

2. The Microsoft Network Procedure Call Layer

Client applications 200a make use of a high-level client MPC layer 206a via an application programming interface (API) which is optimized to permit efficient client-server communications over relatively slow/high latency wide area networks 106. In the preferred embodiment, the client contains the client MPC layer 206a while the Gateways 124 and the service applications contain the service MPC layers 206c.

The MPC layers 206a, 206b and 206c are similar to the session layer defined by the International Standards Organization (ISO) Open Systems Interconnection (OSI) Reference Model. The MPC layers 206a, 206b and 206c contain routines which allow the client applications 200a and service applications 200b to send and receive function calls.

In the preferred embodiment, when a programmer develops the client application 200a, the programmer adds software that communicates with the client MPC layer 206a. Furthermore, when a programmer develops the service application 200b, the programmer adds software that communicates with the service MPC layer 206c. For example, to develop the client application 200a, the programmer inserts code that "calls" or invokes the routines in the client MPC layer 206a. The routines in the client MPC layer 206a then execute the necessary instructions to create a remote request and to send the remote request to the other layers in the on-line services network 100. Consequently, the programmer does not need to know the details about the operation of other layers in the on-line services network 100.

In the preferred embodiment, the MPC layers 206a, 206b and 206c do much more than send remote messages to each other. The MPC layers 206a and 206c create internal data structures for monitoring pending remote requests. In addition, the MPC layers 206a and 206c create remote request identifiers which uniquely identify each remote request. The MPC layers 206a and 206c use the identifiers to properly route the remote requests to their proper destinations.

As described in more detail below, the MPC layers 206a, 206b and 206c, in the present invention, are compatible with the Object Linking and Embedding (OLE) 2.0 architecture defined by Microsoft Corporation. The Object Linking and Embedding (OLE) 2.0 architecture routine is well known in the art, and is described in OLE 2 Programmer's Reference Vol. I, Microsoft Press, 1993, and in OLE 2 Programmer's Reference Vol. II, Microsoft Press, 1993. Also, while the following description describes the MPC layers 206a, 206b and 206c in object-oriented terminology, a person of ordinary skill in the art will appreciate that other programming techniques can be used to implement the MPC layers 206a, 206b and 206c without using an object-oriented programming language.

Figure 4A:
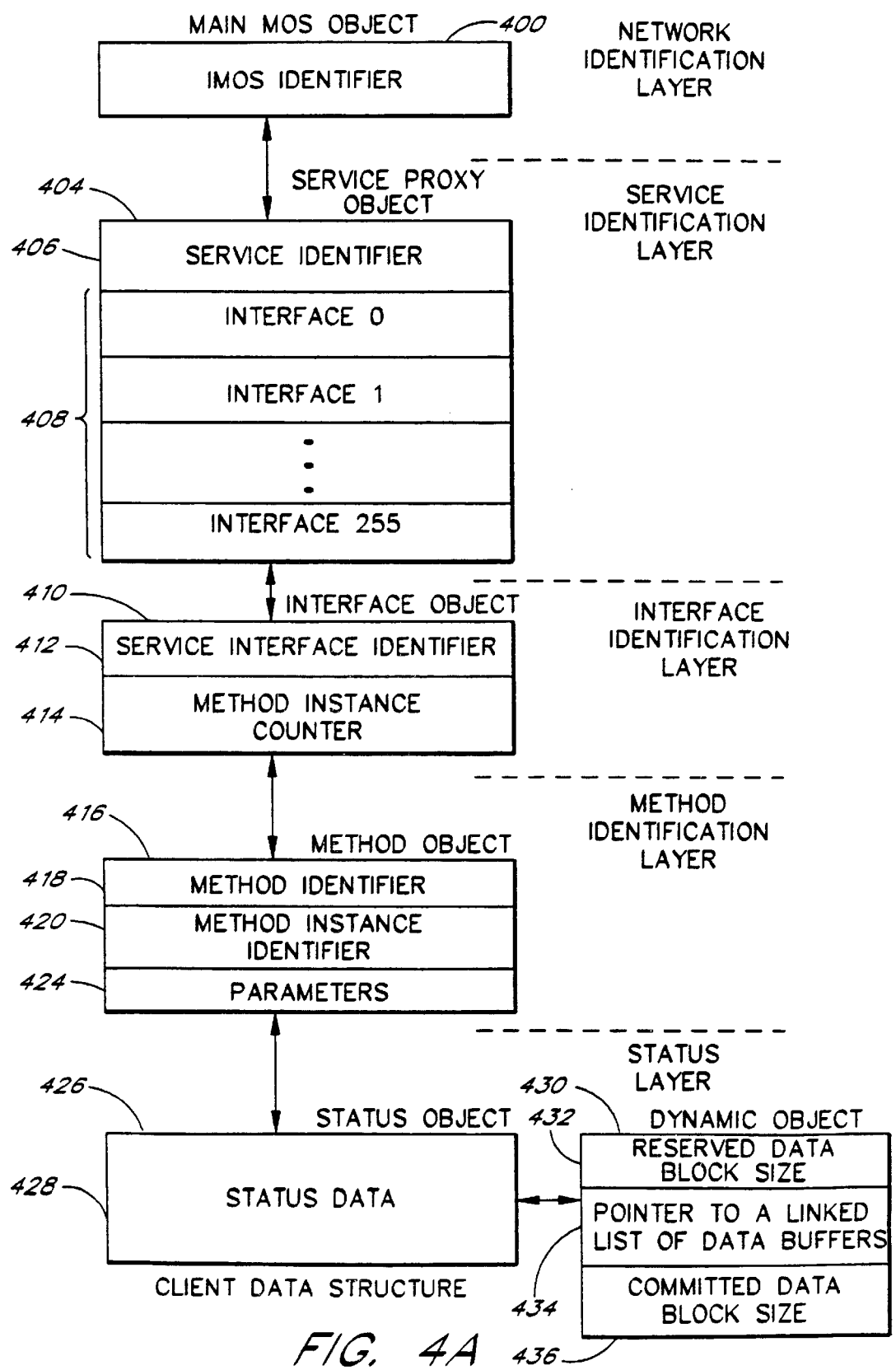
FIG. 4A is a block diagram illustrating a preferred embodiment of the client data structure used in the present invention.
Figure 5:
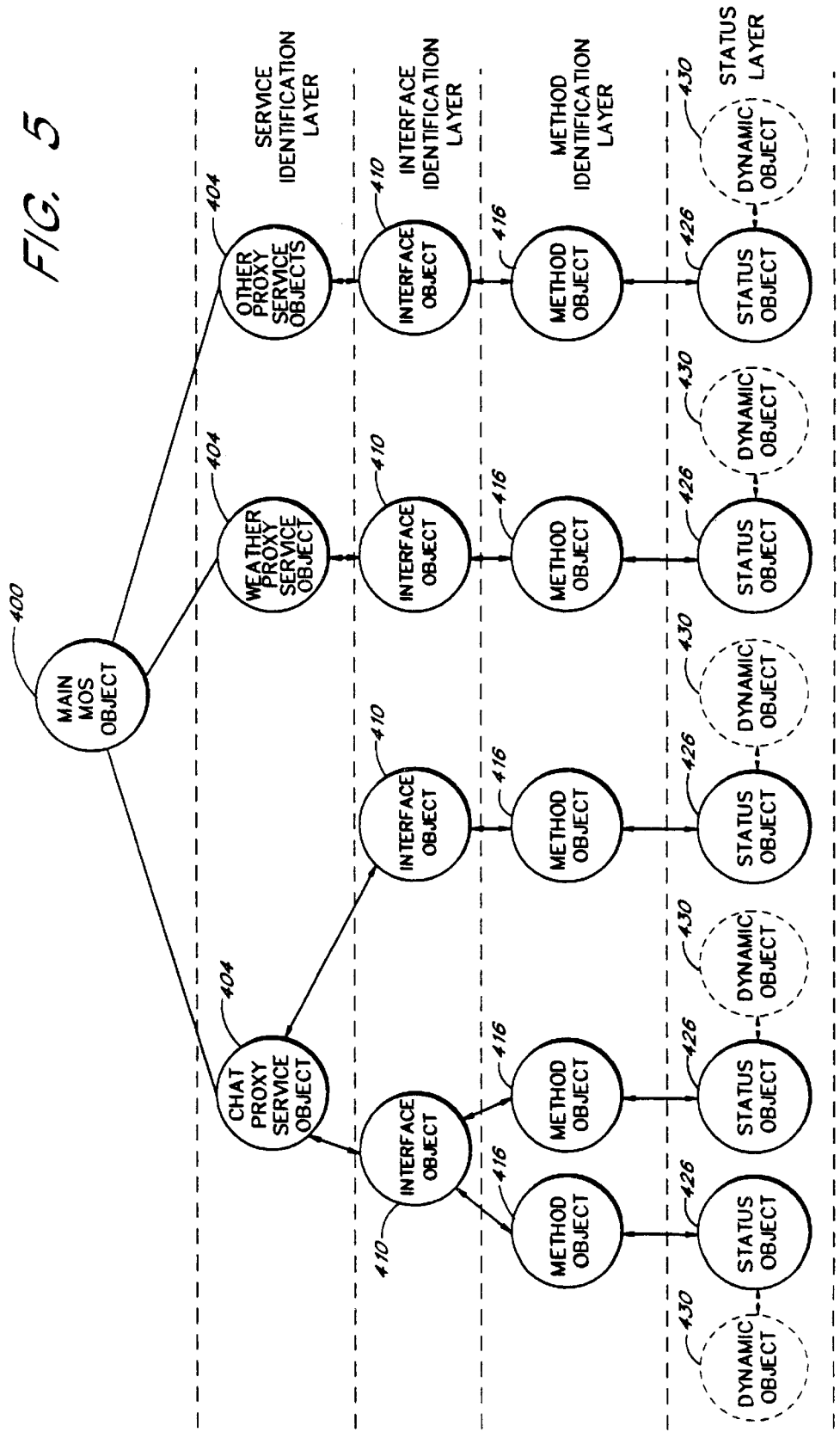
FIG. 5 is a detailed block diagram illustrating a client data structure used with multiple pending remote requests in the preferred embodiment of the present invention.

Focusing now on the client MPC layer 206a, FIGS. 4A and 5 show the unique client data structure created by the client MPC layer 206a in the present invention. The client MPC layer 206a creates the client data structure 208a to monitor each remote request sent to the host data center 104. The client data structure 208a, in the preferred embodiment, is a binary tree.

The first layer of the client data structure 208a identifies the on-line services network 100 with a Main MOS object 400 (the MOS acronym stands for the Microsoft On-line Service). The Main MOS object 400 has assigned to it an Object Linking and Embedding (OLE) Main MOS identifier 402 which uniquely identifies the Main MOS object 400 from other Object Linking and Embedding (OLE) objects. In the preferred embodiment, the Main MOS identifier 402 is a 16 byte number which is assigned by the Microsoft Corporation.

The second layer in FIG. 4A, contains a service proxy object 404 which stores information about a particular service existing on the on-line services network 100. For example, a service proxy object 404 for the CHAT service contains information about the CHAT service 202b. The service information stored in the service proxy object 404 includes a service identifier 406 and an exported interface list 408. In the presently preferred embodiment, the Main MOS object 400 can point to many service proxy objects 404. The number of service proxy objects 404 is only limited by the storage capabilities of the local processor 102.

As discussed in more detail below, each service proxy object 404 is created when a client user invokes a particular client application 200a such as the client CHAT application 202a or the client WEATHER application 204a, etc. The service identifier 406 is predefined by the on-line network provider.

In the preferred embodiment, a remote request is submitted to the service applications by calling a function also known as a method that exists in the service MPC layer 206c. The list of service requests for the CHAT service 202b, for example, might contain methods for posting comments, methods for reading comments and so on. All of the methods for a client and service application 200a and 200b are organized into interfaces.

Interfaces organize methods into groups. Thus, each interface is a group of methods. In the preferred embodiment, each interface contains a group of up to 256 methods. Because an application may have more than one interface, the interfaces are further organized into an exported interface list 408. As shown in FIG. 4A, the exported interface list 408 in the preferred embodiment contains up to 220 interfaces. Thus, in the present invention, each service application 200b offers up to a maximum of 66,320 methods (220 interfaces×256 methods=62,500 methods). The different interfaces and the methods within each interface are implemented by the service application software developer.

As explained in more detail below, the exported interface list 408 is downloaded or exported to the client MPC layer 206a after connection with the service MPC layer 206c is established. As shown in FIG. 4B, the exported interface list 408 is a two-column table with multiple rows. Each row corresponds to one of the interfaces in the service application 202. The first column contains a 16-byte OLE interface identifier for each interface in the service application 202. The second column contains a list of corresponding one-byte service interface identifiers 412. The present invention uses the exported interface list 408 to convert OLE 16-byte interface identifiers into their corresponding one-byte service interface identifiers 412.

Referring now to FIG. 4A, the next level of the client data structure 208a contains an interface object 410 which is instantiated when the client application 200a has successfully established a connection with the service application 200b. The interface object 410 contains a service interface identifier 412 and a method instance counter 414. In the presently preferred embodiment, each service proxy object 404 can point to as many interface objects 410 as have been exported by the service application 200b.

The service interface identifier 412 identifies a particular interface in the exported interface list 408. As shown in FIG. 4B, the exported interface list 408 numerically lists each interface, thus the first interface is identified with the number one, the next interface is identified with the number two, and so on. The single-byte service interface identifier 412 references up to 220 interfaces in the exported interface list 408. Thus, the service interface identifier 412 identifies the interface containing a particular method. For example, if the "post comment" method in the CHAT client application 202a exists in the first exported interface, the interface identifier is set to one.

In one embodiment of the present invention, the interface objects for each service are identified with 16-byte Object Linking and Embedding (OLE) interface identifiers. During development of an application program, a programmer assigns the 16-byte Object Linking and Embedding identification codes which correspond to the service interface identifiers 412. The preferred embodiment of the present invention, reduces the 16-byte Object Linking and Embedding (OLE) interface identifier into a single byte based on the corresponding single-byte service interface identifiers 412 in the exported interface list 408. Thus, in the preferred embodiment, the service interface identifier 412 is a single-byte number which ranges from one to 220.

The interface object 410 also stores the method instance counter 414. In the present invention, an application can invoke identical, concurrently pending methods. This is best illustrated by an example, if a user desires to post two different comments on the CHAT service 202b. The client MPC layer 206a uses the same "post comment" request twice, but combines each "post comment" request with different comment data. The first "post comment" request is called the first instance, while the second "post comment" request is called the second instance. A method instance counter, therefore, counts the number of times the client MPC layer 206a has used a method within an interface.

In the preferred embodiment, the value of the incremented method instance counter 414 is stored as a method instance identifier 420 in the method object 416. Each method instance identifier 420 is represented as a four byte number. As discussed in more detail below, the method instance identifier 420 is sent to the service MPC layer 206c as a variable length value. In the preferred embodiment, the first two bits of the method instance identifier 420 indicate whether the method instance identifier 420 should be transmitted as a one, two, three or four byte number.

For example, the first time the client CHAT application 202a requests a "post comment" method, the method instance counter 414 is incremented to one and the value of the method instance counter 414 is stored as the method instance identifier 420. Since the value of the method instance counter is one, the first two bits of the instance identifier are set to zero. Thus, when the instance identifier is transmitted to the service MPC layer 206c, the instance identifier is sent as a single byte value.

The next level of the client data structure 208a contains a method object 416. Each method object 416 corresponds to a particular remote request. In the preferred embodiment, each interface object 410 can point to as many method objects 416 as memory will permit. As discussed in more detail below, when a client application 200a sends a remote request to the service application 200b, the client MPC layer 206a instantiates a method object 416 which corresponds to the remote request. For example, when the client CHAT application 202a generates a "post comment" remote request, the client MPC layer 206a instantiates a method object 416 which represents a "post comment" request.

In the preferred embodiment, when the client MPC layer 206a instantiates the method object 416, the client MPC layer 206a creates a method identifier 418 and the parameters 424 associated with the method object 416. The present invention uses the service interface identifier 412, the method identifier 418 and the method instance identifier 420 to uniquely identify each remote request.

The parameters 424 contain data related to the remote request or indicate that parameters are expected to be returned from a service application 200b. As explained in more detail below, when all of the parameters 424 have been added to the method object 416, the client application 200a can direct the client MPC layer 206a to issue the request to the service MPC layer 206c.

The method identifier 418 is a single-byte number. Like the interfaces, each method is numbered based on the location of the method in an interface. The initial method is identified with the number zero, the next method is identified with the number one and so on. Thus the single-byte method identifier 418 ranges from zero to 255.

If the client MPC layer 206a were to embed Object Linking and Embedding (OLE) interface identifiers in the messages sent to the service MPC layer 206c, the present invention would need up to 21 bytes of information to identify each remote request including 16 bytes to identify the interface, one byte to identify the method and four bytes to identify the method instance. The preferred embodiment, in contrast, typically uses three bytes (at most six bytes) to identify a particular remote request, one byte for the service interface identifier 412, one byte for the method identifier 418 and typically one byte for the method instance identifier 420. As explained above, the method instance identifier 420 is typically a one byte value, but can expand up to a four byte value. Thus, the single-byte service interface identifier 412, the single-byte method identifier 418 and the variable sized method instance identifier 420 significantly reduce the amount of data which uniquely identifies each remote request. In addition, the identifiers allow the present invention to monitor and track the requests sent to the service applications 200b.

The next layer of the client data structure 208a contains a status object 426 and an optional dynamic object 430. In the presently preferred embodiment, a method object 416 points to only one status object 426. The status object 426 points to its corresponding method object 416 and contains status data 428. The status data 428 holds remote request information. In the preferred embodiment, the status data 428 stores the amount of data sent to the service application 200b and the amount of data received from the service application 200b.

Associated with the status object 426 is an optional dynamic object 430. In the presently preferred embodiment, a status object 426 points to only one dynamic object 430. The dynamic object 430 points to its corresponding status object and is used to receive dynamic data. As discussed in more detail below, the dynamic object 430 contains the reserved data block size 432, the committed data block size 436 and a pointer to a linked list of data buffers 434.

The present invention reserves and commits memory when needed. The client MPC layer 206a reserves memory by notifying the operating system that the client MPC layer 206a needs a block of memory. Reserving memory is a fast and efficient operation because the operating system reserves the block of virtual memory addresses in its virtual memory map. Committing memory is the process of actually storing the data in the reserved block of memory. When committing memory, the operating system allocates a physical memory space for the virtual memory addresses and stores the data in the committed physical memory space. As discussed in more detail below, the dynamic object 430 stores the amount of reserved memory in the reserved data block size 432. The dynamic object stores the amount of the committed memory in the committed data block size 436.

As shown in FIG. 5, the client data structure 208a can contain many service proxy objects 404, interface objects 410, method objects 416, status objects 426 and dynamic objects 430. The Main MOS object 400 contains a list of pointers to the service proxy objects 404. The service proxy objects 404 contain a list of pointers to the interface objects 410. The interface objects contain a list of pointers to the method objects 416. Each method object 416 contains a pointer to a status object 426 and the status object 426 contains a pointer to the dynamic objects 430.

Figure 6:
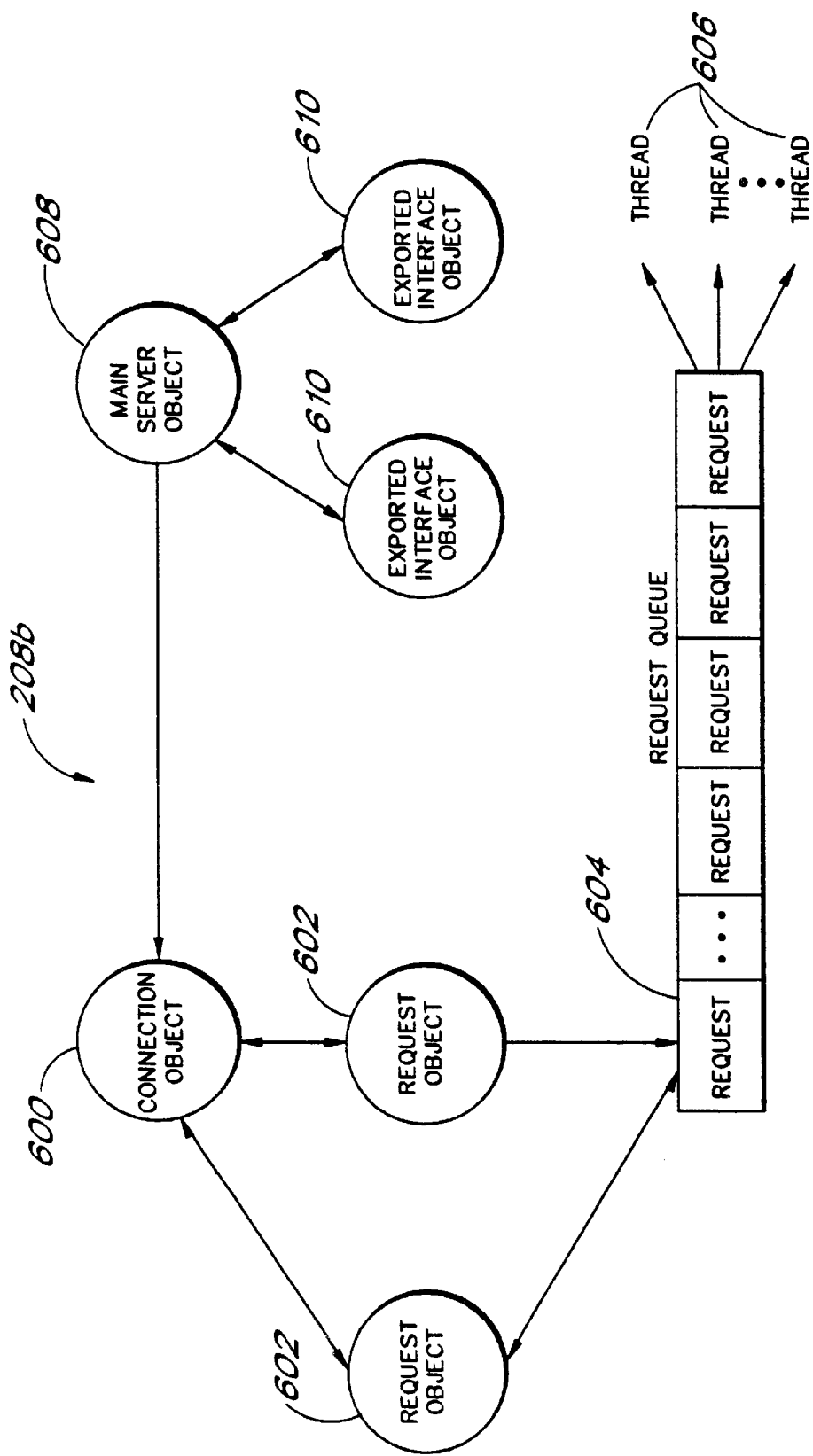
FIG. 6 is a block diagram illustrating a preferred embodiment of the server data structure used in the present invention.

Referring now to FIG. 6, the service data structure 208b of the preferred embodiment is shown. The server data structure contains the main server object 608, the exported interface objects 610, a connection object 600, request objects 602, a request queue 604 and service threads 606. The main server object 608 contains pointers to the exported interface objects 610 and the connection object 600. The exported interface objects 610 contain implementations of the remote request methods.

The connection object 600 is instantiated when the client MPC layer 206a opens a connection to a service application 200b. A connection is a communications channel that a client uses to issue remote requests and to pass information to a particular service application 200b executing on the servers 120. The connection object 600 connects two processes (the client MPC layer 206a with the service MPC layer 206c) so that the output of one can be used as the input to the other.

Figure 7:
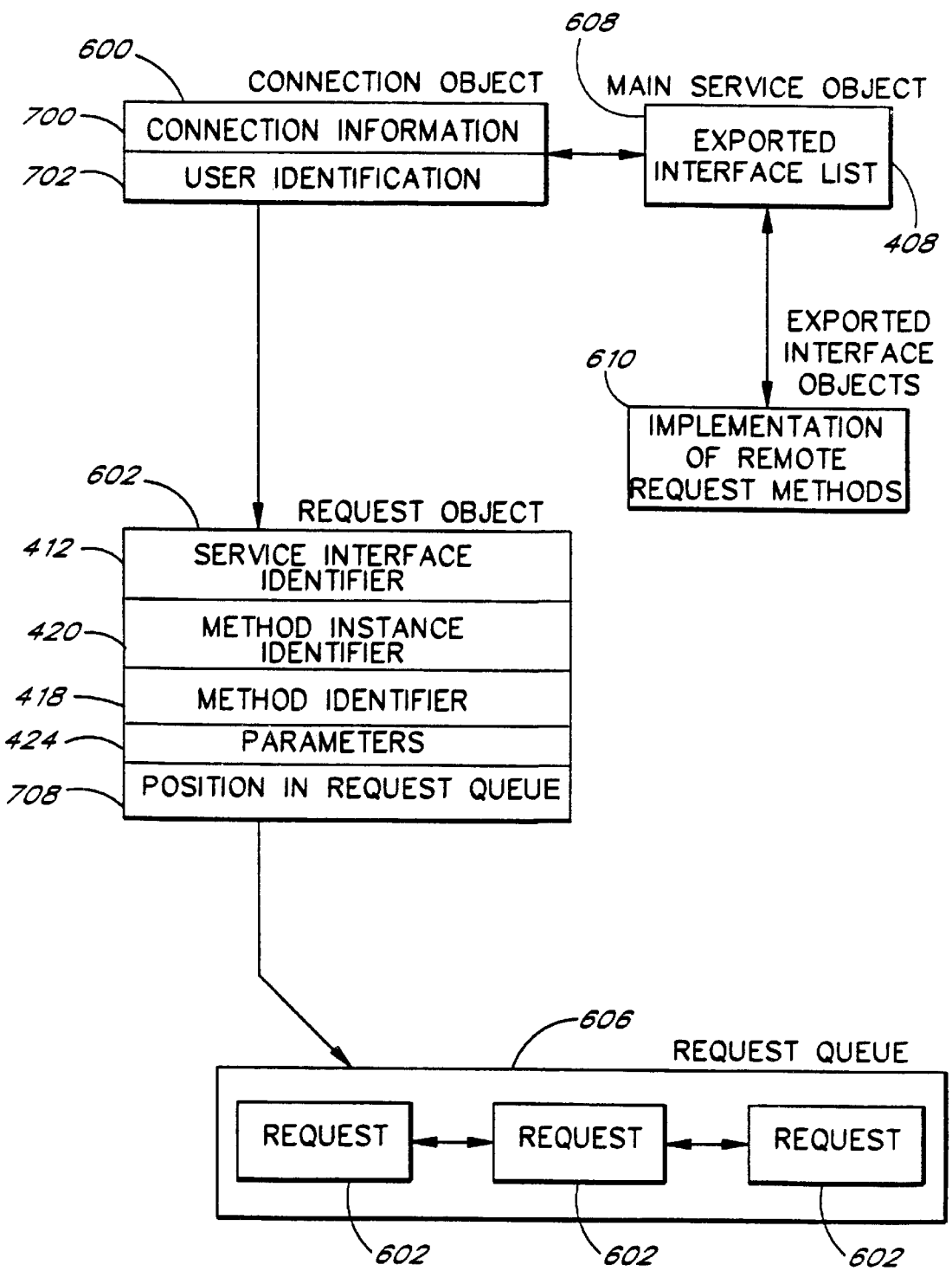
FIG. 7 is a detailed block diagram illustrating a server data structure used with multiple pending remote requests in the preferred embodiment of the present invention.

As illustrated in FIG. 7, the main server object 608 contains the exported interface list 408 and pointers to the exported interface objects 610. The exported interface objects 610 contain the implementation of the remote request methods, The connection object 600 contains the connection information 700 and user identification information 702.

The connection information 700 contains data identifying the particular connection with the client MPC layer 206*a*. The user identification information 702 contains information about the particular client user. In the preferred embodiment, multiple connection objects 600 can exist. Each connection object 600 represents a different client process that communicates with the service MPC layer 206*c*.

As explained in more detail below, when a remote request message is received by the service MPC layer 206*c*, the service MPC layer instantiates the request object 602. The service MPC layer parses the remote request message and stores the values of the service interface identifier 412, the method instance identifier 420, the method identifier 418, the parameters 424 in the request object 602. Furthermore, the request object 602 is added to the request queue 604. The request queue 604 is a linked list of request objects 602. When a service thread 606 is ready for another request, the service thread 606 retrieves the next request from the request queue 604.

This unique implementation greatly improves remote request processing. Unlike conventional systems, the present invention does not attempt to start a new service thread 606 each time a request is received. Further, the present invention does not reject a request if all of the service threads 606 are unavailable. Instead, the present invention uses only a few service threads 606 (typically less than ten) to efficiently service many thousands of requests.

Referring now to FIGS. 8A, 8B and 8C remote request messages 800*a* and 800*b* are shown. The MPC layers 206*a*, 206*b* and 206*c* communicate by sending the messages 800*a* and 800*b*. As shown in FIG. 8A, each message 800*a* comprises a header 802 and multiple parameters 804. In the preferred embodiment, each message 800*a* contains one header 802 and up to 16 parameters 804.

In order to properly route the messages 800*a*, the MPC layers 206*a* and 206*c* use the header 802 to identify the remote request associated with the message 800*a*. As illustrated in FIG. 8B, the header 802 contains the service interface identifier 412, the method identifier 418 and the method instance identifier 420. The MPC layers 206*a* and 206*c* build the message header 802 by retrieving the service interface identifier 412, the method identifier 418 and the method instance identifier 420 from the method object 416.

As explained above, the service interface identifier 412 and the method identifier 418 are single-byte numbers. The method instance identifier 420 ranges from one to four bytes. After creating the header 802, the client MPC layer 206*a* attaches up to 16 parameters 804 to the header 802. Each parameter 804 contains a type field 806, an optional length of memory block field 808 and a data field 810.

TABLE 1

| TYPE FIELD VALUES | DEFINED MEANING |
|---|---|
| 0x01h | Byte Parameter Sent From Client To Server |
| 0x02h | Word Parameter Sent From Client To Server |
| 0x03h | Double Word Parameter Sent From Client To Server |
| 0x04h | Data Blocks Less Than 400 Bytes Sent From Client To Server |
| 0x05h | Data Blocks Greater Than 400 Bytes Sent From the Client To Server |
| 0x0Fh | Client To Server Cancellation Message |
| 0x81h | Byte Parameter Sent From Server To Client |
| 0x82h | Word Pararneter Sent From Server To Client |
| 0x83h | Double Word Pararneter Sent From Server To Client |
| 0x84h | Data Block Sent From Server To Client |
| 0x8Sh | Dynarnic Data Sent Frotn Server To Client |
| 0x86h | End of Dynamic Data Sent Frorn Server To Client |
| 0x87h | Last Pararneter Sent From Server To Client |
| 0x89h | Server To Client Error Message |

Table 1

Table 1 illustrates the values of the type field 806 in the preferred embodiment. The values of the type field 806 are shown in a hexadecimal format. The type field 806 is a one-byte field which indicates the type of data located in the data field 810. In addition, the type field indicates the destination of the data parameter 804. Thus, the type field can specify that a data parameter is traveling from the client MPC layer 206*a* to the service MPC layer 206*c* or vice versa. For example, a type field 806 value of 0x01h indicates that a byte parameter is being sent from the client MPC layer 206*a* to the service MPC layer 206*c*.

In the preferred embodiment, the parameters 804 sent from the client MPC layer 206*a* to the service MPC layer 206*c* include four data types: bytes, words, doublewords and data blocks. The parameters 804 sent from the service MPC layer 206*c* to the client MPC layer 206*a* include five data types: bytes, words, doublewords, data blocks and dynamic data. The optional length of memory block field 808 only exists in the message 800*a* when a memory block is sent from the client to the server. Thus, as shown in table 1, when the type field value is set to 0x04h, the client is sending a memory block from the client to the server and the value in the length of memory block field 808 indicates the size of the memory block.

The length of memory block field 808 indicates the size of the memory block. For example, when the client MPC layer 206*a* sends a data block to the service MPC layer 206*c*, the type field 806 is set to 0x04h, the length of memory block field 808 contains the size of the data block and the data field 810 contains the transmitted data block.

Furthermore, as discussed in more detail below, a type field 806 with the value of 0x04h indicates that a data block sent from the client MPC layer 206*a* to the service MPC layer 206*c* is less than 400 bytes, and accordingly, the length of memory block field 808 contains a value that is less than 400 bytes. When the memory block in a client MPC layer 206*a* to service MPC layer 206*c* transfer exceeds 400 bytes, the type field 806 is set to 0x05h and the present invention subdivides the memory block into multiple upload messages 800*b*. As explained in further detail below, subdividing a large memory block into multiple messages allows the present invention to cancel a pending remote request before completion of the memory block transfer.

The data field 810 is a variable-length field which contains the parameters and data identified in the type field 806. For example, if the client MPC layer 206*a* sends a doubleword to the service MPC layer 206*c*, the type field 806 is loaded with the value 0x83h, and the data field 810 contains the doubleword.

When the message 800*a* is received by the MPC layers 206*a* and 206*c*, they use the header 802 to identify the remote request and to route the remote request to its proper destination. As is explained in more detail below, the unique message 800*a* format of the present invention allows the MPC layers 206a and 206c to monitor multiple remote requests, to return control to applications after generating or receiving a remote request, to cancel a pending remote request, to maintain status information, to efficiently use memory, and to support the dynamic allocation of memory.

When the client MPC layer 206a sends a memory block parameter greater than 400 bytes, the client MPC layer 206a subdivides the memory block parameter into one message 800a and multiple messages 800b. As shown in FIG. 8B, the first message 800a contains the header 802, a type field 806 set to 0x05, an upload parameter identifier 814 and the length of memory block field 808. The upload parameter identifier 814 uniquely identifies all the messages 800b that correspond to the memory block parameter. When a subsequent upload message 800b is sent with additional incremental data, the upload message 800b contains the data shown in FIG. 8C.

As illustrated in FIG. 8C, the beginning of each upload message 800b contains an upload field 812 rather than the header 802. In the preferred embodiment, the upload field 812 in the upload message 800b contains the value 0xE6h (230) if the upload message 800b is a continuation of an upload message 800b. Furthermore, the last upload message 800b for the particular parameter identified by the upload parameter identifier 812 contains the value 0xE7h (231) in the upload field 812. Because the upload field 812 in the upload message 800b is in the same location as the service interface identifier 412 in the messages 800a, the service interface identifiers 412 must have values less than 230 (0xE6h). If set to 230, the present invention would mistake a regular message 800a as the upload message 800b. In the preferred embodiment, the service interface identifiers 412 contain the values of 220 or less.

In addition, each upload message 800b contains the upload parameter identifier 814 which identifies the memory block parameter being transmitted in the upload message 800b. The upload message 800b also contains the data field 810 which contains the incremental data.

a. Generating A Remote Request

Figure 9:
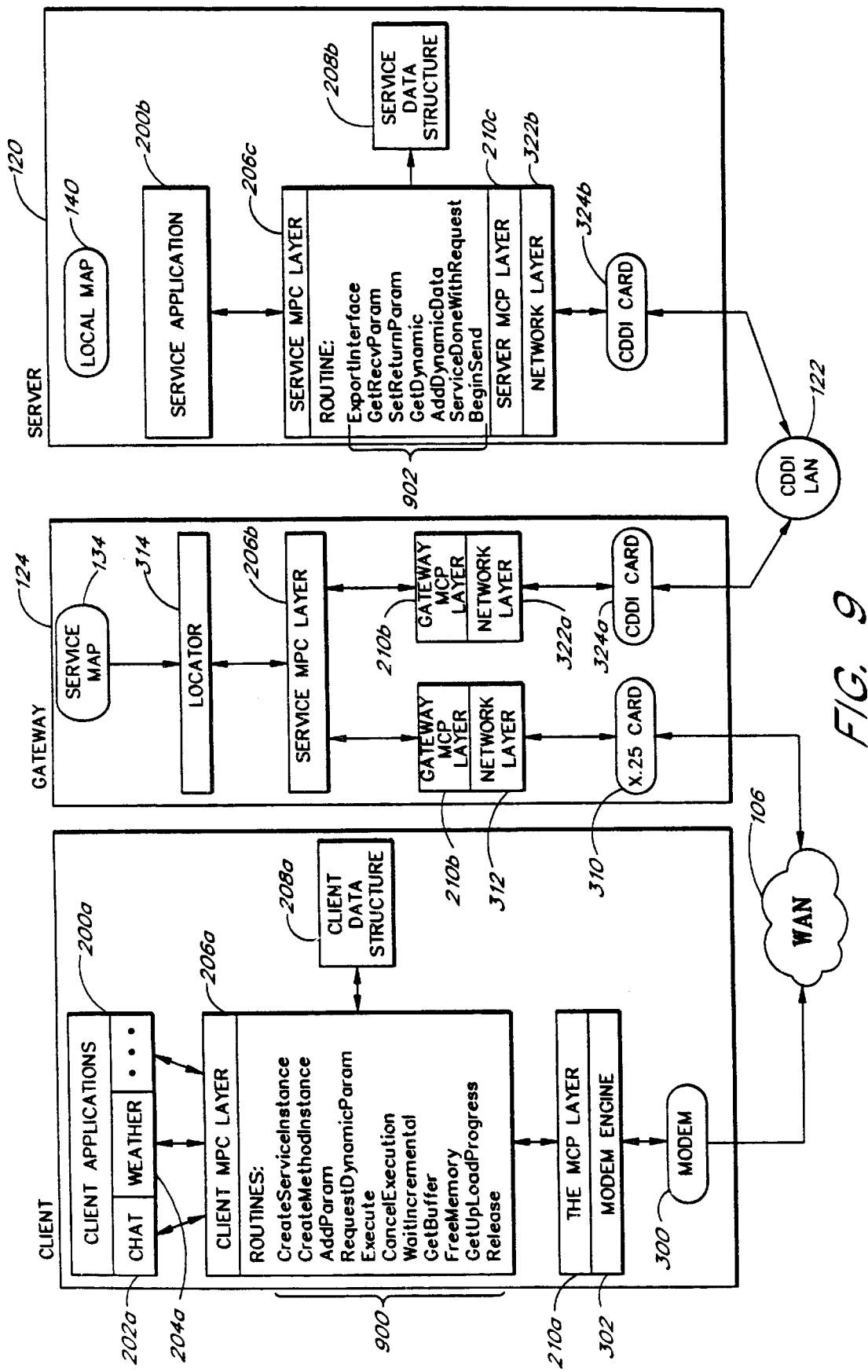
FIG. 9 is a block diagram illustrating the routines used to send and receive remote requests.

Referring now to FIG. 9, a block diagram of routines in the MPC layers 206a and 206c are shown. As described in further detail below, when a particular client application 200a generates a remote request, the client application 200a "calls" a routine in the client MPC layer 206a. In the preferred embodiment, the client MPC layer 206a is a library of routines that contain the instructions for sending a remote request to the service MPC layer 206c. Thus, a client application 200a calls a particular routine in the client MPC layer 206a when the name of the routine appears in the program code. The name of the routine is inserted into the program code by a programmer during development of the client application 200a.

The names of the routines 900 existing in the client MPC layer 206a that implement the novel features of the present invention include: CreateServiceInstance, CreateMethodInstance, AddParam, RequestDynamicParam, Execute, CancelExecution, WaitIncremental, GetBuffer, and FreeMemory. Each of these routines is further discussed below.

The names of the routines 902 existing in the service MPC layer 206c that implement the novel features of the present invention include: the ExportInterface, GetRecvParam, SetReturnParam, GetDynamic, AddDynamicData, ServiceDoneWithRequest and BeginSend. Each of these routines are further discussed below.

Focusing now on the routines in the client MPC layer 206a, the client applications 200a use the routines in the client MPC layer 206a to generate and monitor pending remote requests. Once a routine in the client MPC layer 206a has sent the request messages 800a or 800b to the service MPC layer 206c, control is passed back to the client application 200a which then continues to execute other program instructions.

When the client processor 102 receives a response message 800a associated with a pending remote request, the response message is routed to the service proxy object 404. The service proxy object 404 then obtains the service interface identifier 412 from the message header 802 and routes the response message 800a to the identified interface object 410. The interface object 410 then obtains the method identifier 418 and the method instance identifier 420 from the message header 802 and routes the response message 800a to the identified method object 416. The method object 416 then obtains the parameters 804 from the response message 800a and stores the parameters 804 in the memory locations created for the parameters 804 by the original client application 200a.

A static block is not processed incrementally. A dynamic block, in contrast, can be processed incrementally as it is received. When the client MPC layer 206a receives a static block or a dynamic block from the service MPC layer 206c, however, the client MPC layer stores the static blocks and dynamic blocks in a different manner than the other parameters 804. In the preferred embodiment, as discussed in more detail below, the memory to store the static block is not committed until the static block is received from the service MPC layer 206c.

In the preferred embodiment, the client application 200a can also direct the client MPC layer 206a to request a dynamic data block. When client MPC layer 206a begins receiving the requested dynamic data block, the client MPC layer 206a instantiates a dynamic object 430. Dynamic data blocks are sent from the service MPC layer 206c to the client MPC layer 206a in incremental segments. As discussed below, the dynamic object 430 receives these incremental segments and stores them in the client computer 102.

After routing the parameters 804 to the appropriate memory locations, the client MPC layer 206a updates the status object 426 to signal that an event has occurred. The client application 200a periodically checks for a signaled event and once a signaled event occurs, the client application 200a can begin using the received parameters. Thus, signaling an event in the status object 426 provides the communication mechanism between the client MPC layer 206a and the client application 200a when parameters 804 are received from the service MPC layer 206c.

Figure 10:
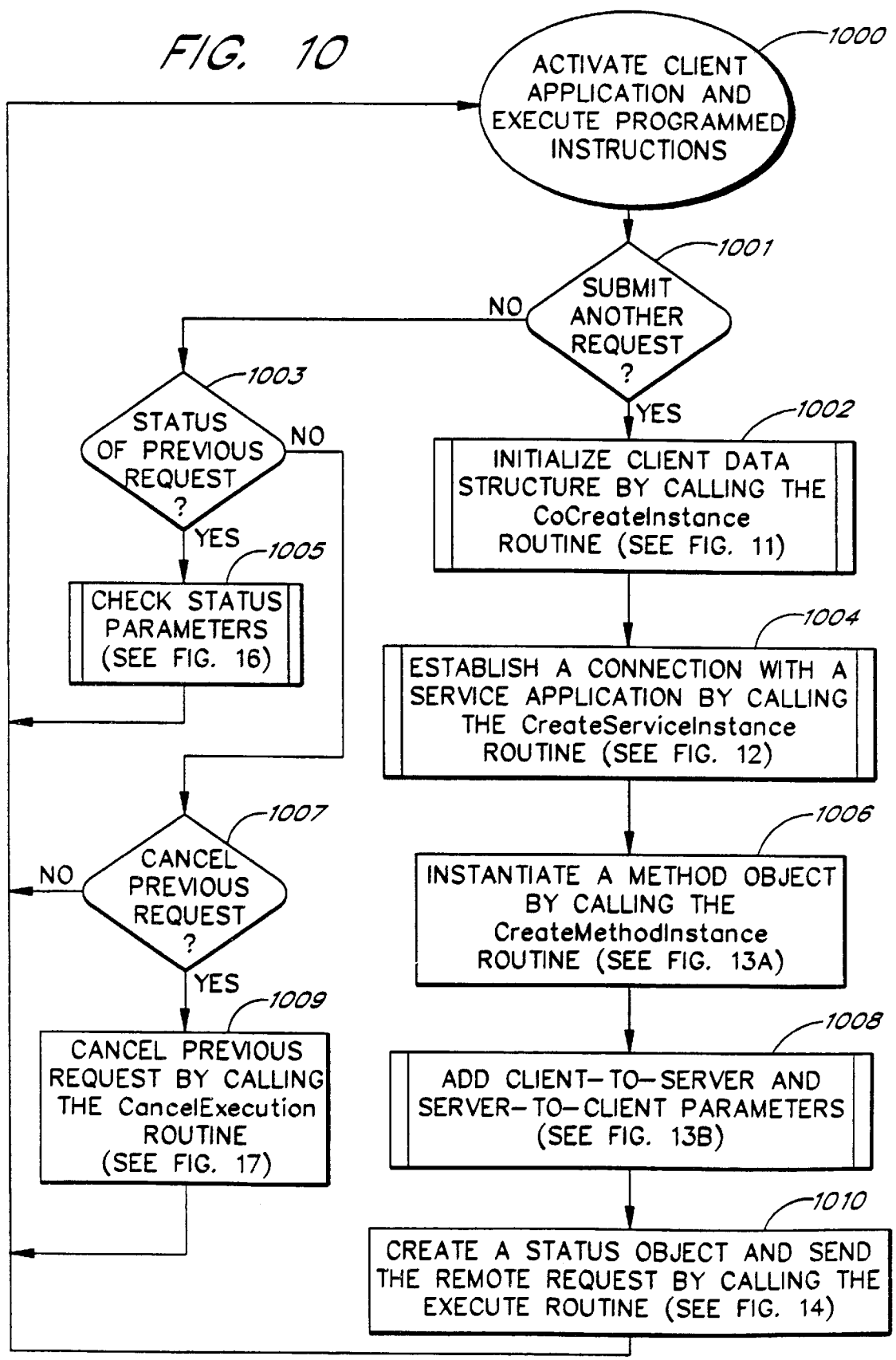
FIG. 10 is a flow chart illustrating the overall functional operation in the preferred embodiment that generates and sends a remote request.

FIG. 10 illustrates a high level flow chart that outlines the routines which a client application 200a calls in order to create, send and check the status of a remote request. Upon activation of a client application 200a in state 1000, that client application 200a continues to execute until the client application 200a needs to send a remote request to the service application 200b.

In state 1001, the client application determines whether to submit a remote request to the client MPC layer 206a or check the status of a pending remote request. For example, in state 1001, the client user can direct the client WEATHER application 204a to download a particular weather map, the client WEATHER application 204a then proceeds to state 1002. Alternatively, the client WEATHER application 204a can proceed to state 1003 and check the status of a pending remote request.

In state 1003, the client application 200a determines whether it wants to obtain the status of a previously sent remote request. If the client application 200a does desire to check the status of a previously sent request, the client application 202a proceeds to state 1005. While in state 1005, the client application 200a checks the status of a desired request and then returns to state 1000.

Returning to state 1003, if the client application 200a does not want to obtain the status of a previously sent remote request, the client application 200a proceeds to state 1007 and determines whether it wants to cancel a previous request. If not, the client application 200a returns to state 1000. However, if the client application 200a does want to cancel a previous request, the client application 200a proceeds to state 1009 and calls the CancelExecution routine. After canceling a previous request with the CancelExecution routine, the client application 200a returns to state 1000.

Returning to state 1001, if the client application 202a desires to submit a remote request, the client application 202a proceeds to state 1002. In state 1002, the client application 200a calls the CoCreateInstance routine that initializes the client data structure 208a. To initialize the client data structure 208a, the CoCreateInstance routine instantiates the Main MOS object 400. The instantiated Main MOS object 400 then functions as the root of the client data structure 208a.

Proceeding to state 1004, the client application 200a calls a CreateServiceInstance routine that exists in the client MPC layer 206a. The CreateServiceInstance routine opens a communications channel with the desired service application 200b and obtains the exported interface list 408. The CreateServiceInstance routine then instantiates a service proxy object 404, stores the exported interface list 408 in the service proxy object 404, and sets a pointer in the Main MOS object 400 to point to the service proxy object 404. The exported interface list 408 contains the 16-byte OLE interface identifiers for each interface in the service application 200b and a set of one-byte service interface identifiers 412 that correspond to the 16-byte OLE interface identifiers. The present invention uses the exported interface list 408 to convert the 16-byte OLE interface identifiers into their corresponding one-byte service interface identifiers 412.

In addition to creating the service proxy object 404, the CreateServiceInstance routine also instantiates the interface object 410, stores the service interface identifier 412 in the interface object 410 and sets a pointer in the service proxy object 404 to point to the interface object 410. When the client application 202a calls the CreateServiceInstance routine, it passes a 16-byte OLE interface identifier which identifies the desired CHAT interface. The CreateServiceInstance routine then looks up the corresponding one-byte service interface identifier 412 in the exported interface list 408.

For example, when the client CHAT application 202a calls the CreateServiceInstance routine in state 1004, the CreateServiceInstance routine opens a communications channel with the CHAT service 202b and obtains an exported CHAT interface list 408. The CreateServiceInstance routine then instantiates the CHAT service proxy object 404, stores the exported CHAT interface list 408 in the CHAT service proxy object. The exported interface list 408 contains a 16-byte OLE interface identifier for each interface in the Chat service 202b and the corresponding one-byte service interface identifiers 412 for each interface. The CreateServiceInstance routine also sets a pointer in the Main MOS object 400 to point to the newly instantiated CHAT service proxy object 404.

The CreateServiceInstance routine then instantiates the interface object 410 and sets a pointer in the CHAT service proxy object 404 to point to the interface object 410. When the client CHAT application 202a calls the CreateServiceInstance routine, it passes an OLE interface identifier which identifies the desired CHAT interface. The CreateServiceInstance routine looks up the corresponding one byte service interface identifier 412 existing in the exported interface list 408.

After instantiating the service proxy object 404 and the interface object 410, the client application 200a proceeds to state 1006. In state 1006, the client MPC layer 206a instantiates a method object 416 by invoking the CreateMethodInstance routine existing in the client MPC layer 206a. When the client application 200a calls the CreateMethodInstance routine in state 1006, the client application 200a passes the method identifier 418 which identifies the desired remote request.

The CreateMethodInstance routine then instantiates a method object 416 and stores the method identifier 418 in the method object 416. For example, when the CHAT client application 200a desires to send the remote request "post comment," the client application 200a calls the CreateMethodInstance routine and passes the method identifier 418 which uniquely identifies the "post comment" request. The CreateMethodInstance routine then instantiates a method object 416 and stores the "post comment" method identifier 418 in the method object 416.

After the CreateMethodInstance routine has instantiated the method object 416 in state 1006, the client application 200a proceeds to state 1008. In state 1008, the client application 200a adds client-to-server and server-to-client parameters 424 to the method object 416. The parameters might include, for example, the actual message associated with the "post comment" method or the name of a desired weather map.

The client application 200a can pass static parameters and request static and dynamic parameters. The client application 200a passes static parameters with the AddParam routine existing in the client MPC layer 206a. Furthermore, the client application 200a requests a dynamic parameter with the RequestDynamicParam routine existing in the client MPC layer 206a. One example of dynamic data is when the client WEATHER application 204a requests a large weather map of unknown size. In the preferred embodiment, the client MPC layer 206a instantiates the dynamic object 430 when a response message 800a containing dynamic data is received from the service MPC layer 206c.

Proceeding to routine 1010, once the client application 200a has passed the parameters associated with a remote request, the client application 200a then sends the remote request to the on-line services network 100. To send the remote request, the client application 200a calls the Execute routine existing in the client MPC layer 206a. The Execute routine sends the messages 800a and 800b for a remote request, instantiates the status object 426 and sets the pointers in the status object 426 and the method object 416 to reference each other.

The Execute routine in the client MPC layer 206a then sends the request messages 800a and 800b to the service MPC layer 206c. After sending the request messages 800a and 800b, the Execute routine returns control to the client application 200a. The client application 200a proceeds back to state 1000 where the client application 200a continues to execute other program instructions until sending another remote request. Each of the routines invoked by the client application 200a when sending a remote request will now be discussed in detail.

Figure 11:
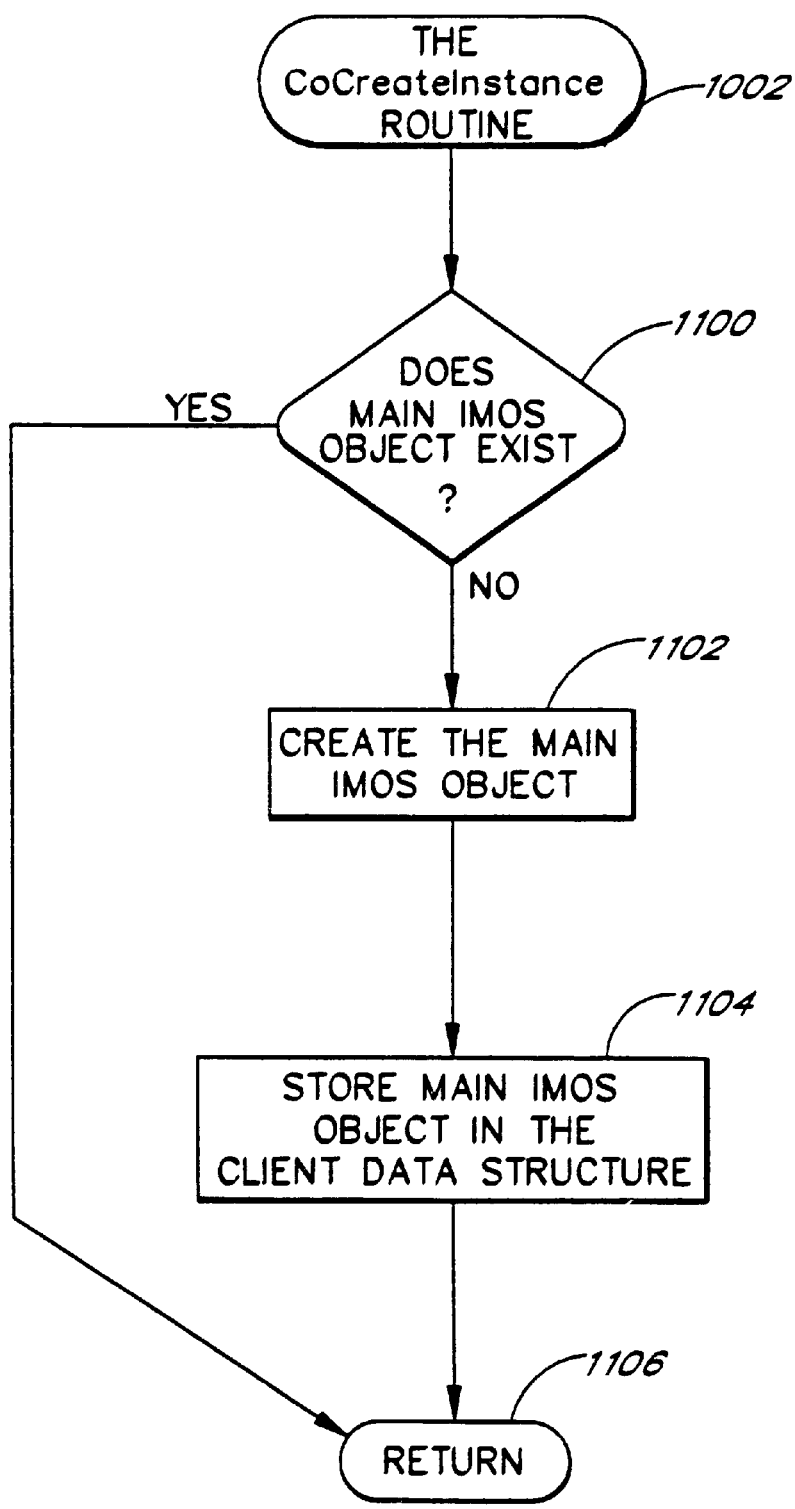
FIG. 11 is a flow chart illustrating one embodiment of the routine invoked to initialize the client data structure.

FIG. 11 provides a detailed flow chart of the states in the CoCreateInstance routine. The client application 200a calls the CoCreateInstance routine in state 1002 to instantiate the Main MOS object 400 that acts as the root of the client data structure 208a. In the preferred embodiment, the CoCreateInstance routine is an Object Linking and Embedding (OLE) routine that is well known in the art, and is described in OLE 2 Programmer's Reference Vol. I, Microsoft Press, 1993, pp. 256 and in OLE 2 Programmer's Reference Vol. II, Microsoft Press, 1993, pp. 56–62.

The CoCreateInstance routine then proceeds to state 1100. In state 1100, the CoCreateInstance routine determines whether the Main MOS object 400 exists in the client data structure 208a. If the Main MOS object 400 does not exist in the client data structure 208a, the CoCreateInstance routine proceeds to state 1102 and instantiates the Main MOS object 400. For example, when the client CHAT application 202a invokes the CoCreateInstance routine for the first time, the Main Mos object 400 will not exist in the client data structure 208a and the CoCreateInstance routine then instantiates the Main Mos Object 400.

If the Main MOS object 400 however, already exists in the client data structure 208a, the CoCreateInstance routine proceeds to return state 1106 and returns control back to the client application 200a. For example, if the client application 200a again invokes the CoCreateInstance routine during the same client user session, the Main MOS object 400 will already exist as the root of the client data structure 208a and the CoCreateInstance routine proceeds to return state 1106.

Returning to state 1102, after instantiating the Main MOS object 400, the CoCreateInstance routine proceeds to state 1104. In state 1104, the CoCreateInstance routine stores the Main MOS object 400 as the root of the client data structure 208a. After storing the Main MOS object 400 in the client data structure 208a, the CoCreateInstance routine proceeds to return state 1106 where control is passed back to the client application 200a.

Figure 12:
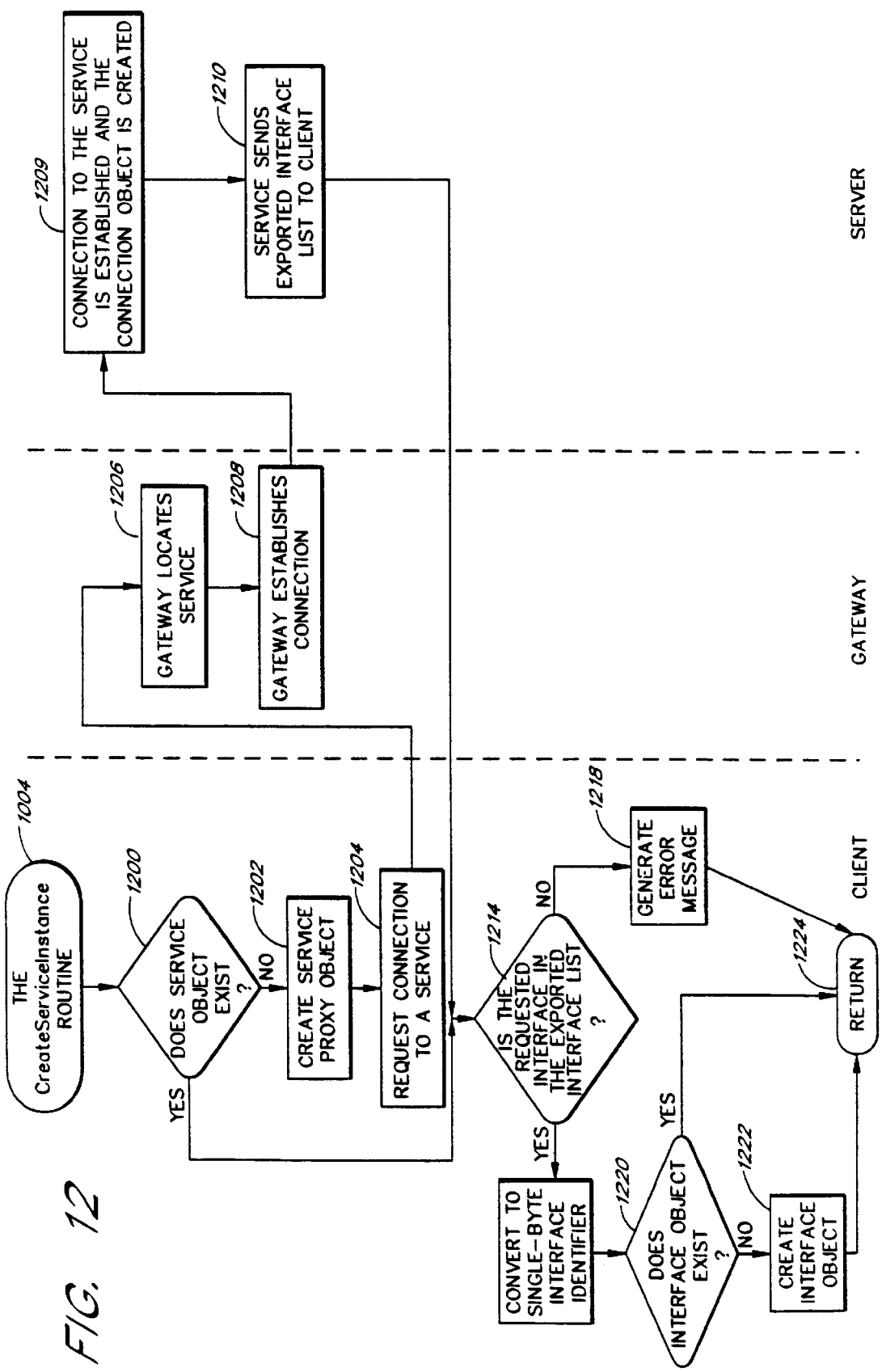
FIG. 12 is a flow chart illustrating one embodiment of the routine invoked to establish a connection with a particular service executing on the servers.

FIG. 12 illustrates a detailed flow chart of the execution states in the CreateServiceInstance routine which instantiates a service proxy object and a interface object 410 in preparation of sending a remote request to a service application 200b. The client application 200a passes variables to the CreateServiceInstance routine that identify the desired service and that identify the 16-byte OLE interface identifier associated with a particular request. These variables are predefined and set by a programmer during development of a service application 200b.

After the client application 200a invokes the CreateServiceInstance routine in state 1004, the routine proceeds to state 1200 and checks to see if the desired service proxy object 404 already exists in the client data structure 208a. The CreateServiceInstance routine compares the desired service name with the service identifiers 406 in the service proxy objects 404. Preferably, the client data structure 208a is a binary tree and the CreateServiceInstance routine uses binary tree traversal techniques known to one of ordinary skill in the art to find a service proxy object 404 with the desired service identifier 406.

When the client CHAT application 202a, for example, sends the first remote request, a service proxy object 404 for the CHAT service 202b does not yet exist. Thus, when the client CHAT application 202a calls the CreateServiceInstance routine for the first time during a client session, the CreateServiceInstance routine will not find the service proxy object 404 for the Chat service 202b in the client data structure 208a. If, however, the client CHAT application 202a has already sent remote requests during this service session to the CHAT service 202b, the service proxy object 404 for the CHAT service 202b will exist in the client data structure 208.

If the CreateServiceInstance routine finds the desired service proxy object 404 in the client data structure 208a, the routine proceeds to state 1214. If, on the other hand, the CreateServiceInstance routine cannot find the desired service proxy object 404, the routine proceeds to state 1202. In state 1202, the CreateServiceInstance routine creates the service proxy object 404.

Moving to state 1204, the CreateServiceInstance routine requests the client MCP layer 210a to establish a connection with the desired service application 200b. Proceeding to state 1206, the service MPC layer 206b receives a request from the Gateway MCP layer 210b to locate the desired service application 200b using the locator program 314. The Gateway MCP layer 210b then establishes a client-to-server connection with the server MCP layer 210c located on the server running the desired service application 200b. Proceeding to state 1208, the server MCP layer 210c directs the service MPC layer 206c to instantiate a connection object 600 that will maintain a connection with the client process. The service MPC layer 206c also stores the connection information 700 and the user information 702 in the connection object 600.

After establishing a connection with the service MPC layer 206c existing in a service application 200b, the service MPC layer 206c proceeds to state 1209. In state 1209, the service MPC layer 206c instantiates the connection object 600 that maintains a connection with the desired service application 200b. The connection object 600 is only established once during a logon session. In the preferred embodiment, the main server object 608 points to a list of connection objects 600 instantiated in state 1209. Proceeding to state 1210, the service MPC layer 206c sends the exported interface list 408 back to the client MPC layer 206a.

Whenever a new service application 200b is added to the host data center 104, the service application 200b instantiates the Main server object 608 and the exported interface objects 610 in the service data structure 208b. In addition, upon initiation, the service application 200b directs the service MPC layer 206c to create the exported interface list 408 by calling the ExportInterface routine. The ExportInterface routine queries each exported interface object 610 and obtains the 16-byte OLE interface identifiers assigned to each of the exported interface objects 610. In addition, the ExportInterface routine assigns a one-byte service interface identifier 412 to each exported interface object 610.

For example, when the CHAT service 202b is added to the host data center 104, the CHAT service 202b, upon initialization, directs the service MPC layer 206c to instantiate the CHAT main server object 608 and the CHAT exported interface objects 610 in the service data structure 208b. The Chat service 202b directs the service MPC layer 206c to create the exported interface list 408 that stores the 16-byte OLE interface identifier for each exported interface object 610 and the one-byte service interface identifier 412 that corresponds to each exported interface object 610. In state 1210, the service MPC layer 206c sends the exported interface list 408 to the client MPC layer 206a.

Proceeding to state 1214, the client MPC layer 206a receives the exported interface list 408 and checks the interface list to ensure that the 16-byte OLE interface identifier requested by the client application 200a exists in the exported interface list 408. If the 16-byte OLE interface identifier requested by the client application 200a exists in the exported interface list 408, the CreateServiceInstance routine proceeds to state 1216. However, if the 16-byte OLE interface identifier requested by the client application 200*a* does not exist in the exported interface list 408, the CreateServiceInstance routine generates an error message in state 1218 that is passed back to the client application 200*a* in return state 1224.

Returning to state 1214, if the 16-byte OLE interface identifier requested by the client application exists in the exported interface list 408, the CreateServiceInstance routine proceeds to state 1216. In state 1216, the CreateServiceInstance routine ascertains the one-byte service interface identifier 412 which corresponds to the 16-byte OLE interface identifier from the exported interface list 408.

Proceeding to state 1220, the CreateServiceInstance routine uses the service interface identifier 412 to determine whether an interface object 410 exists in the client data structure 208*a*. In state 1220, the CreateServiceInstance routine uses binary tree traversal techniques known to one of ordinary skill in the art to find an interface object 410 with the desired service interface identifier 412.

The CreateServiceInstance routine instantiates the interface object 410 for a particular service interface identifier 412 only once during a client session. If the desired interface object already exists, the CreateServiceInstance routine proceeds to return state 1224. For example, when the client CHAT application 202*a* requests a "post comment" method that is part of a particular interface, the CreateServiceInstance routine only instantiates an interface object 410 for that particular interface once. If the client CHAT application 202*a* requests another "post comment" method, the CreateServiceInstance routine determines that the interface object 410 exists and does not instantiate a new interface object 410 and proceeds to return state 1224.

If, however, the interface object 410 with the proper service interface identifier 412 does not exist in the client data structure 208*a*, the CreateServiceInstance routine proceeds to state 1222 where it creates an interface object 410 and stores the service interface identifier 412 in the interface object 410. In addition, the CreateServiceInstance routine initially sets the method instance counter 414 in the newly instantiated interface object to zero. After creation of the interface object 410, the CreateServiceInstance routine proceeds to return state 1224.

Referring to FIG. 10, after completion of the CreateServiceInstance routine, the client application 200*a* proceeds to state 1004 and returns an interface object 410 and calls the CreateMethodInstance routine for that interface object 410. When calling the CreateMethodInstance routine, the client application 200*a* passes the desired method identifier 418 to the CreateMethodInstance routine. Using the method identifier 418, the CreateMethodInstance routine instantiates a method object 416 for the current remote request.

Figure 13A:
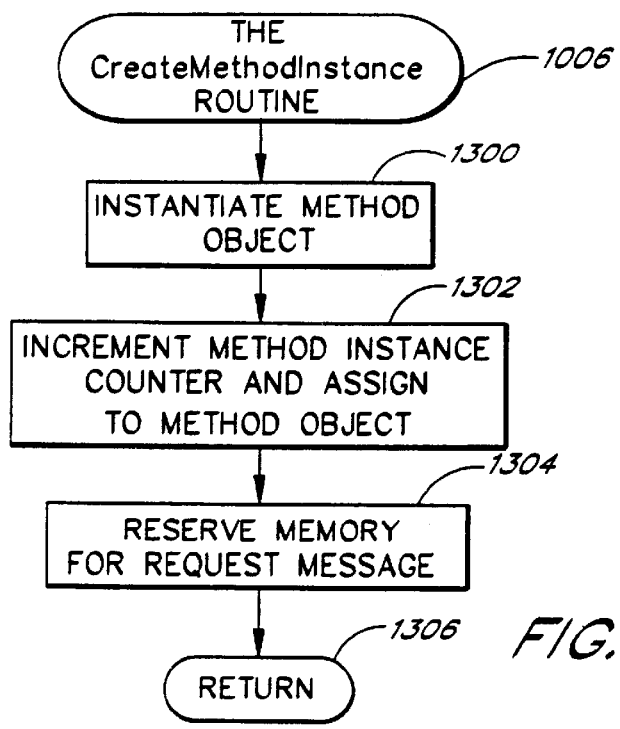
FIG. 13A is a flow chart illustrating one embodiment of the routine invoked to create a method object.

FIG. 13A illustrates a detailed flow chart of the execution states in the CreateMethodInstance routine. Upon invocation in state 1006, the CreateMethodInstance routine proceeds to state 1300, where it instantiates the method object 416 and links the method object 416 to the active interface object 410. When creating the method object 416, the CreateMethodInstance routine stores the method identifier 418 in the method object 416.

For example, when the client CHAT application 202*a* requests the "post comment" method, the client CHAT application 202*a* passes the method identifier 418 for the "post comment" method when the client CHAT application 202*a* calls the CreateMethodInstance routine. As explained above, the method identifier 418 is defined by a programmer during development of the CHAT application 200*a*. The CreateMethodInstance routine then instantiates a "post comment" method object 416 and stores the method identifier 418 in the method object 416. In addition, the CreateMethodInstance routine links the "post comment" method object 416 to the proper interface object 410.

Moving to state 1302, the CreateMethodInstance routine also increments the method instance counter 414 in the interface object 410. As explained above, the interface object 410 contains a method instance counter 414 that counts each time a method in that interface is requested by the client application 200*a*. For example, if the client CHAT application 202*a* requests the "post comment" method multiple times, the method instance counter 414 is incremented each time. Proceeding to state 1304, the CreateMethodInstance routine stores the value of the method instance counter 414 in the method object 416. This allows the client process to issue multiple simultaneous requests to the same service method.

Moving to state 1306, the CreateMethodInstance routine reserves a block of memory in order to store the request messages 800*a* and 800*b* associated with the method object 416. Upon completion of state 1306, the CreateMethodInstance routine returns control back to the client application 200*a* in state 1308.

Figure 13B:
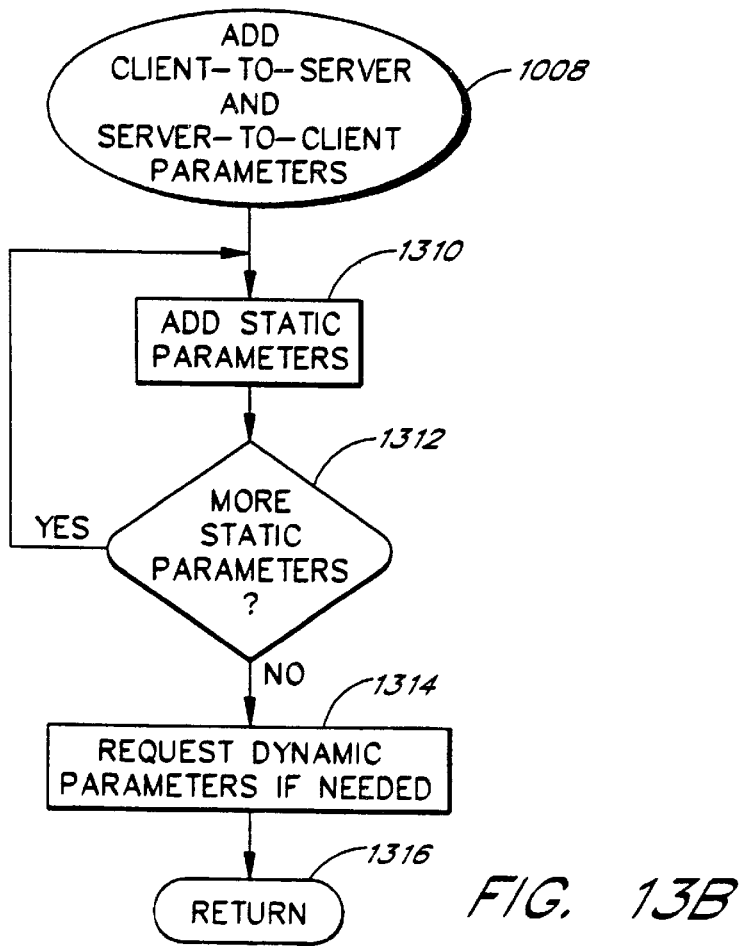
FIG. 13B is a flow chart illustrating one embodiment of the routine invoked to add parameters to a remote message.

Referring to FIG. 10, after calling the CreateMethodInstance routine, the client application 200*a* proceeds to state 1008 and adds the client-to-server and server-to-client parameters. As illustrated in FIG. 13B, the client application proceeds to state 1310 and calls the AddParam routine to add static parameters to the method object 416. When the client application 200*b* invokes the AddParam routine, it passes a parameter that is a byte, word, doubleword, or a pointer to a byte, word, doubleword, or a pointer to the static data. The AddParam routine stores the passed static parameter in the method object 416.

In addition, the AddParam routine creates the messages 800*a* and 800*b* as shown in FIGS. 8A–8C. The messages 800*a* contain the header 802 and the parameters 804. The header 802 contains the service interface identifier 412, the method identifier 418 and the method instance identifier 420. The AddParam routine obtains the service interface identifier 412 from the interface object 410. The AddParam routine then obtains the method identifier 418 and the method instance identifier 420 from the method object 416.

After creating the header 802, the AddParam routine creates the parameters 804 by setting the type field 806 to indicate the type of parameter in the data field 810. If the data field 810 also contains a block of data, the client MPC layer 206*a* sets the length of memory block field 808 to indicate the size of the data block. After creating the message 800*a*, the AddParam routine returns control back to the client application 200*a*. If a static block parameter is larger than 400 bytes, the AddParam routine creates the messages 800*a* and 800*b* that send the static block parameter to the service MPC layer 206*b*.

Proceeding to state 1312, if the remote request requires additional static parameters, the client application returns to state 1310 and again calls the AddParam routine. For example, when the client WEATHER application 204*a* requests the "download weather map" method, the client application 200*a* passes a variety of static parameters that identify the requested weather map.

Once the client application 200*a* has passed all of the required static parameters, the client application proceeds to state 1314. In state 1314, as explained in more detail below, the client application 200*a* can, if needed, request dynamic data. In the preferred embodiment, the client application 200a requests a dynamic parameter with the RequestDynamicParam routine. The RequestDynamicParam routine then sets a dynamic flag (not shown) that directs the client MPC layer 206a to instantiate the dynamic object 430 when a response message 800a containing dynamic data is received from the service MPC layer 206c.

For example, when the client WEATHER application 204a requests a dynamic weather map, the client WEATHER application 204a calls the RequestDynamicParam routine in state 1308. In state 1314, the RequestDynamicParam routine sets a dynamic flag (not shown) that directs the client MPC layer 206a to instantiate the dynamic object 430 when the dynamic weather map is received from the service MPC layer 206c. After setting the dynamic flag, the RequestDynamicParam routine then passes control back to the client application 200a in a return state 1316. The instantiation of a dynamic object 430 and the storage of dynamic data received by the client MPC layer 206a is further discussed below.

Figure 14:
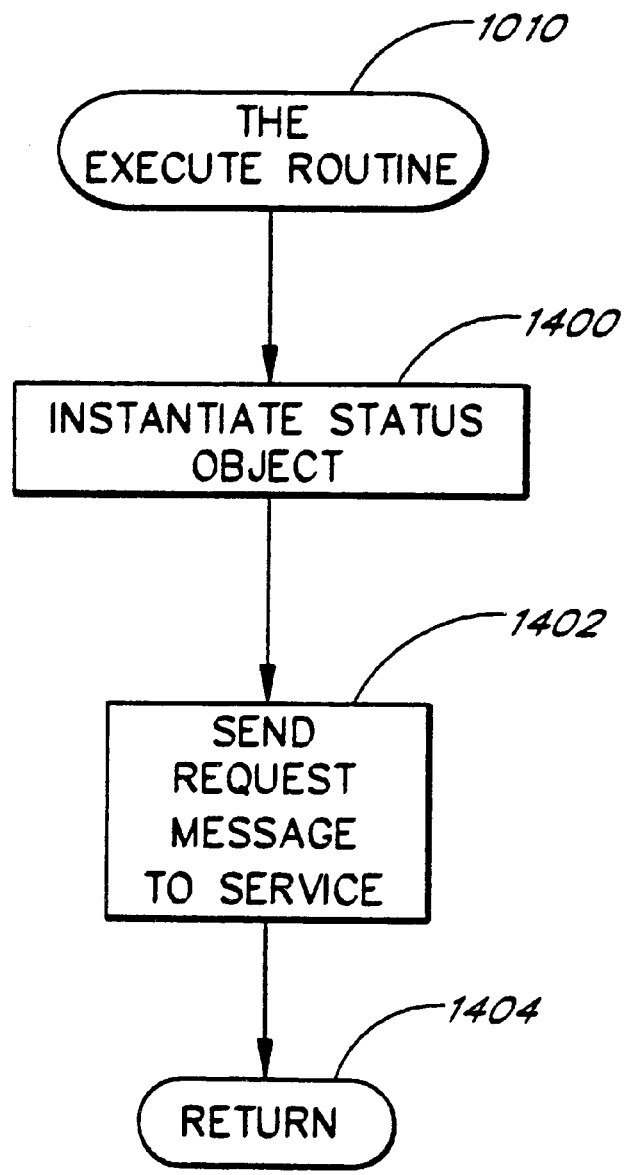
FIG. 14 is a flow chart illustrating one embodiment of the routine invoked to create a status data structure before sending a remote request to the servers.

Referring now to FIG. 10, the client application 200a sends the remote request by calling the Execute routine in state 1010. The Execute routine instantiates the status object 426 and sends the request messages 800a and 800b to the service application 200b. FIG. 14 illustrates a detailed flow chart of the execution states in the Execute routine. After the client application 200a invokes the Execute routine in state 1010, the Execute routine proceeds to state 1400 and instantiates the status object 426 and links the status object 426 to the current method object 416.

Moving to state 1402, the Execute routine sends the request messages 800a and 800b created by the AddParam routine to the service MPC layer 206c. After sending the messages 800a and 800b in state 1402, the Execute routine proceeds to a return state 1404 where the Execute routine returns control back to the client application 200a.

b. Generating Multiple Pending Remote Requests

The following example illustrates how the client application 200a generates multiple pending remote requests with the routines in the client MPC layer 206a. In this example, a client user connects to the on-line services network 100, accesses the WEATHER service 204b and requests the WEATHER service 204b to download a dynamic weather map. While downloading a dynamic weather map, the client user accesses the CHAT service 202b and posts two CHAT comments.

Referring now to FIG. 10, in state 1000 a client user activates the client WEATHER application 204a and requests a large weather map from the WEATHER service 204b. Proceeding to state 1002, the client WEATHER application 204a calls the CoCreateInstance routine to initialize the client data structure 208a.

When calling the CoCreateInstance routine, the client WEATHER application 204a passes the Object Linking and Embedding Main MOS identifier 402 which uniquely identifies the Main MOS object 400 from other Object Linking and Embedding (OLE) objects. Proceeding to state 1100, the CoCreateInstance routine determines whether the Main MOS object 400 exists in the client data structure 208a. In this example, the Main MOS object 400 does not exist in the client data structure 208a and the CoCreateInstance routine proceeds to state 1102 where it instantiates the Main MOS object 400.

Proceeding to state 1104, the CoCreateInstance routine stores the Main MOS object 400 as the root of the client data structure 208a. After storing the Main MOS object 400 in the client data structure 208a, the CoCreateInstance routine proceeds to a return state 1106 where control is passed back to the client application 200a.

Referring to FIG. 10, the client WEATHER application 204a then proceeds to state 1004 where it calls the CreateServiceInstance routine. In this example, the client WEATHER application 204a calls the CreateServiceInstance routine to instantiate the service proxy object 404 and the interface object 410. When calling the CreateServiceInstance routine, the client WEATHER service 204a passes the name of the WEATHER service 204b and a 16-byte OLE interface identifier that identifies the interface (group of methods) that contains the "download weather map" method.

Referring now to FIG. 12, the CreateServiceInstance routine begins in a start state 1004 and proceeds to state 1200. In state 1200, the CreateServiceInstance routine checks to see if the service proxy object 404 for the WEATHER service 204b already exists in the client data structure 208a. In this example, the service proxy object 404 for the WEATHER service does not exist in the client data structure 208a and the CreateServiceInstance routine proceeds to state 1202. In state 1202, the CreateServiceInstance routine creates the service proxy object 404. The CreateServiceInstance routine stores the service proxy object 404 for the WEATHER service 204b in the second level of the client data structure 208a.

Moving to state 1204, the CreateServiceInstance routine requests the service MPC layer 206c to establish a connection with the WEATHER service 204b. Proceeding to state 1206, the service MPC layer 206c uses the locator program 314 to locate the WEATHER service 204b in the servers 120. Proceeding to state 1208, the service MPC layer 206c instantiates a connection object 600 that establishes a connection with the WEATHER service 204b. Proceeding to state 1210, the service MPC layer 206c sends the exported interface list 408 for the WEATHER service 204b back to the client MPC layer 206a.

Proceeding to state 1214, the client MPC layer 206a receives the exported interface list 408. While in state 1214, the CreateServiceInstance routine compares the passed 16-byte OLE interface identifier, with the OLE interface identifiers in the exported interface list 408. In this example, the exported interface list 408 contains the requested 16-byte OLE interface identifier and the CreateServiceInstance routine proceeds to state 1216.

In state 1216, the CreateServiceInstance routine looks up the service interface identifier 412 that corresponds to the specified 16-byte OLE interface identifier in the exported interface list 408. As explained above, the exported interface list 408 contains the one-byte service interface identifier 412 which corresponds to each 16-byte OLE interface identifier.

Proceeding to state 1220, the CreateServiceInstance routine checks the client data structure 208a to determine whether the desired interface object 410 exists. This is done by searching a binary tree data structure for the interface object 410 indexed by its interface service identifier 412. In this example, the interface object 410 does not exist in the client data structure 208a and the CreateServiceInstance routine proceeds to state 1222 where it creates the interface object 410, stores the service interface identifier 412 in the interface object 410 and sets the method instance counter 414 to zero. After creation of the interface object 410, the CreateServiceInstance routine proceeds to return state 1224.

With reference to FIG. 10, after completion of the CreateServiceInstance routine, the client WEATHER application 204a proceeds to state 1006 where it invokes the CreateMethodInstance routine in the client MPC layer 206a for the remote request. The CreateMethodInstance routine instantiates the method object 416 for the "download weather map" method. When the client application 200*a* calls the CreateMethodInstance routine it passes the method identifier 418 associated with the "download weather map" method.

Referring to the detailed flow chart in FIG. 13A, upon invocation in state 1006, the CreateMethodInstance routine proceeds to state 1300, where it instantiates the method object 416, and links the method object 416 to the proper interface object 410. When instantiating the method object 416, the CreateMethodInstance routine stores the method identifier 418 for the "download weather map" method in the method object 416.

Moving to state 1302, the CreateMethodInstance routine increments the method instance counter 414 in the interface object 410. The CreateMethodInstance routine then stores the value of the method instance counter 414 as the method instance identifier 420.

Moving to state 1306, the CreateMethodInstance routine reserves a block of memory in order to store the request message 800*a* associated with the "download weather map" method object 416. Upon completion of state 1306, the CreateMethodInstance routine returns control back to the client WEATHER application 204*a* in state 1308.

Referring to FIG. 10, after calling the CreateMethodInstance routine, the client WEATHER application 204*a* proceeds to state 1008 and adds the client-to-server and server-to-client parameters. Referring to FIG. 13B, the client application proceeds to state 1310 and calls the AddParam routine. In this example, the client WEATHER application 204*a* uses the AddParam routine to store the parameters that identify the desired weather map in the method object 416. The parameters could include, for example, the weather map's name and date.

While in state 1310, the AddParam routine also creates the request message 800*a* for the "download weather map" method. As shown in FIGS. 8A and 8B, the messages 800*a* contain the header 802 and the parameters 804. Using the service interface identifier 412 from the interface object 410, as well as, the method identifier 418 and the method instance identifier 420 from the method object 416, the AddParam routine generates the message header 802. The AddParam routine also adds the passed parameters 804 to the message header 802.

For example, Table 2 illustrates a request message 800*a* that requests the WEATHER service 204*b* to download a particular weather map. The service identifier 412 specifies the interface of the "download weather map" method. In this example, the service interface identifier contains the value of 0x01h (the first interface). The method identifier 418 identifies the "download weather map" method which in this example is identified with the value 0x04h (i.e. there are 4 other methods 0, 1, 2, and 3 in this interface and this is the 5th method). The method instance identifier 420 contains the value 0x01h and indicates that this is the first time a method was called in this particular interface.

The type field 806 contains the value 0x04h which indicates that the name of the weather map is a data block that exists in the data field 810. The length of memory block field 808 indicates the length of the weather map name in bytes. The data field 810 contains the name of the weather map which in this example is "weather map 17" (12 bytes or 0x0Ch). The next type field 806 contains the value 0x85h which requests the service MPC layer 206*b* to download the request weather map as a dynamic data block.

TABLE 2

| Service Interface Identifier | Method Identifier | Method Instance Identifier | Type Field | Length of Memory Block Field | Data Field | Type Field |
|---|---|---|---|---|---|---|
| 0x01h | 0x04h | 0x01h | 0x04h | 0x000Ch | weather map 17 | 0x85h |

Table 2

Once the client WEATHER application 204*a* has passed all of the required static parameters needed to identify the desired map, the client WEATHER application proceeds to state 1314. In this example, the weather map comprises dynamic data (i.e., the service MPC layer 206*c* will download the weather map incrementally). Thus, in state 1314 the client WEATHER application 204*a* calls the RequestDynamicParam routine to specify that the weather map comprises dynamic data.

While in state 1314, the RequestDynamicParam routine sets a dynamic flag that directs the client MPC layer 206*a* to instantiate a dynamic object 430 when the client MPC layer 206*a* begins receiving the dynamic data. In addition, the RequestDynamicParam routine creates a message 800*a* that requests dynamic data. The RequestDynamicParam routine then passes control back to the client application 200*a* in a return state 1316.

Referring now to FIG. 14, the client WEATHER application 204*a* calls the Execute routine in state 1010 to instantiate the status object 426 and to send the "download weather map" request message 800*a* to the service application 200*b*. After invoking the Execute routine in state 1010, the Execute routine proceeds to state 1400 and instantiates the status object 426. Proceeding to state 1402, the Execute routine sends the message 800*a* created by the AddParam routine and the RequestDynamicParam routine. After sending the message 800*a* in state 1402, the Execute routine proceeds to a return state 1404 where the Execute routine returns control back to the client application 200*a*.

While the service MPC layer 206*c* processes the "download weather map" request, the client application 200*a* is now free to check the status of the pending remote request or to issue other remote requests. In this example, multiple pending remote requests are generated when the client user sends a remote request to the CHAT service 202*b* to post a CHAT comment while the remote request for the weather map is still pending.

In this example, referring to FIG. 10, a client user activates the client CHAT application 202*a* in state 1000. The client user then writes a CHAT comment and selects the command that requests the Chat service 202*b* to post the CHAT comment. The client CHAT application 202*a* then calls the CoCreateInstance routine.

Referring to FIG. 11, the CoCreateInstance routine, then proceeds to state 1100. In state 1100, the CoCreateInstance routine determines whether the Main MOS object 400 exists in the client data structure 208*a*. In this example, the Main MOS object 400 exists and the CoCreateInstance routine finds the Main MOS object 400 in the root of the client data structure 208*a*. The CoCreateInstance routine then proceeds to return state 1106. As explained above in this example, during this user session, the Main MOS object 400 was instantiated by the client WEATHER application 204*a*.

Referring to FIG. 10, the client CHAT application 202*a* then proceeds to state 1004 where it calls the CreateServiceInstance routine to instantiate the service proxy object 404 for the CHAT service 202b and the interface object 410 associated with the "post comment" request. When calling the CreateServiceInstance routine, the client CHAT application 200a passes the name of the CHAT service 202b and the OLE interface identifier that identifies the interface associated with the "post comment" request.

Proceeding to state 1200 the CreateServiceInstance routine checks to see if the service proxy object 404 for the CHAT service 202b already exists in the client data structure 208a. In this example, the service proxy object 404 for the CHAT service 202b does not exist in the client data structure 208a and the CreateServiceInstance routine proceeds to state 1202. In state 1202, the CreateServiceInstance routine creates the service proxy object 404 for the CHAT service 202b. Moving to state 1204, the CreateServiceInstance routine requests the service MPC-layer 206c to establish a connection with the CHAT service 202b. Proceeding to state 1206, the service MPC layer 206c uses the locator program 314 to locate the CHAT service 202b in the servers 120.

Proceeding to state 1208, the service MPC layer 206c instantiates a connection object 600 that establishes a connection with the CHAT service 202b. Proceeding to state 1210, the service MPC layer 206c sends the exported interface list 408 for the CHAT service 202b back to the client MPC layer 206a.

Proceeding to state 1214, the client MPC layer 206a receives the exported interface list 408. While in state 1214, the CreateServiceInstance routine compares the requested OLE interface identifier, with the OLE interface identifiers in the exported interface list 408. In this example, the exported interface list 408 contains the requested OLE interface identifier and the CreateServiceInstance routine proceeds to state 1216.

In state 1216, the CreateServiceInstance routine looks up the one-byte service interface identifier 412 in the exported interface list 408. Proceeding to state 1220, the CreateServiceInstance routine checks the client data structure 208a to determine whether the desired interface object 410 exists.

In this example, the interface object 410 does not exist in the client data structure 208a and the CreateServiceInstance routine proceeds to state 1222 where it creates the interface object 410, stores the service interface identifier 412 in the interface object 410 and sets the method instance counter 414 in the interface object 410 to zero. After creation of the interface object 410, the CreateServiceInstance routine proceeds to return state 1224.

With reference to FIG. 10, after completion of the CreateServiceInstance routine, the client CHAT application 202a proceeds to state 1006 where it calls the CreateMethodInstance routine in the client MPC layer 206a. The CreateMethodInstance routine instantiates the method object 416 for the "post comment" method. When the client application 200a calls the CreateMethodInstance routine it passes the method identifier 418 associated with the "post comment" method.

As illustrated in FIG. 13A, the CreateMethodInstance routine proceeds to state 1300, where it instantiates the method object 416, and links the method object 416 to the active interface object 410. When creating the method object 416, the CreateMethodInstance routine stores the method identifier 418 for the "post comment" method in the method object 416.

Moving to state 1302, the CreateMethodInstance routine also increments the method instance counter 414 in the interface object 410 and stores the value of the method instance counter 414 in the method instance identifier 420. Moving to state 1306, the CreateMethodInstance routine reserves a block of memory in order to store the request message 800a associated with the "post comment" method object 416. Upon completion of state 1306, the CreateMethodInstance routine returns control back to the client CHAT application 202a in state 1308.

Referring to FIG. 10, after calling the CreateMethodInstance routine, the client CHAT application 202a proceeds to state 1008 and adds the client-to-server and server-to-client parameters. Referring to FIG. 13B, the client application 200a proceeds to state 1310 and calls the AddParam routine. In this example, the client CHAT application 202a calls the AddParam routine to add the comment for posting on the CHAT service 202b.

While in state 1008, the AddParam routine creates the request messages 800a for the "post comment" method. Using the service interface identifier 412 from the interface object 410, as well as, the method identifier 418 and the method instance identifier 420 from the method object 416, the AddParam routine generates the message header 802. The AddParam routine then adds the passed parameters 804 to the message header 802.

Once the client CHAT application 202a has passed all of the required static parameters needed to transmit the comment, the client CHAT application 202a proceeds to state 1314. Since the client CHAT application 202a is not requesting dynamic data, the client CHAT application does not invoke the RequestDynamicParam routine.

Proceeding to state 1010, the client CHAT application 202a calls the Execute routine to instantiate the status object 426 and to send the "post comment" request message 800a to the service application 200b. After invoking the Execute routine in state 1010, the Execute routine proceeds to state 1400 and instantiates the status object 426.

Moving to state 1402, the Execute routine sends the "post comment" request message 800a to the service MPC layer 206c. The Execute routine then proceeds to the return state 1404 where the Execute routine returns control back to the client CHAT application 202a.

While the CHAT service 202b begins posting the comment, the client application 200a is now free to check the status of the pending remote requests or issue other remote requests. In this example, the client user now sends a second remote request to the CHAT service 202b. Referring now to FIG. 10, in state 1000, the client user drafts a second comment and again selects the command to post another CHAT comment. Proceeding to state 1002, the client CHAT application 202a calls the CoCreateInstance routine.

Referring to FIG. 11, the CoCreateInstance routine, begins in a start state 1002 and proceeds to state 1100. In state 1100, the CoCreateInstance routine determines whether the Main MOS object 400 exists in the client data structure 208a. In this example, the CoCreateInstance routine finds the Main MOS object 400 in the root of the client data structure 208a. The CoCreateInstance routine then proceeds to return state 1106.

Referring to FIG. 10, the client CHAT application 202a then proceeds to state 1004 where it calls the CreateServiceInstance routine to instantiate the proxy object 404 for the CHAT service 202b and the interface object 410 associated with the "post comment" request. When calling the CreateServiceInstance routine, the client CHAT application 200a passes the name of the CHAT service application 202b and the OLE interface identifier that identifies the interface associated with the "post comment" request.

Proceeding to state 1200 the CreateServiceInstance routine checks to see if the service proxy object 404 for the CHAT service 202*b* already exists in the client data structure 208*a*. In this example, the service proxy object 404 for the CHAT service already exists in the client data structure 208*a* (it was created for the previous "post comment" request) and the CreateServiceInstance routine proceeds to state 1214.

In state 1214, the client MPC layer 206*a* compares the requested OLE interface identifier with the OLE interface identifiers in the exported interface list 408. In this example, the exported interface list 408 contains the requested OLE interface identifier and the CreateServiceInstance routine proceeds to state 1216. In state 1216, the CreateServiceInstance routine looks up the one-byte service interface identifier 412 in the exported interface list 418. Proceeding to state 1220, the CreateServiceInstance routine checks the client data structure 208*a* to determine whether the desired interface object 410 exists. In this example, the interface object 410 already exists in the client data structure 208*a* and the CreateServiceInstance routine proceeds to return state 1220.

With reference to FIG. 10, after completion of the CreateServiceInstance routine, the client CHAT application 202*a* proceeds to state 1006 where it invokes the CreateMethodInstance routine in the client MPC layer 206*a*. The CreateMethodInstance routine instantiates the method object 416 for the "post comment" method. When the client application 200*a* calls the CreateMethodInstance routine it passes the method identifier 418 associated with the "post comment" method.

As illustrated in FIG. 13A, upon invocation in state 1006, the CreateMethodInstance routine proceeds to state 1300, where it instantiates a second "post comment" method object 416, and links the method object 416 to the active interface object 410. When creating the second method object 416, the CreateMethodInstance routine stores the method identifier 418 for the second "post comment" method in the method object 416.

Moving to state 1302, the CreateMethodInstance routine also increments the method instance counter 414 in the interface object 410. Because this is the second "post comment" method, the method instance counter 414 is incremented to two. Proceeding to state 1304, the CreateMethodInstance routine stores the value of the method instance counter 414 in the method instance identifier 420.

Moving to state 1306, the CreateMethodInstance routine reserves a block of memory in order to store the request message 800*a* associated with the second "post comment" method object 416. Upon completion of state 1306, the CreateMethodInstance routine returns control back to the client CHAT application 202*a* in state 1308.

Referring to FIG. 10, after calling the CreateMethodInstance routine, the client CHAT application 202*a* proceeds to state 1008 and adds the client-to-server and server-to-client parameters. Referring to FIG. 13B, the client application proceeds to state 1310 and calls the AddParam routine. In this example, the client CHAT application 202*a* calls the AddParam routine to add the second comment for posting on the CHAT service 202*b*.

While in state 1008, the AddParam routine also creates the request messages 800*a* for the second "post comment" method. Using the service interface identifier 412 from the interface object 410, as well as, the method identifier 418 and the method instance identifier 420 from the method object 416, the AddParam routine generates the message header 802. The AddParam routine then adds the passed parameters 804 to the message header 802.

Once the client CHAT application 202*a* has passed all of the required static parameters needed to transmit the comment, the client CHAT application 202*a* proceeds to state 1314. Since the client CHAT application 202*a* is not requesting dynamic data, the client CHAT application does not invoke the RequestDynamicParam routine.

Proceeding to state 1010, the client CHAT application 202*a* calls the Execute routine to instantiate the status object 426 and to send the "post comment" request message 800*a* to the service application 200*b*. After invoking the Execute routine in state 1010, the Execute routine proceeds to state 1400 and instantiates the status object 426.

Moving to state 1402, the Execute routine sends the "post comment" request message 800*a* to the service MPC layer 206*c*. The Execute routine then proceeds to the return state 1404 where the Execute routine returns control back to the client CHAT application 202*a*.

The above example shows how the routines in the client MPC layer 206*a* build the client data structure 208*a* and allow the client applications 200*a* to continue operation while waiting for responses to pending remote requests.

c. Responding to Remote Requests

As illustrated in FIG. 12, when the service MPC layer 206*c* receives an indication from the server MPC layer 210*c* that a client process would like to establish a connection in state 1209, the service MPC layer 206*c* instantiates the connection object that maintains a connection with the desired client application 200*a*. The connection is only established once during a logon session. For example, when connecting to the CHAT service 202*b*, the connection object 600 identifies a particular client-server connection between the client MPC layer 206*a* and the service MPC layer 206*c*. In the preferred embodiment, the main server object 608 points to a list of connection objects 600 identifying various connections. Proceeding to state 1210, the service MPC layer 206*c* sends the exported interface list 408 to the client MPC layer 206*a*.

Figure 15B:
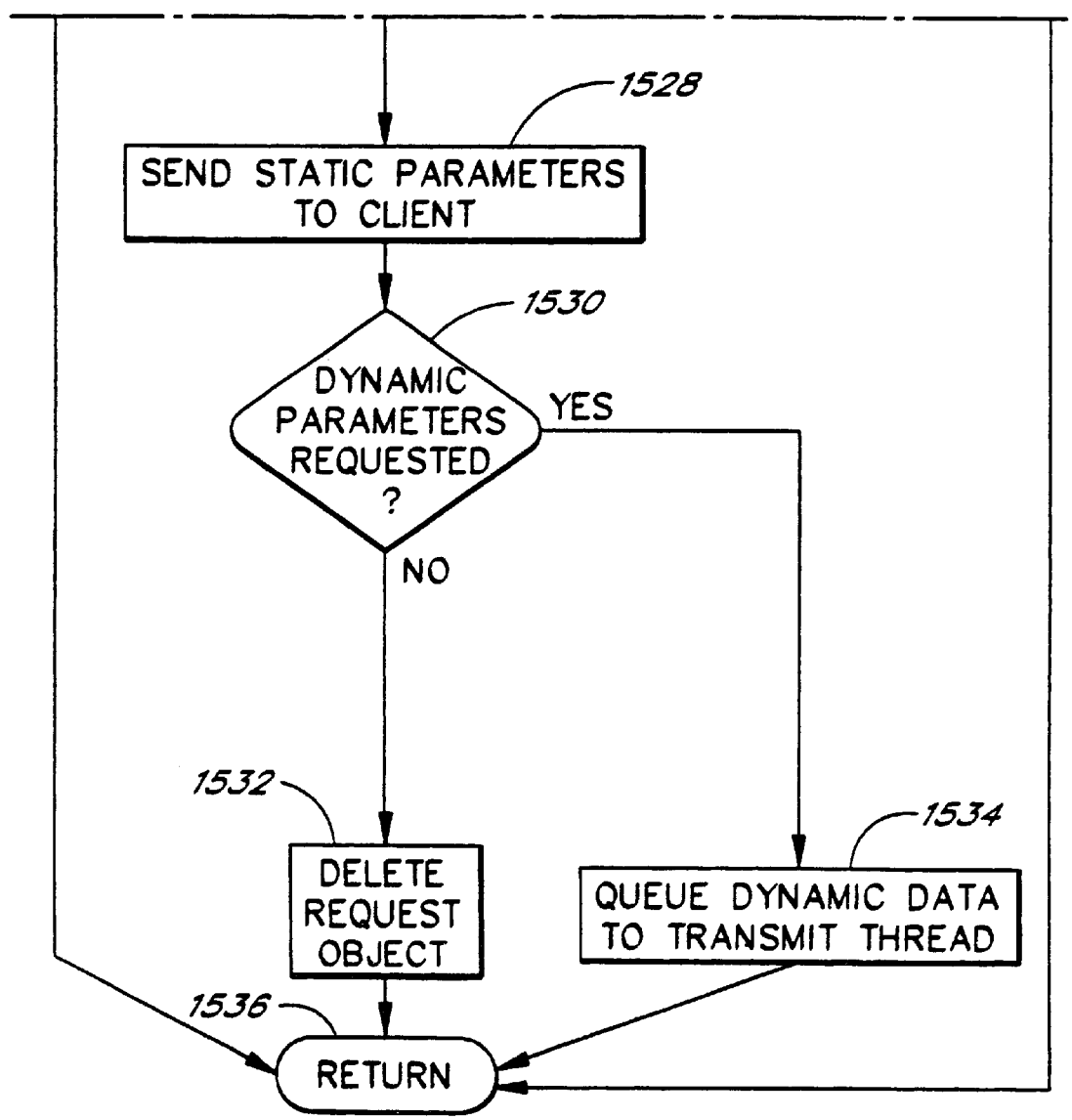

After establishing a connection, the service MPC layer 206*b* waits for the request messages as illustrated in FIG. 15. Beginning in a start state 1500, the service MPC layer 206*c* waits until it receives a request in state 1502. Once the service MPC layer 206*c* receives a request message 800*a* or 800*b*, it proceeds to state 1504. In state 1504, the service MPC layer 206*c* determines whether the request message is an upload message 800*b*. As explained above, when the client MPC layer 206*a* sends a memory block parameter in incremental portions, each incremental portion contains the upload field 812 at the beginning of the upload message 800*b*. In the preferred embodiment, the value 0xE6h (230) in the upload field indicates that other upload messages 800*b* exist and the value 0xE7h (231) indicates the last upload message 800*b* has been received for that parameter. It is possible that there will be other messages 800*b* that correspond to other client-to-server memory block parameters, identified by a different upload parameter identifier 814.

If the request message 800*a* contains the header 802, the service MPC layer proceeds to state 1506 and instantiates the request object 602. For example, if the request message 800*a* does not contain an incremental portion of a client-to-server static data block the service MPC layer proceeds to state 1506. Thus, the service MPC layer 206*c* only proceeds to state 1508 when the upload message 800*b* does not contain the header 802.

Proceeding to state 1506, the service MPC layer 206*a* instantiates a request object 602 using techniques known to one of ordinary skill in the art. While in state 1506, the service MPC layer 206*c* creates a pointer in the connection object 600 that references the request object 602. This allows one client application 200*a* (identified by the connection object 600) to issue multiple requests that are identified by the request objects 602.

Proceeding to state 1510, the service MPC layer parses the request message 800*a*. By parsing the message header 802, the service MPC layer obtains the service interface identifier 412, the method identifier 418, and the method instance identifier 420. In addition, the service MPC layer 206*c* obtains the parameters 804 from the message 800*a*. The service MPC layer 206*c* then stores the service interface identifier 412, the method identifier 418, the method instance identifier 420 and the parameters 804 in the request object 602.

Proceeding to state 1512, the service MPC layer 206*c* determines whether the request message 800*a* contains a cancellation request. The service MPC layer 206*c* determines if the request message 800*a* contains a cancellation request by analyzing the type field 806. In the preferred embodiment, a cancellation request contains the value 0x0Fh in the type field 806. If the request message 800*a* contains a cancellation request, the service MPC layer 206*c* proceeds to the cancellation routine in state 1514 which is discussed in further detail below. If the request message 800*a* does not contain a cancellation request, the service MPC layer 206*c* proceeds to state 1509.

Returning to state 1512, if the request message 800*a* does not contain a cancellation request, the service MPC layer 206*c* proceeds to state 1516 and determines whether the request message 800*a* relates to an incremental upload of static data. In the preferred embodiment, the type field 806 contains the value 0x05h if the request message 800*a* contains an incremental upload. If the request message 800*a* relates to an incremental upload, the service MPC layer 206*c* proceeds to return state 1536 since the service MPC layer 206*c* does not begin processing the request until it has received all of the upload messages 800*b*.

If the request message 800*a* does not relate to an incremental upload, the service MPC layer 206*c* proceeds to state 1518 and adds the remote request to the request queue 604. Before proceeding with the discussion about the request queue 604, the flow chart illustrates the process of obtaining all the upload messages 800*b* related to the transmission of a static dynamic block from the client MPC layer 206*a* to the service MPC layer 206*c* beginning in state 1504.

Therefore, returning to state 1504, if the request message 800*b* is a continuation of an upload message 800*b*, the service MPC layer 206*c* proceeds to state 1508 and locates the request object 602 associated with the upload message 800*b* (the service MPC layer created the request object 602 when the first message 800*a* was received). The service MPC layer 206*c* identifies the proper request object 602 by locating the request object 602 containing the same upload parameter identifier 814. As explained above, the upload parameter identifier 814 uniquely identifies the memory block associated with the incremental portion in the upload message 800*b*.

Proceeding to state 1520, the service MPC layer 206*c* adds the incremental portion of the upload message 800*b* to the request object 602. Proceeding to state 1522, the service MPC layer 206*c* determines whether the continuation upload message 800*b* contains the last incremental portion. If not, the service MPC layer 206*c* proceeds to return state 1536.

If the continuation upload message 800*b* contains the last incremental portion of the static memory block, the service MPC layer 206*c* proceeds to state 1518. In state 1518, the request is added to the request queue 604. In the preferred embodiment, the request queue 604 is a linked list of requests. The requests in the request queue 604 are processed by multiple service threads 606 in a service application 200*b*. The number of service threads 606 are defined during initialization of the service application 200*b*. The service application 200*b* executes the requests in the service threads 606.

Proceeding to state 1524, each service thread 606 obtains the requests from the request queue 604. When the service thread 606 obtains a new request from the request queue, it parses the request to obtain the service interface identifier 412 and the method identifier 418. Using the service interface identifier 412, the service application 200*b* traverses the service data structure 208*b* to locate the desired exported interface object 610. The service application 200*b* then uses the method identifier 418 to locate and retrieve a pointer to the desired method. After obtaining the pointer to the desired method, the service thread 606 begins execution of the method.

For example, to download a weather map, the service thread 606 uses the service interface identifier 412 to locate the appropriate exported interface object 610 and then uses the method identifier 418 to obtain a pointer to the "download weather map" method. The service thread 606 then executes the "download weather map" method as implemented by the developer of the WEATHER service application 204*b*.

While the service thread 606 executes the request in state 1524, the service thread 606 calls a service MPC layer 206*c* routine to obtain the parameters stored in the request object 602. In the preferred embodiment, the service thread 606 obtains the parameters from the request object 602 with the GetRecvParam routine. When the service application 200*b* calls the GetRecvParam routine existing in the request object 602 interface, the service application 200*b* passes a pointer that references the specified parameter. To obtain multiple parameters, the service thread 606 calls the GetRecvParam routine multiple times.

For example, while the service thread 606 executes the "download weather map" method, the service thread 606 calls the GetRecvParam routine to obtain the parameters which specify a particular weather map, the service thread 606 then locates the desired weather map and prepares a response as described in further detail below.

During execution of the requested method, the service thread 606 proceeds to state 1526. In state 1526, the service thread 606 creates a response message 800*a* that is sent back to the client MPC layer 206*a*. In the preferred embodiment, the service application 200*b* generates the response message 800*a* by calling the SetReturnParam routine in the service MPC layer 206*c*.

The service thread 606 calls the SetReturnParam routine for each static parameter added to the response message 800*a*. Once the SetReturnParam routine receives the static parameter, it adds the static parameter to the response message 800*a*. Using the message format illustrated in FIGS. 8A and 8B, the message 800*a* contains the header 802 and the parameters 804. The SetReturnParam routine uses the identification information in the current request object 602 to create the message header 802 and the parameters 804. The SetReturnParam routine creates each parameter 804 by setting the type field 806 to indicate the type of parameters in the data field 810.

Proceeding to state 1528, the service thread 606 directs the service MPC layer 206*c* to send the response message 800*a* with the static parameters back to the client MPC layer 206*a*. In the preferred embodiment, the service MPC layer 206c calls the BeginSend routine existing in the service MPC layer. The BeginSend routine sends the response message 800a with the static parameters back to the client MPC layer 206a. Proceeding to state 1530, the service thread 606 determines if dynamic data was requested by the client MPC layer 206a. If not, the service MPC layer 206c proceeds to state 1532 and releases the request object 602. In the preferred embodiment, the service thread 606 signals that it is done with the request object 602 in state 1532 by calling the ServiceDoneWithRequest routine in the service MPC layer 206c. When the request object 602 is no longer needed, the service MPC layer 206c releases the request object 602.

Returning to state 1530, if the client MPC layer 206a has requested dynamic data, the service MPC layer 206c proceeds to state 1534. In state 1534, the service MPC layer 206c queues the response messages 800a to a transmit thread. After queuing the response messages 800a, the service MPC layer 206a proceeds to return state 1536.

When sending dynamic data back to the client MPC layer 206a, the service MPC layer 206c creates multiple response messages 800a. The first response message 800a contains the static parameters associated with the dynamic data response. In the subsequent response messages 800a, the service MPC layer 206c sets the type field to 0x85h to indicate that the response message 800a contains server-to-client dynamic data. When the client MPC layer 206a receives a subsequent response message 800a, it signals the incremental data event described above. In the last response message 800a containing the dynamic data, the service MPC layer 206c sets the type field to 0x86h. When the client MPC layer 206a receives the last response message 800a, the client MPC layer 206a signals the incremental data event and the data all done event.

The transmit thread is an execution thread that handles the transmittal of the response messages 800a. While in state 1534, the transmit thread passes the first 16 response messages 800a to the server MCP layer 210c which then sends them to the Gateway MCP layer 210b.

Because the service MPC layer 206a can transmit the response messages 800a to the Gateway 124 faster than they can be transmitted by the Gateway 124 over the wide area network 106, the service MPC layer 206c waits until the server MCP layer 210c begins transmitting the first 16 response messages 800a. Once the Gateway MCP layer 210b begins transmitting the 16 response messages 800a, the Gateway MCP layer 210b notifies the server MPC layer 210c and the service MPC layer 206c that it is ready for more response messages 800a.

In the preferred embodiment, after the Gateway MCP layer 210b has sent five response messages 800a to the client process, the Gateway MCP layer 210b notifies the server MCP layer 210c that it is ready to receive five more server-to-client messages 800a. The server MCP layer 210c then notifies the service MPC layer 206c to send the next five response messages 800a which the service MPC layer 206c proceeds to do so. This process repeats until all of the response messages 800a have been sent.

An advantage of using an existing transmission thread to send more than 16 response messages, is that the service thread 606 is free to execute other response messages before completely transmitting all the response messages 800a. Thus, the transmittal of the response messages 800a at slow baud rates over the wide area network 106 does not delay the processing of the requests by the service threads 606. In addition, by using an existing transmit thread, the service MPC layer 206c doesn't need to waste processing resources on creating a new transmit thread. As a result, the system increases request processing performance.

d. Routing Responses To Pending Remote Requests

Figure 16:
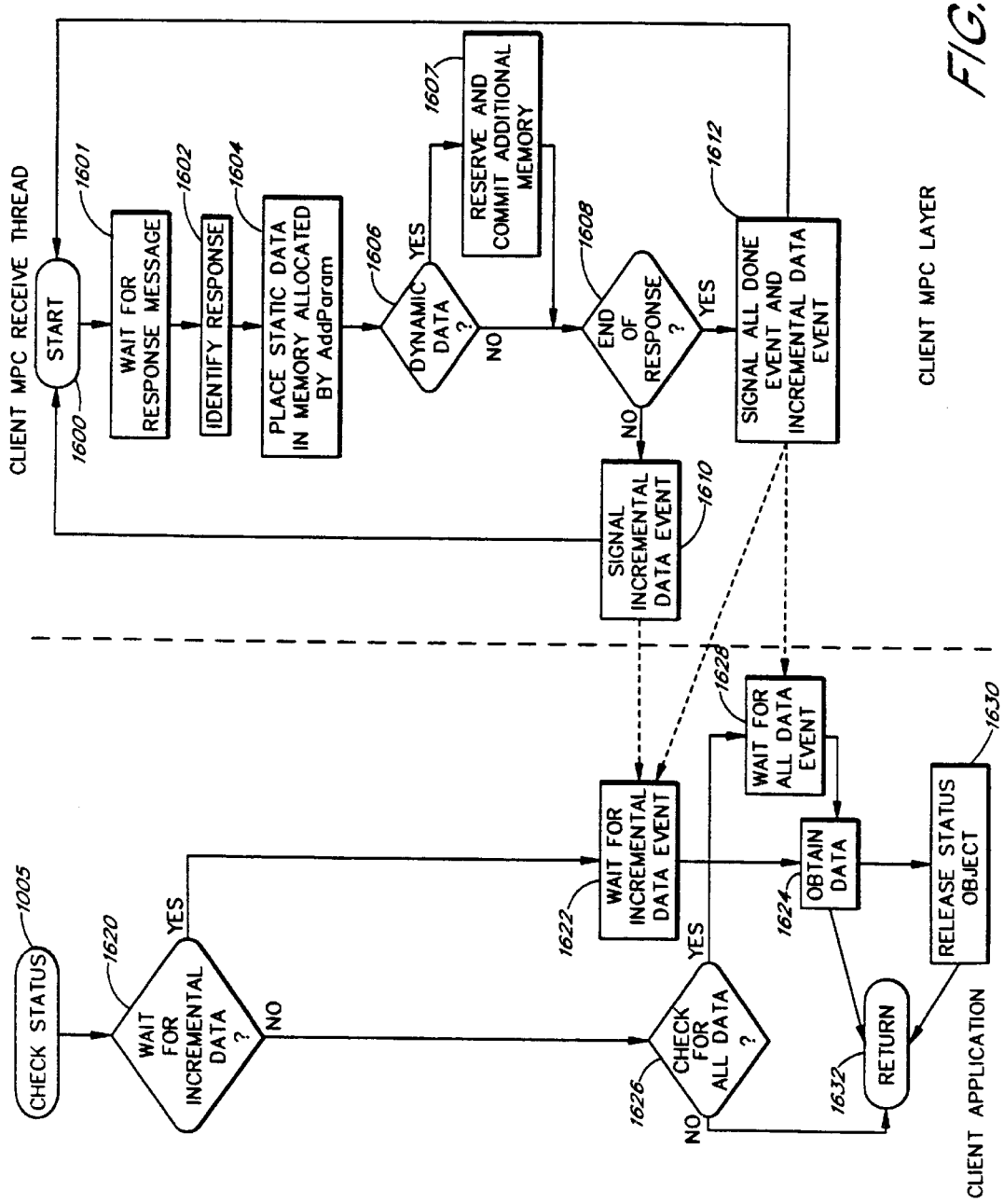
FIG. 16 is a flow chart illustrating one embodiment of the routine invoked to receive a response from the service applications.

When the service application 200b sends a response message 800a back to the client application 200a, the client MPC layer 206a identifies the response message 800a. A flow chart illustrating the steps executed by the client MPC layer 206a when it receives a response message 800a is shown in FIG. 16. In the preferred embodiment, the client MPC layer 206a receives the response messages 800a in a receive thread. The receive thread in the client MPC layer 206a begins in a start state 1600. The right side of FIG. 16 illustrates a flow chart of the client MPC layer receive thread while the left side of FIG. 16 illustrates the status check routine executing in the client application 200a.

Proceeding to state 1601, the client MPC layer 206a waits for a response message 800a. When the client MPC layer 206a receives a response message 800a, it proceeds to state 1602. In state 1602, the client MPC layer 206a uses the service interface identifier 412 to locate the identified proxy service object 404. The service proxy object 404 then obtains the service interface identifier 412 from the message header 802 and routes the response message 800a to the identified interface object 410. The interface object 410 then obtains the method identifier 418 and the method instance identifier from the message header 802 and routes the response message 800a to the identified method object 416.

After identifying the proper method object 416, the client MPC layer 206a proceeds to state 1604. In state 1604, the client MPC layer 206a places the parameters 804 in the memory locations created by the AddParam routine. Proceeding to state 1606, the client MPC layer 206a determines if the response message 800a contains dynamic data. If not, the client MPC layer proceeds to state 1608. If the message 800a does contain dynamic data, the client MPC layer 206a proceeds to state 1607. In state 1607, the client MPC layer 206a reserves and commits additional memory as described in further detail below. While in state 1607, the client MPC layer 206a stores the dynamic data in the memory of the local computer 102.

Proceeding to state 1608, the client MPC layer 206a checks to see if the client MPC layer 206a has received all of the response messages 800a associated with a particular request. As set forth in Table 1, the service MPC layer 206c identifies the last response message 800a by setting the value of the type field 806 to 0x86h. If the client MPC layer 206a has not received the last response message 800a, the client MPC layer 206a proceeds to state 1610 and directs the status object 426 to signal an incremental data event. The incremental data event notifies the client application 200a that incremental data has been received. The client MPC layer 206a then proceeds back to state 1601 and waits for the next response message 800a.

Returning to state 1608, if the client MPC layer 206a determines that it has received all of the response messages 800a associated with a particular request, the client MPC layer 206a proceeds to state 1612. In state 1612, the client MPC layer 206a signals the incremental data event and signals the all done event. The incremental event notifies the client application 200a that the client MPC layer 206a has received additional incremental data. The all done event notifies the client application 200 that the client MPC layer 206a has completed a remote request. The client MPC layer 206a then proceeds back to state 1601 and waits for the next response message.

The client application 200a executes in a separate thread. In state 1005, the client application 200a checks the status of a pending remote request by proceeding to state 1620. If the client application 200a in state 1620 desires to obtain incremental data, the client application proceeds to state 1622 and waits for the incremental data event set by the client MPC layer 206a. When the client MPC layer 206a sets the incremental data event in either state 1610 or state 1612, the client application 200a proceeds to state 1624 and obtains the incremental data as discussed in further detail below.

Returning to state 1620, if the client application 200a does not want to obtain incremental data (i.e., the client application only wants the data when the entire response message has been received) the client application 200a proceeds to state 1626. If, in state 1626, the client application 200a does not want to wait for all of the data, the client application 200a proceeds to return state 1632. If, the client application 200a desires to obtain the data once the data has been completely received, the client application 200a proceeds to state 1628.

When the client MPC layer 206a signals the all data event in state 1612, the client application 200a proceeds to state 1624 and obtains the data. The process of obtaining the incremental portions of dynamic data is discussed in further detail below. Once the client application 200a has obtained all of the data, the client application 200a proceeds to state 1630 and releases the status object. The client application 200a then proceeds to return state 1632. Return state 1632 returns the client application 200a back to state 1005 illustrated in FIG. 10.

Thus, with the present invention, a client application 200a can begin using the incremental data received in the response messages 800a prior to receiving all of the data from the on-line services network 100. This greatly improves response times since the client application 200a can begin displaying a portion of the response prior to receiving the entire response. For example, the client WEATHER application 204a can begin displaying a portion of the large weather map before the receiving all of the weather map. Alternatively, the client application 200a can wait until all of the messages 800a have been received.

e. Obtaining Status Information

The present invention allows a client application 200a to obtain status information about a pending remote request. To obtain status information, the client application uses a routine in the client MPC layer 206a to query the status object 426. The client MPC layer 206a obtains the status data 428 from the status object 426 and returns the status data 428 to the client application 200a. In the preferred embodiment, the status data 428 allows (1) the client MPC layer 206a to obtain the progress of a data upload (transfer of data from the client MPC layer 206a to the service MPC layer 206c) and (2) the progress of a data download (transfer of data from the service MPC layer 206c to the client MPC layer 206a).

To determine the progress of a data upload, the client application calls the GetUpLoadProgress routine that exists in the client MPC layer 206a. As explained above, when the client MPC layer 206a sends a request, it stores the total data size of the remote request in the status object 426. In addition, as each message 800 is created and sent, the client MPC layer 206a stores the amount of transmitted data in the status object 426. The GetUpLoadProgress routine divides the amount of transmitted data by the total data size and returns a percentage value that indicates the percentage of data transmitted to the service MPC layer 206c.

The status data 428 also contains status information about the amount of data downloaded from the service MPC layer 206c. As explained above, each time the client MPC layer 206a receives the message 800a, the client MPC layer 206a updates the status data 428. When updating the status data 428, the client MPC layer 206a specifies the amount of data received from the service MPC layer 206c. Therefore, the client MPC layer 206a obtains the status of a download by examining the amount of data received from the service MPC layer 206c.

Because the client application 200a can obtain status information from the status object 426, the client application can display the status information to the end-user. For example, with the status information, the client application 200a can display a fuel gauge or bar chart that indicates the progress of a remote request. Because the user obtains timely status information, user frustration decreases when transmitting data at the slower baud rates associated with the wide area network 106.

f. Cancellation Of Pending Remote Requests

In addition to monitoring the progress of pending remote requests, the client application 200a can also cancel the execution of a pending remote request. Referring to FIG. 10, the client application 200a cancels a pending remote request in state 1007. In the preferred embodiment, the client application 200a calls the CancelExecution routine that exists in the client MPC layer 206a. For example, when a client user requests a weather map and then decides to cancel the request, the client user directs the client application 200a to cancel the request. In response, the client application 200a calls the CancelExecution routine in state 1007.

Figure 17:
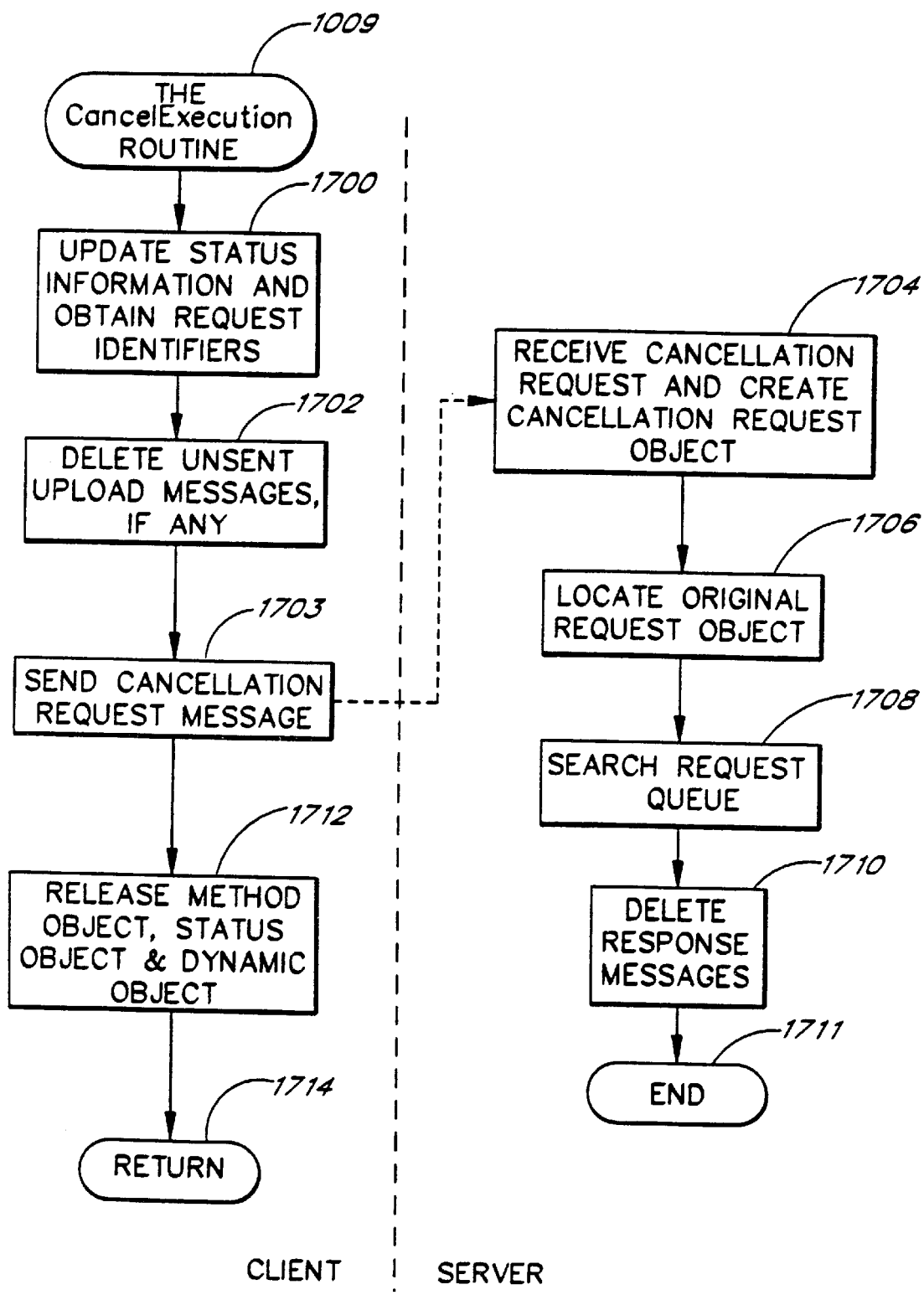
FIG. 17 is a flow chart illustrating one embodiment of the routine invoked to cancel a pending remote request.

Referring now to FIG. 17 a flow chart of the CancelExecution routine is shown. After invocation in start state 1007, the CancelExecution routine proceeds to state 1700 and accesses the status object 426 to obtain status information. Proceeding to state 1702, the CancelExecution routine deletes any unsent upload messages 800b if any exist.

Proceeding to state 1703, the CancelExecution routine obtains the service interface identifier 412, the method identifier 418 and the method instance identifier 420 to create the header 802 for the cancellation message 800a. In addition, the CancelExecution routine sets the type field 806 to 0x0Fh, as set forth in Table 1, to indicate that this message 800a is a cancellation message 800a. Proceeding to state 1703, the client MPC layer 206a then sends the cancel message 800a to the service MPC layer 206c.

After sending the message 800a to cancel the pending remote request, the client MPC layer 206a proceeds to state 1712. In state 1712, the client MPC layer 206a releases the canceled method object 416, the status object 426 and if it exists, the dynamic object 430 in the client data structure 208a. In some cases, once the client MPC layer 206a releases the method object 416, the status object 426 and the dynamic object 430, the client MPC layer 206a may still receive some response messages 800a from the service MPC layer 206c. For example, if the service MPC layer 206c is in the process of sending a remote request response to the client MPC layer 206a, the service MPC layer 206c may send a number of response messages 800a before it has processed the cancellation request. In such cases, the client MPC layer 206a ignores the response messages 800a. The CancelExecution routine then proceeds to return state 1714 and returns control back to the client application 200a.

Returning to state 1703, the client MPC layer 200a sends the cancellation message 800a to the service MPC layer 206c. In state 1704, the service MPC layer 206c receives the cancellation request. In response, the service MPC layer 206c instantiates a cancellation request object 602 to hold the identifiers in the cancellation message header 802.

Proceeding to state 1706, the service MPC layer 206c uses the service interface identifier 412, the method instance identifier 420 and the method identifier 418, to locate the original request object 602.

For example, if in state 1702, the client MPC layer 206a sends a message 800a to cancel the request for a weather map, in state 1704, the service MPC layer 206c instantiates another request object 602 for the cancellation request. In state 1706, the service MPC layer 206c then locates the original request object 602 associated with the request for the weather map.

Proceeding to state 1708, the service MPC layer 208c searches the linked list in the request queue 604. When the service MPC layer 206c finds a request with the same service interface identifier 412, method instance identifier 420 and method identifier 418, the service MPC layer 206c deletes the request from the request queue 604. For example, if the request for the weather map is still pending in the request queue 604, the service MPC layer 206c locates the pending weather map request and deletes it from the request queue 604.

If the service MPC layer 206c does not find the request in the request queue 604, the service thread 606 has already begun processing the request. Proceeding to state 1710, the service MPC layer 206c searches for any response messages 800a that the service thread 606 has generated. The service MPC layer 206c locates such response messages 800a by analyzing the message headers 802. If any message headers 802 contain the same service interface identifier 412, method instance identifier 420 and method identifier 418, the service MPC layer 206c deletes the response messages 800a. In addition, the service MPC layer 206c releases the canceled request object 602 and proceeds to end state 1711.

g. Dynamic Allocation Of Memory For Dynamic Data Blocks Of Unknown Size

The present invention reserves and commits memory when needed. For example, in the preferred embodiment, the client application 200a requests dynamic data block when it calls the RequestDynamicParam routine. The RequestDynamicParam routine then directs the operating system to reserve a block of memory for the dynamic object and a data buffer for storing the dynamic data. In the preferred embodiment, the data buffer is 64 kilobyte block of memory. To reserve the memory, the RequestDynamicParam calls well known reserve memory commands in the operating system.

When the client MPC layer 206a begins receiving the response messages 800a containing the dynamic data, the client MPC layer 206a directs the operating system to commit the reserved memory. The operating system then assigns the reserved memory to a physical memory location. The client MPC layer 206a then creates the dynamic object. The dynamic data in the response messages 800a is then stored in the data buffer. The reserved memory for the data buffer is committed incrementally as each response message 800a is received.

For example, if the first response message 800a contains 970 bytes, the client MPC layer 206a directs the operating system to commit 970 bytes of memory so that the client MPC layer 206a can store the 970 bytes in the data buffer. Thus, as the client MPC layer 206a receives more dynamic data, more memory is committed to the data buffer that holds the dynamic data. The beginning memory address of the data buffer and the size of the committed data buffer are stored in the dynamic object 430.

The unique implementation and data structures of the present invention allows the client MPC layer 206a to take advantage of reserving and committing memory as described above. This feature allows the client MPC layer to request and receive dynamic data blocks of unknown size from the service MPC layer 206c. To request a data block of unknown size, the client application 200a calls the RequestDynamicParam routine as discussed above. The RequestDynamicParam routine directs the operating system to reserve memory for the dynamic object 430 and at least one data buffer. The client MPC layer 206a then sends the request message 800a to the service MPC layer 206c requesting the dynamic data block of unknown size. As explained above, the RequestDynamicParam routine sets the type field 806 in the message 800a to indicate a request for dynamic data.

Focusing now on the operation of the service MPC layer 206c, the service MPC layer 206c receives the message 800a specifying the request for dynamic data. The service thread 606 executes the remote request and directs the service MPC layer 206c to send the dynamic data back to the client MPC layer 206a in multiple response messages 800a. If the dynamic data comprises a large block of data, the service MPC layer 206c creates as many messages 800a as are necessary to transmit the large block of data to the client MPC layer 206a.

Figure 18:
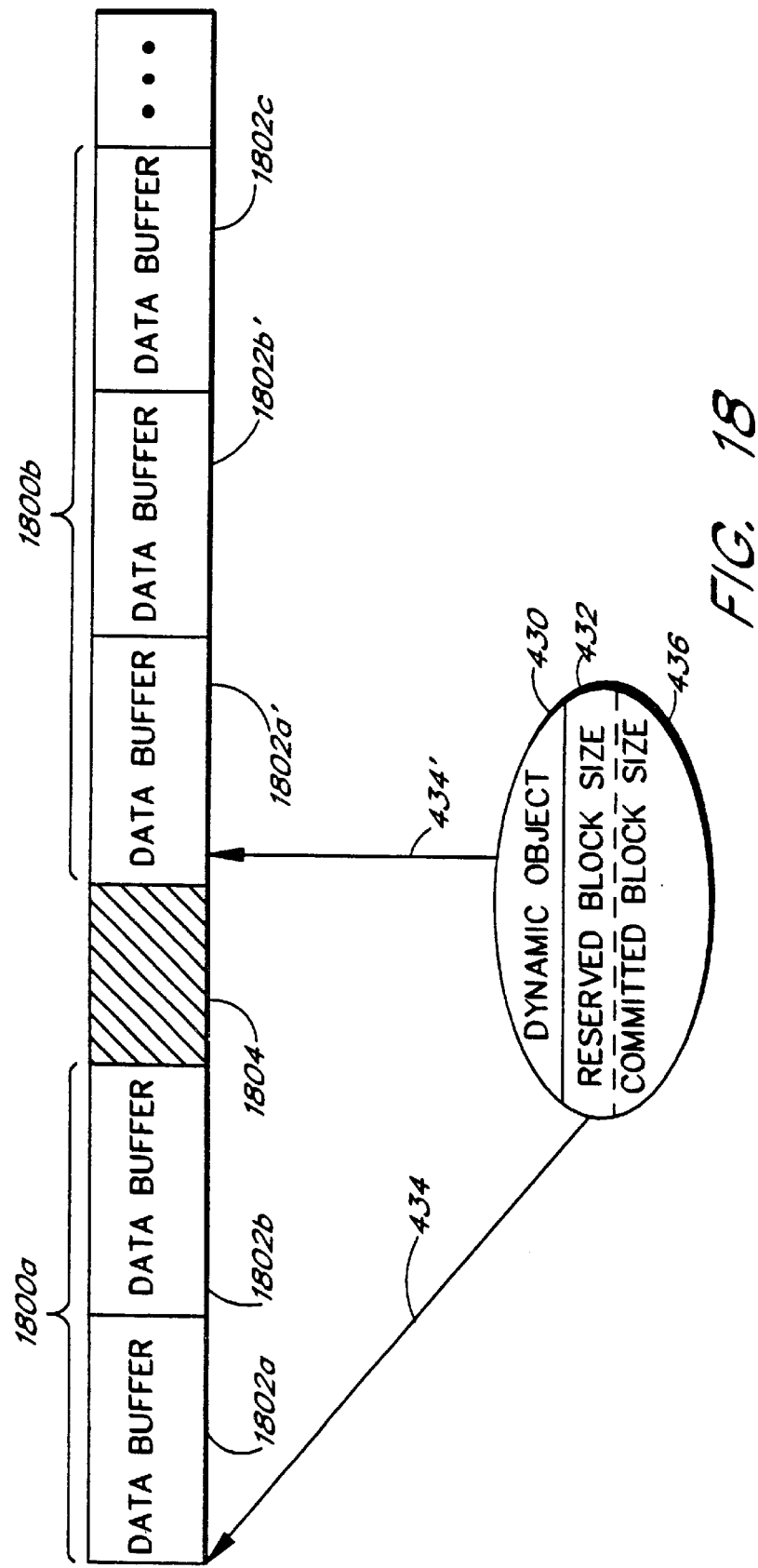
FIG. 18 is a block diagram showing data buffers stored in contiguous sections of memory.
Figure 19:
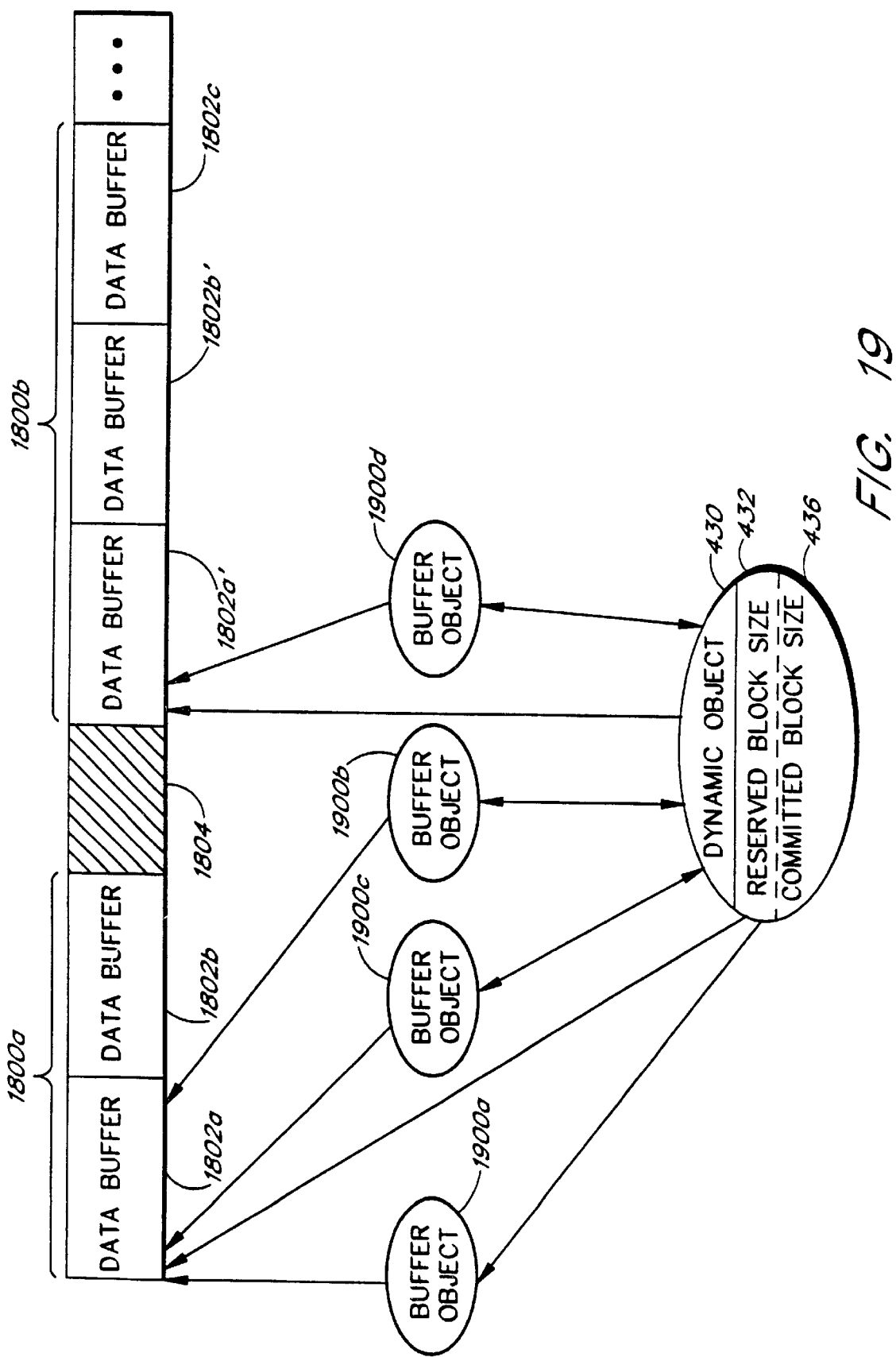
FIG. 19 is a block diagram showing buffer objects which reference incremental portions of a response.

Focusing now on the unique implementation of the present invention which allows a client application 200a to request data blocks of unknown size, the client MPC layer 206a receives the response messages 800a containing the dynamic data. As shown in FIG. 18, once the client MPC layer 206a receives dynamic data, the client MPC layer 206a directs the operating system to commit the reserved memory for the dynamic object 430. The client MPC layer 206a then instantiates the dynamic object 430 when the first response message 800a is received. The dynamic object is only instantiated once. The present invention also commits memory for the response messages 800a as the response messages 800a are received.

In addition, the client MPC layer 206a directs the operating system to commit the memory to store the dynamic data received in the response message 800a. The client MPC layer 206a then sets the pointer 434 in the dynamic object 430 to point to the first byte of the data buffer 1802a. Because the data in a response message 800a is less than the reserved data buffer 1802a, the client MPC layer directs the operating system to commit a portion of the reserved memory in the data buffer 1802a. For example, in the preferred embodiment, the client MPC layer 206a reserves 64 kilobytes of memory for the data buffer 1802a. In the preferred embodiment, the response message 800a only contains 970 bytes of data. Thus, the client MPC layer 206a directs the operating system to commit only the 970 bytes of memory in the reserved data buffer 1802a.

The client MPC layer 206a then stores the reserved data block size 432 and the committed data block size 436 in the dynamic object 430. If the received dynamic data fills the data buffer 1802a, the client MPC layer 206a reserves a second data buffer 1802b. When reserving the second data buffer 1802b, the client MPC layer 206a adds the size of the data buffer 1802b to the reserved data block size 432. For example, in the preferred embodiment, each data buffer is 64 kilobytes. When the client MPC layer 206a reserves a second data buffer 1802b, it modifies the reserved data block size 432 to 128 kilobytes (64 kilobytes+64 kilobytes). The committed data block size 436 is modified as the memory for the data in each response message 800a is committed.

One problem associated with reserving and committing dynamic data, is that the data blocks may not be stored in contiguous blocks of memory. The present invention solves the memory fragmentation problem by locating and copying the dynamic data to contiguous blocks of memory as the messages 800a containing dynamic data are received.

In order to store dynamic data in contiguous blocks of memory, the client MPC layer 206a copies the data buffers 1802 into a contiguous section of memory 1800a. If for some reason, the client MPC layer 206a runs out of a contiguous section of memory 1800a, the client MPC layer 206a locates another section of continuous memory 1800b that is large enough to hold all of the data buffers 1802a, 1802b and 1802c. For example, if the client MPC layer 206a has created two data buffers 1802a and 1800b and now needs to create a third data buffer 1802c, the client MPC layer 206a will attempt to reserve the third data buffer 1802c immediately following the second data buffer 1802b.

If the memory section 1800a isn't large enough to store the next data buffer 1802c, that is, if the next section of memory 1804 is already allocated, the client MPC layer 206a searches for a section in memory 1800b that will hold all three data buffers 1802a, 1802b and 1802c. The client MPC layer 206a then copies the two data buffers 1802a and 1802b to data buffers 1802a' and 1802b' in the new section of memory 1800b and reserves the third data buffer 1802c.

When the data blocks are copied to different locations in memory, the client application 200a needs some mechanism for locating the various data blocks 1802. In the preferred embodiment, the dynamic object 430 maintains a pointer to the first byte of the first section of memory 1800a and a pointer to the first byte of the second section of memory 1800b. If the first section 1800a is no longer in use, the client MPC layer 206a deletes the pointer to the first byte of memory section 1800a and releases the first memory section 1800a. As explained in more detail below, the client application 200a might be accessing the data in memory section 1800a. If so, the client MPC layer 206a waits to release the memory section 1800a when the data buffers are no longer needed.

Thus, the present invention allows the client MPC layer 206a to receive dynamic data blocks of unknown size. In the preferred embodiment, the client MPC layer 206a reserves and commits memory as response messages 800a are received. Furthermore, when a section of memory 1800a can no longer hold all of the dynamic data, the present invention ensures that incremental portions of dynamic data are stored in contiguous sections of memory by copying received dynamic data to new contiguous sections of memory 1800b.

Thus, the unique implementation of the present invention only commits memory when the response messages 800 are received. Since the data from the on-line network 100 arrives slowly, the memory in the local computer 102 is not tied up while waiting for all the data. Thus, other applications in the local computer 102 have more available memory and run more efficiently.

h. Accessing and Releasing Data Before The Completion Of A Remote Request

The unique implementation of the present invention allows client applications 200a to obtain incremental data before the client MPC layer 206a has received all of the response messages. To obtain the incremental data, the client application 200a calls the GetBuffer routine and the WaitIncremental routine in the client MPC layer 206a to instantiate the buffer objects 1900 and to access the data in the data buffers 1802.

Each buffer object 1900 contains a pointer that references the location of data in a data buffer 1802. In addition, the buffer objects 1900 also contain the size of the data buffer and the amount of memory in the data buffer 1802 to free for other uses. When the client application 200a calls the WaitIncremental routine, the client MPC layer 206a creates the buffer objects 1900 that references all of the incremental data received since the last time the client application called the WaitIncremental routine.

For example, when the client MPC layer 206a first receives a response message, the client MPC layer 206a commits the memory in the data buffer 1802a to hold the data contained in the response message 800a. In addition, the client MPC layer 206a, as described above, signals the incremental data event. The client MPC layer 206a then continues to receive the response messages 800a. Once the client MPC layer 206a signals the incremental data event, the client application 200a calls the WaitIncremental routine to obtain the incremental data.

The WaitIncremental routine in the client MPC layer 206a then instantiates the buffer object 1900a. The buffer object 1900a references the first byte of the data buffer 1802a. If, in this example, the data buffer contains 30 kilobytes of data, the buffer object 1900a points to the 30 kilobytes of data in the data buffer 1802a. In addition, the buffer object 1900a contains the size of the incremental data (30 kilobytes) stored in the data buffer 1802a. The client application 200a can then access the data pointed to by the buffer object 1900a.

As the client MPC layer 206a receives additional response messages 800a, the client application can again call the WaitIncremental routine. If, in this example, the client MPC layer 206a has obtained another forty kilobytes of incremental data, the WaitIncremental routine instantiates a second buffer object 1900b that references the newly received data. Thus, the second buffer object 1900b references the first byte of the newly received forty kilobytes of incremental data.

In this example, the data buffers 1802a and 1802b contain seventy kilobytes of incremental data. The dynamic object 430 points to the first byte of the entire seventy kilobytes of incremental data. The first buffer object 1900a points to the first byte of the first thirty kilobytes of incremental data and the second buffer object 1900b points to the first byte of the next forty kilobytes of incremental data. In the preferred embodiment, the WaitIncremental routine obtains the dynamic data's location in memory from the dynamic object 430. The WaitIncremental routine then instantiates a buffer object 1900b which references the location of the newly received dynamic data.

If the client application 200a desires to obtain the entire seventy kilobytes of dynamic data, the client application calls the GetBuffer routine. The GetBuffer routine creates a buffer object 1900c that references the seventy kilobytes of incremental data contained in the data buffers 1802a and 1802b. Thus, the client application 200a can obtain portions of the incremental data with the WaitIncremental routine to, for example, display an image on the end-user computer 102. Alternatively, the client application 200a can call the GetBuffer routine, for example, to copy the seventy kilobytes of incremental data to a file.

In the preferred embodiment, the GetBuffer routine accesses the dynamic object 430 and obtains the location of the first data buffer 1802 and the committed data block size 436. The GetBuffer routine then instantiates a buffer object 1900c and stores a pointer to the first byte in the data buffer 1802 in the buffer object 1900d. In addition, the GetBuffer routine stores the committed data block size 436 in the buffer object 1900c and sets the amount of unneeded data to zero. Setting the amount of unneeded data to zero indicates that all of the data in the data buffer is useful. The client application 200*a* uses the buffer objects 1900 to access the data in the referenced data buffer 1802.

As discussed above, when the memory section 1800*a* runs out of contiguous memory, the client MPC layer 206*a* copies the data buffers 1802*a* and 1802*b* to another contiguous section of memory 1800*b*. However, the buffer objects 1900*a*, 1900*b* and 1900*c* continue to reference the original memory locations. Thus, the client MPC layer 206*a* does not delete the copied memory in section 1800*a* until 1) the client application 200*a* completes accessing the memory referenced by the buffer objects 1900*a*, 1900*b* and 1900*c* and 2) the client application 200*a* releases 1900*a*, 1900*b* and 1900*c*.

Once the client application 200*a* has obtained the data referenced by the buffer objects 1900, the client application 200*a* can direct the client MPC layer 206*a* via the FreeMemory routine to free the unneeded memory. Thus, once the client application 200*a* has used the data referenced by buffer objects 1900, the client MPC layer 206*a* can free that memory for other uses.

To free the memory referenced by the data buffers 1802, the client application 200*a* marks the unneeded memory in the buffer objects 1900 and then directs the client MPC layer 206*a* to free the marked memory. In the preferred embodiment, the client application 200*a* calls the FreeMemory routine to mark the unneeded memory. The client application 200*a* then calls the Release routine in the client MPC layer 206*a* to free the marked memory.

i. Releasing Memory As Dynamic Data Is Being Received

If the client application 200*a* does not use the FreeMemory and Release routines, the buffer objects 1900 and the referenced data buffers 1802 remain in memory until completion of the remote request. Furthermore, the FreeMemory routine is not limited to releasing copied sections of memory such as 1800*a*. Thus the FreeMemory routine also frees memory when only one data section 1800 exists.

Because the FreeMemory and Release routines free the unneeded incremental data blocks for other uses, the amount of committed memory is reduced. When the client application 200*a* calls the FreeMemory routine, it passes (1) the pointer to the buffer object 1900 that references the unneeded memory and (2) the amount of memory that is no longer needed.

Each buffer object 1900 contains a free memory variable that stores the amount of memory to free in the referenced data buffer 1802. When the buffer object is initialized, the free memory variable is set to zero. To mark memory, the FreeMemory routine sets this variable to indicate the amount of memory that is no longer needed in the referenced data buffer 1802. If, for instance, the client application 200*a* no longer needs any of the data referenced by the buffer object 1900, the client application 200*a* directs the FreeMemory routine to mark the entire size of buffer object 1900.

The client application 200*a* then commands the client MPC layer 206*a* to free the marked memory with the Release routine. The Release routine accesses the buffer object 1900 and obtains the amount of memory to release from the free memory variable in the buffer object 1900. In addition, the client MPC layer 206*a* checks to see if any other buffer objects 1900 reference the same memory location. If not, the client MPC layer 206*a* directs the operating system to release the memory.

For example, if the user requests a dynamic data weather map that comprises 200 kilobytes of data, the client MPC layer 206*a* commits one kilobyte of memory in a data buffer 1800 when the first response message is received. Furthermore, the client MPC layer 206*a* signals the incremental data event that notifies the client WEATHER application 204*a* that incremental data has been received. The client WEATHER application 204*a* then calls the GetIncremental routine to instantiate a buffer object 1900 that references the first byte of the committed data.

The client WEATHER application 200*a* then accesses the committed memory and begins displaying the map on the monitor of the local computer 102. Since the local computer 102 can process data much faster than data is received over the slower wide area network 106, the client WEATHER application 200*b* uses the data in the committed memory before additional data is received. Advantageously, the client WEATHER application 200*b* can mark the committed memory as unneeded with the FreeMemory routine. In addition, the client WEATHER application can release the buffer object 1900 and the committed memory in the data buffer 1802 with the Release Routine. This process then repeats when the next response message 800 is received.

Thus, in this example, the present invention only needs one kilobyte of memory to receive and display a 200 kilobyte weather map. As a result, much more memory is available for other applications executing in the local computer 102. Thus, the present invention, reduces memory consumption and enhances the execution of other applications.

3. The MCP Layer

Figure 20:
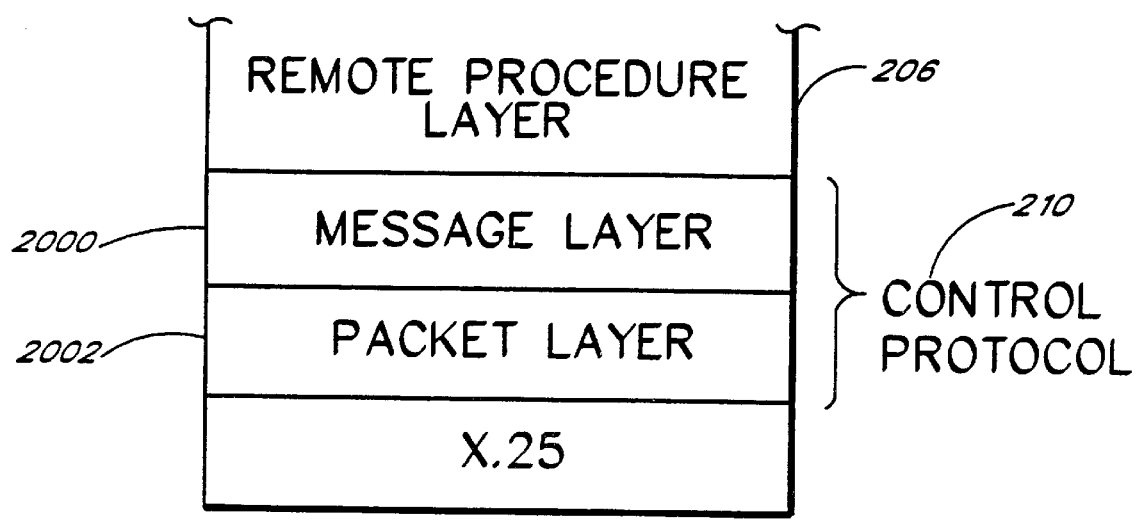
FIG. 20 illustrates the two component layers of a control protocol.

The MCP layer 210 provides the transport protocols needed to support communications between the client processor 102 and the Gateways 124 and the servers 120. As illustrated in FIGS. 2 and 3, the MCP layer 210 exists in every client processor 102, in every Gateway 124, and in every server 120. With reference to FIG. 20, the MCP layer 210 comprises two layers, a message layer 2000 and a packet layer 2002. In accordance with one aspect of the invention, the message layer 2000 additionally multiplexes message streams associated with different service sessions. In accordance with another aspect of the invention, when two or more message streams are multiplexed, the message layer 2000 allocates the wide area network 106 bandwidth to the message streams based on predetermined (or user-specified) service priority levels.

The message layer 2000 of the MCP layer 210 uses the packet layer 2002 to provide a reliable byte stream between the client processors 102 and the Gateway 124. The packet layer 2002 handles error correction using CCITT CRC-32, and uses a sliding window protocol to handle flow control. To implement the sliding window protocol, each outbound packet contains an 8-bit packet sequence number. The sender increments the 8-bit packet sequence number with each successive packet transmission. Each packet also contains the 8-bit packet sequence number of the first non-received packet (with erroneous packets treated as non-received packets), so that packets sent in one direction serve as acknowledgements for packets sent in the opposite direction. Special acknowledgement packets (i.e., packets which do not contain client-server message data) are transmitted after a timeout period if the receiver has no data to send. Sliding window protocols are well known in the art, and are described in Tanenbaum, *Computer Networks*, 2nd Ed., Prentice-Hall, Inc., 1989, pp. 223–239.

Figure 21A:
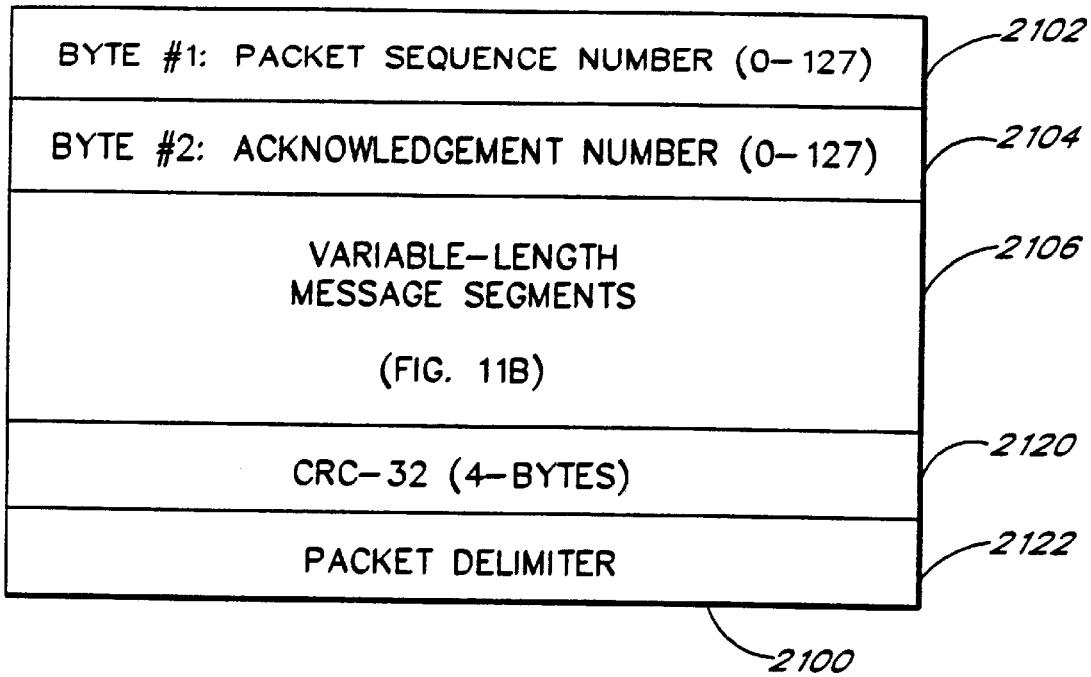
FIGS. 21A and 21B illustrate a packet format used for data communications between client microcomputers and Gateway microcomputers over a wide area network.
Figure 21B:
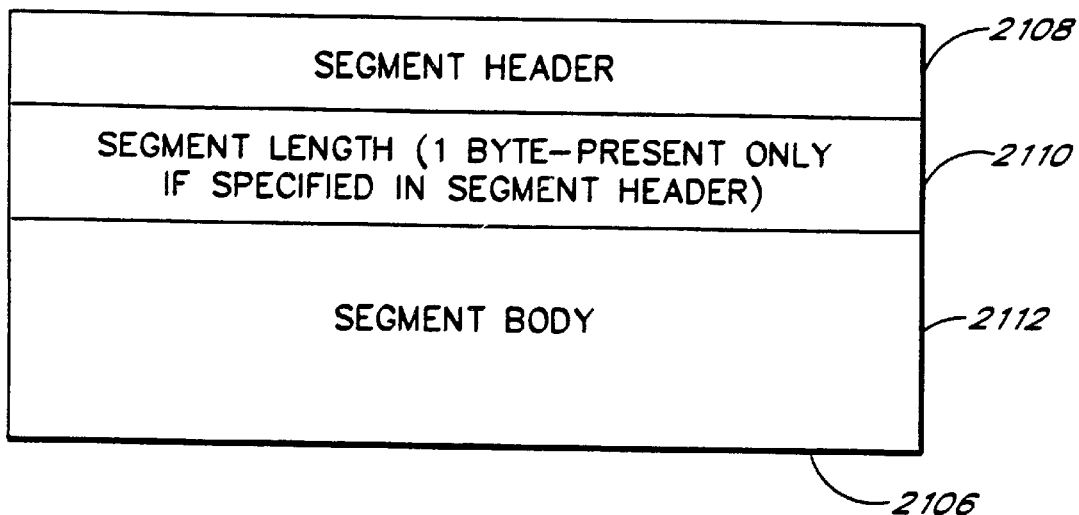

FIGS. 21A and 21B illustrate the preferred packet format used by the MCP layer 210. Each packet 2100 has a length of either 256 bytes or 512 bytes, depending upon the identity of the telecommunications provider which provides the X.25 connection. Each packet 2100 includes a one-byte packet sequence number field 2102 followed by a one-byte acknowledgement number field 2104 (which indicates the sequence number of the first non-received packet). As indicated above, the packet sequence number and acknowledgement number are used to implement the sliding window protocol.

Except for the special acknowledgement packets, each packet 2100 additionally includes one or more variable-length message segments 2106 (hereinafter "segments"). The segments 2106 are sub-units of the messages 800. The MCP layer 210 uses the segments 2106 to multiplex message streams of different service sessions operating on the on-line services network 100. The messages 800 are segmented on the originating side and reassembled at the receiving side. As further described below, the MCP layer 210 allocates segments 2106 to service messages 800 in a round robin fashion, while varying the lengths of different segments 2106 in order to allocate different amounts of bandwidth to the different services.

With reference to FIG. 21B, which illustrates the format of a segment 2106 (a multiple of which may be contained in the segments 2106 of FIG. 21A), each segment 2106 includes a segment header 2108, an optional one-byte segment length field 2110, and a segment body 2112. The segment header 2108 includes a multiplexing channel number (not shown). Multiplexing channels are allocated to different service sessions to allow multiple concurrent service, sessions (on a per-message-transmission basis) to allow the concurrent transmission of messages associated with different service sessions. In the preferred embodiment, a maximum of 16 simultaneous multiplexing channels can exist per user connection. When this multiplexing limit is reached, new message transmission requests are postponed until other messages are finished being transmitted. The limit of 16 multiplexing channels thus limits only the number of concurrent message transmissions, and not the number of service sessions.

Multiplexing channels may vary in bandwidth from one another. The MCP layer 210 varies channel bandwidth by assigning different segment lengths to different service sessions. The segment header 2108 also includes three segment control bits (not shown). The segment length assigned to a given service session can be modified during the lifetime of the service session. Segment lengths are preferably assigned when a multiplexing channel is first opened (i.e., when the first segment of a new message stream is transmitted) and when the MCP layer makes a new bandwidth allocation to the channel (when, for example, the client-user opens or terminates another service session.

The segment header 2108 also includes three segment control bits (not shown). The first segment control bit is used to indicate whether or not the segment 2106 is the last segment of a message. The second segment control bit is used to indicate whether or not the segment extends to the end of the packet 2100. When the segment 2106 does not extend to the end of the packet 2100, the byte that follows the segment header 2108 will specify the number of bytes of message data contained within the segment body 2112. The third segment control bit is used to indicate whether or not the message is a control message (such as a "close" request). When this third control bit indicates a control message, the first byte of the message indicates the control type. The first segment control bit indicates whether or not the segment 2106 is the last segment of the messages 800. The second segment control bit indicates whether or not the segment 2106 extends to the end of the packet 2100. The third segment control bit indicates whether or not the byte which follows the segment header 2108 is a segment length byte.

The segment length field 2110, when present, contains a one-byte segment length value which indicates the number of bytes of message data contained within the segment body 2112. A segment length field 2110 is provided when a multiplexing channel is first opened (i.e., when the first segment of a new message stream transmitted), or when the MCP layer 210 is making a new bandwidth allocation to the channel (when, for example, the client user opens or terminates another service session).

Referring again to FIG. 21A, each packet 2100 further contains a four-byte cyclical redundancy check (CRC) code 2120 (in accordance with CRC-32) to permit detection and correction of errors. Each packet 2100 ends with a packet delimiter 2122, such as an ASCII carriage return code.

Figure 8:
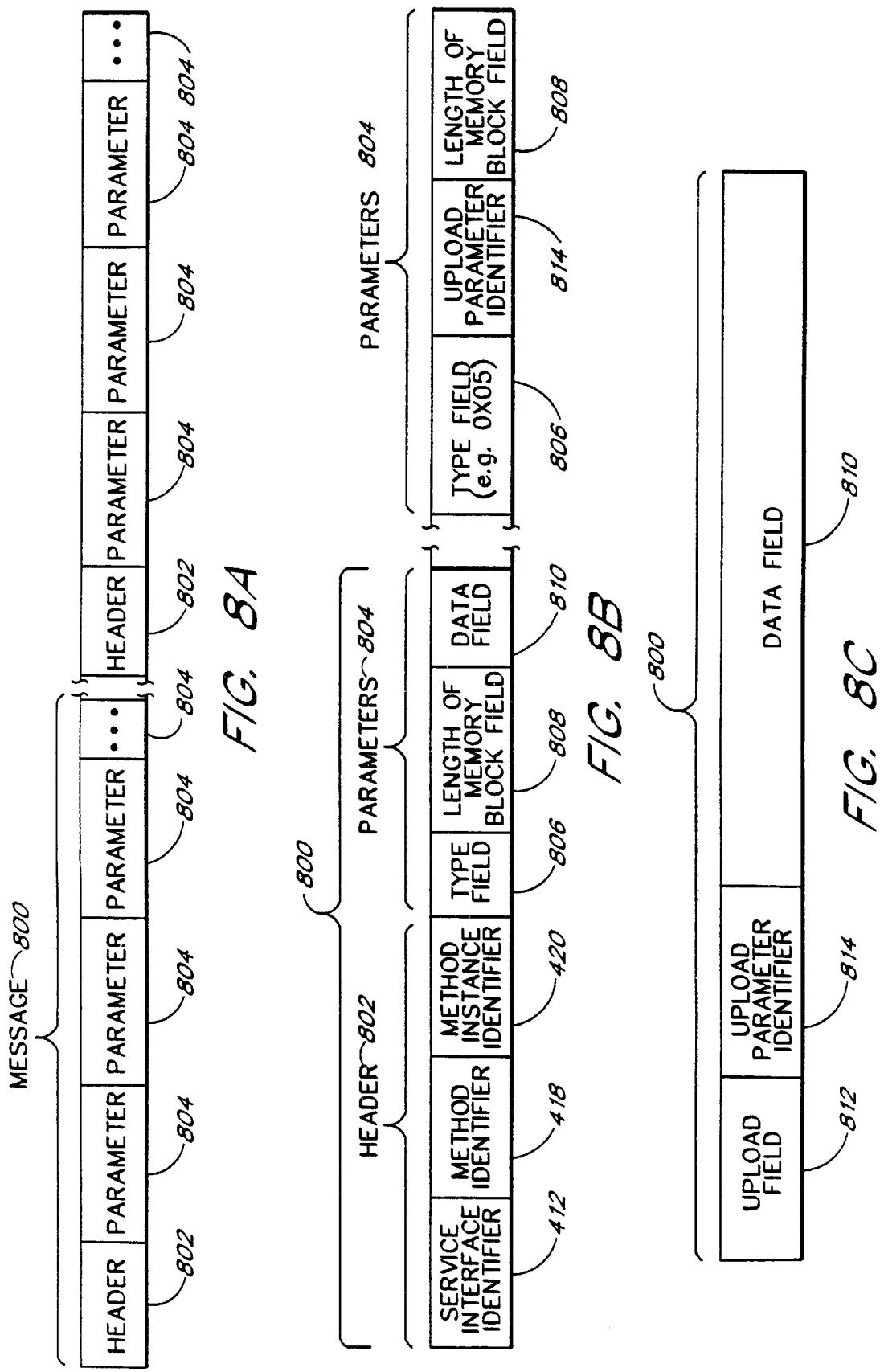
FIG. 8 illustrates the message format for remote messages sent between the client microcomputer and the host data center.
Figure 22:
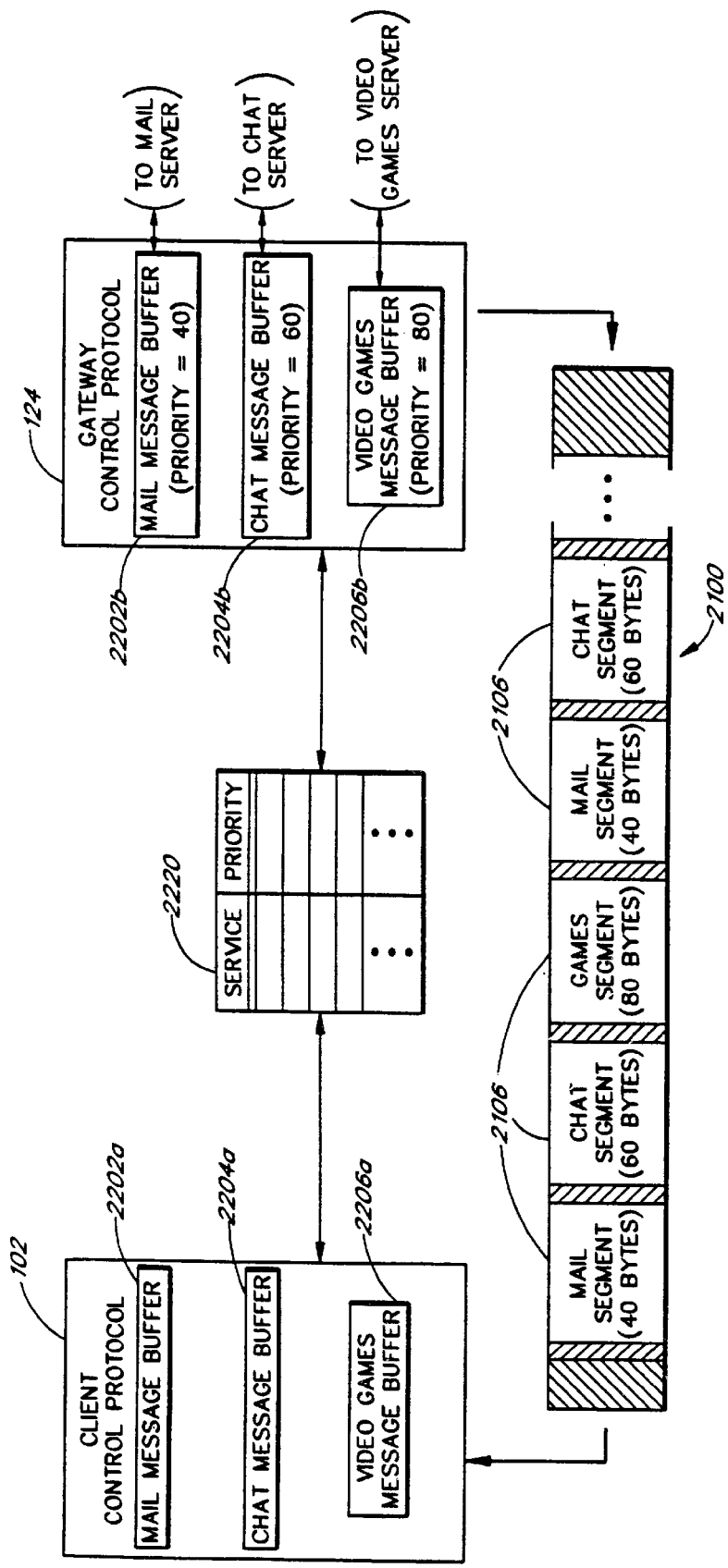
FIG. 22 illustrates a multiplexing technique for combining multiple client-server message streams within packets transmitted over the wide area network.

FIG. 22 illustrates, in example format, the preferred multiplexing and prioritization method of the MCP layers 210 of the present invention. FIG. 22 illustrates the format of a data packets 2100 sent from one MCP layer 210 to another MCP layer 210. FIG. 8, in contrast illustrates the format of the messages 800 that are sent from the MPC layers 206*a* and 206*c* to the MCP layers 210. In the preferred embodiment, the MCP layers format the messages 800 into the data packets 2106 before transmission over the wide area network 106 and the local area network layers 322*a* and 322*b*.

A client processor 102 is shown concurrently communicating with three different servers, a MAIL server, a CHAT server, and a VIDEO GAMES server (servers not shown). Within the client processor 102, the MCP layer 210 has allocated portions of RAM to the respective services to form a MAIL message buffer 2202*a*, a CHAT message buffer 2204*a*, and a VIDEO GAMES message buffer 2206*a*. Likewise, within the Gateway 124 to which the client processor 102 is connected, the MCP layer 210 has allocated portions of RAM to form corresponding MAIL, CHAT and VIDEO GAMES message buffers 2202*b*, 2204*b* and 2206*b*. Each buffer in FIG. 22 is associated with a particular service session, and can be thought of as including two separate buffers, a first buffer for holding outgoing messages and a second buffer for receiving incoming messages.

A packet 2100 being sent from the Gateway 124 to the client processor 102 contains segments 2106 corresponding to the MAIL, CHAT and VIDEO GAMES services. Each segment 2106 contains a portion of an outgoing message stored in one of the buffers 2202*b*, 2204*b*, 2206*b*. The packet 2100 is generated by the MCP layer 210 by extracting and multiplexing message data from the buffers 2202*b*, 2204*b*, 2206*b* in a round robin fashion. When the packet 2100 arrives at the client processor 102, the MCP layer 210 extracts and demultiplexes the segments, and stores the message data in the corresponding MAIL, CHAT and VIDEO GAMES buffers 2202*a*, 2204*a*, and 2206*a*. Messages sent from the client processor 102 to the Gateway 124 are multiplexed, packetized, and demultiplexed in the same manner.

As recognized by those skilled in the art, different types of on-line services tend to have different throughput and/or latency demands. For example, the on-line interactive VIDEO GAMES service typically requires a greater throughput for satisfactory operation than the MAIL service. Thus, with the multiplexing scheme of the present invention, it is desirable to implement a corresponding service priority scheme, whereby different services are allocated different amounts of the available wide area network bandwidth.

This is accomplished by assigning segment lengths to different services based on entries stored within a service priority table 2220. The service priority table 2220 contains priority levels for each service (or service type) and is accessed by the MCP layer 210 whenever a new service is opened by the user. The service priority table 2220 may additionally include minimum throughput requirements for certain services. For example, for an embodiment of the CHAT service that permits voice communications, the table 2220 could indicate a minimum throughput requirement of 7 kbps (to ensure voice reproduction of a predetermined quality), and a request to open the service could be failed when this amount of bandwidth is not available.

In the example shown in FIG. 22, the MCP layer 210 has allocated segment lengths of 40 bytes, 60 bytes and 80 bytes, respectively, to the MAIL, CHAT and VIDEO GAMES services. Thus, the MAIL service has been allocated half the bandwidth of the VIDEO GAMES service, and two-thirds the bandwidth of the CHAT service.

The service priority table 2220 may reside within either the client processor 102, the Gateway 124, or both. Alternatively, the throughput priorities could be provided by the service applications, eliminating the need for the table 2220. In the preferred embodiment, the throughput priorities indicated by the table 2220 cannot be overridden by end users. In other embodiments, client applications may be written to allow end users to override the predetermined throughput priorities.

Because throughput demands for client-to-server data transfers of a service may differ significantly from the throughput demands for server-to-client data transfers (for the same service), it may be desirable to use a first set of bandwidth allocations for client-to-Gateway message traffic, and second set of bandwidth allocations for Gateway-to-client message traffic. This may be accomplished by maintaining two priority levels for each service, one for client-to-server messages, and another for server-to-client messages.

Although the above-described multiplexing and bandwidth allocation schemes are described in the context of packets, it will be recognized that the packetization of message segments is not essential. For example, in embodiments which use TCP/IP for client-Gateway communications, the variable-length segments are simply multiplexed within the outgoing byte stream, and no packetization by the client processor 102 or the Gateway 124 is necessary.

While the above detailed description has shown, described and pointed out the fundamental novel features of the invention as applied to a preferred embodiment, it will be understood that various omissions and substitutions and changes in the form and details of the illustrated device may be made by those skilled in the art without departing from the spirit of the invention. Consequently, the scope of the invention should not be limited to the foregoing discussion but should be defined by the appended claims.

What is claimed is:

1. A remote request system that dynamically allocates memory for a data block of unknown size received from an on-line network, said remote request system comprising:
   at least one client application executing in a computer, said client application capable of requesting at least one remote request for a data block of unknown size;
   a data structure resident in said computer, said data structure containing a dynamic object that references a plurality of data buffers; and
   a client request layer in communication with said client application, said data structure and a wide area network, said client request layer programmed to create said dynamic object in response to said remote request for a data block of unknown size, said client request layer further programmed to send said remote request via a wide area network to an on-line network.

2. The remote request system of claim 1 further comprising an on-line network connected to said client request layer via said wide area network, said on-line network further comprising:
   a plurality of interconnected servers that execute at least one on-line service, said on-line service responsive to said remote request by locating said data block; and
   a service request layer in communication with said on-line service and said wide area network, said service request layer programmed to receive said remote request and route said remote request to said on-line service, said service request layer further programmed to subdivide said data block located by said on-line service into a plurality of response messages, said response messages containing incremental data segments of said data block.

3. The remote request system of claim 2 wherein said client request layer further comprises a dynamic routine wherein said dynamic routine receives said response messages and stores said incremental data segments in said data buffers referenced by said dynamic object.

4. The remote request system of claim 3 wherein said client request layer further comprises a memory allocation routine in communication with said dynamic routine, said memory allocation routine locating a continuous section of memory in which to store said data buffers.

5. The remote request system of claim 3, wherein said client application is capable of accessing at least one of said data buffers before said client request layer completely receives all of said data block of unknown size from said on-line network.

6. The remote request system of claim 5, wherein said client request layer is capable of deleting at least one of said plurality of data buffers before completely receiving said data block of unknown size from said on-line network.

7. A remote request layer in a local computer that allocates memory for a data block of unknown size received from a remote on-line services network comprising:
   a data structure resident in said computer, said data structure containing a dynamic object that references a plurality of data buffers;
   a dynamic routine in communication with said data structure and said on-line network, said dynamic routine executing in said computer, wherein said dynamic routine is programmed to receive a plurality of messages from said on-line network, each message containing an incremental data segment of said data block of unknown size, wherein said dynamic routine creates said data buffers to store said incremental data segments, and links said data buffers to said dynamic object; and
   a memory allocation routine in communication with said dynamic routine, said memory allocation routine executing in said computer, said memory allocation routine locating a continuous section of memory in which to store said data buffers and wherein said dynamic routine transfers said data buffers to said continuous section of memory.

8. The remote request layer of claim 7, wherein said data structure further contains a plurality of identifiers that uniquely identify each of a plurality of concurrently pending remote requests for data blocks of unknown size.

9. The remote request layer of claim 8, wherein said remote request layer further comprises a cancellation routine in communication with said data structure and said on-line network, said cancellation routine executing in said computer and capable of creating and sending a cancellation message to said on-line network that directs said on-line network to cancel at least one of said pending remote requests.

10. The remote request layer of claim 9, wherein said cancellation routine deletes said dynamic object and said plurality of data buffers in response to said cancellation message.

11. The remote request layer of claim 8, wherein said received messages further contain a header and a data packet, said header containing said identifiers that uniquely identify a pending remote request, said data packet containing said incremental data segment.

12. The remote request layer of claim 8, wherein said remote requests are remote procedure calls.

13. In a computer, a method for dynamically allocating memory for response to remote requests sent to an interactive, on-line services network, comprising:

sending to the on-line network via a wide area network at least one remote request for a data block of unknown size;

receiving response messages that include data from the data block;

creating a dynamic object that identifies memory reserved for storing the response messages and also identifies a subset of the reserved memory that is committed to storage of the response messages; and adjusting sizes of the reserved and committed memories in response to an accumulated size of the data received in the response messages.

14. The method of claim 13 wherein said response messages contain incremental data segments of said data block of unknown size; the meyhod further comprising:

creating a plurality of data buffers to hold said incremental data segments; and linking said data buffers to said dynamic object.

15. The method of claim 14 wherein said step of creating a plurality of data buffers comprises allocating a first continuous section of memory in which to store said data buffers.

16. The method of claim 15 wherein said step of creating a plurality of data buffers comprises allocating a second continuous section of memory if said first continuous section of memory cannot accommodate all of said data buffers.

17. The method of claim 16 wherein said step of linking said data buffers to said dynamic object includes linking said second continuous section of memory with said dynamic object.

18. The method of claim 14 further comprising the step of accessing at least one of said data buffers before receiving all of said response messages from said on-line network.

19. The method of claim 18 further comprising the step of deleting at least one of said plurality of data buffers before receiving all of said response messages from said on-line network.

* * * * *

UNITED STATES PATENT AND TRADEMARK OFFICE
CERTIFICATE OF CORRECTION

PATENT NO.      : 6,430,607 B1
DATED           : August 6, 2002
INVENTOR(S)     : Gene D. Kavner It is certified that error appears in the above-identified patent and that said Letters Patent is hereby corrected as shown below:

Title page,
Item [56], References Cited, U.S PATENT DOCUMENTS,
Reference: -- 4,914,571  4/90  Baratz et al. -- should be added.
"New" should read -- News --; and
"Consisten+Replication" should read -- Consistant Replication --.

Column 17,
Line 20, "upload." should read -- upload --.

Column 29,
Line 17, "MPC-layer" should read -- MPC layer --.

Column 40,
Line 63, "432" should read -- 432 --.

Signed and Sealed this

Twenty-third Day of September, 2003

JAMES E. ROGAN
*Director of the United States Patent and Trademark Office*